(12) United States Patent
Baron et al.

(10) Patent No.: US 8,726,414 B2
(45) Date of Patent: *May 20, 2014

(54) ARTICLE OF APPAREL INCORPORATING A ZONED MODIFIABLE TEXTILE STRUCTURE

(75) Inventors: Michael Robert Baron, Tigard, OR (US); Karin Elizabeth Carter, Portland, OR (US); LaShurya M. Wise, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 94 days.

This patent is subject to a terminal disclaimer.

(21) Appl. No.: 12/131,624

(22) Filed: Jun. 2, 2008

(65) Prior Publication Data
US 2008/0229473 A1 Sep. 25, 2008

Related U.S. Application Data

(63) Continuation of application No. 11/040,165, filed on Jan. 24, 2005, now Pat. No. 7,437,774, which is a continuation-in-part of application No. 10/839,695, filed on May 6, 2004, now Pat. No. 8,555,414, and a continuation-in-part of application No. 10/967,635, filed on Oct. 19, 2004, now abandoned, which is a continuation-in-part of application No. 10/805,681, filed on Mar. 19, 2004, now abandoned.

(51) Int. Cl.
*A41D 13/00* (2006.01)
*A41B 1/00* (2006.01)

(52) U.S. Cl.
USPC ................................... 2/69; 2/115

(58) Field of Classification Search
USPC ........................................... 2/69, 115, DIG. 1
See application file for complete search history.

(56) References Cited

U.S. PATENT DOCUMENTS

| 2,846,687 | A | * | 8/1958 | Lippman | 2/115 |
| 3,086,215 | A | * | 4/1963 | Di Paola | 2/93 |
| 3,265,529 | A | | 8/1966 | Caldwell et al. | |
| 3,607,591 | A | | 9/1971 | Hansen | |
| 3,801,987 | A | * | 4/1974 | Thompson, Jr. | 2/125 |

(Continued)

FOREIGN PATENT DOCUMENTS

| DE | 196 19 858 | 11/1997 |
| EP | 1 050 323 | 11/2000 |

(Continued)

OTHER PUBLICATIONS

Mitsubishi rayon: Changeable fiber stretches with moisture; Asian Textile Business; Sep. 1, 2003.

(Continued)

*Primary Examiner* — Alissa L Hoey
(74) *Attorney, Agent, or Firm* — Plumsea Law Group, LLC

(57) ABSTRACT

An article of apparel is disclosed that includes zones with a textile having a structure that changes or is otherwise modified by a physical stimulus, such as the presence of water or a temperature change, to modify a property of the textile. The zones may be along a center back area and side areas of the apparel, and the textile may increase in air permeability when exposed to water. The zones may also be in an upper area of the torso and in a lower back area, and the textile may increase in texture when exposed to water. In some embodiments, slits are formed in the textile.

18 Claims, 43 Drawing Sheets

(56) References Cited

U.S. PATENT DOCUMENTS

| | | | |
|---|---|---|---|
| 4,267,710 A | | 5/1981 | Imamichi |
| 4,351,874 A | | 9/1982 | Kirby |
| 4,392,258 A | | 7/1983 | O'Neill |
| 4,418,524 A | | 12/1983 | Ito et al. |
| 4,541,426 A | * | 9/1985 | Webster .................... 602/47 |
| 4,638,648 A | | 1/1987 | Gajjar |
| 5,095,548 A | | 3/1992 | Chesebro, Jr. |
| 5,105,478 A | * | 4/1992 | Pyc ................... 2/115 |
| 5,192,600 A | | 3/1993 | Pontrelli et al. |
| 5,367,710 A | | 11/1994 | Karmin |
| 5,645,924 A | | 7/1997 | Hamilton |
| 5,683,794 A | | 11/1997 | Wadsworth et al. |
| 5,704,064 A | * | 1/1998 | van der Sleesen ................ 2/69 |
| 5,727,256 A | * | 3/1998 | Rudman ....................... 2/115 |
| 5,792,714 A | * | 8/1998 | Schindler et al. ............. 442/194 |
| 5,834,093 A | * | 11/1998 | Challis et al. ................ 428/136 |
| 5,887,276 A | | 3/1999 | Lee |
| 5,908,673 A | | 6/1999 | Muhlberger |
| 6,253,582 B1 | | 7/2001 | Driggars |
| 6,319,558 B1 | * | 11/2001 | Willemsen ................ 427/389.8 |
| 6,332,221 B1 | * | 12/2001 | Gracey ................. 2/69 |
| 6,339,845 B1 | * | 1/2002 | Burns et al. .................... 2/243.1 |
| D457,709 S | * | 5/2002 | Davis ............................. D2/717 |
| 6,403,216 B1 | * | 6/2002 | Doi et al. ...................... 428/364 |
| 6,767,850 B1 | | 7/2004 | Tebbe |
| 2003/0061650 A1 | * | 4/2003 | Emanuel ..................... 2/115 |
| 2006/0223400 A1 | * | 10/2006 | Yasui et al. ................. 442/181 |
| 2006/0270293 A1 | | 11/2006 | Yasui et al. |

FOREIGN PATENT DOCUMENTS

| | | |
|---|---|---|
| GB | 2254044 | 9/1992 |
| GB | 2333724 | 7/2002 |
| JP | 60-252746 | 12/1985 |
| JP | 60-252756 | 12/1985 |
| JP | 62-162043 | 7/1987 |
| JP | 2003-41462 | 2/2003 |
| JP | 2003-082555 | 3/2003 |
| JP | 2004-360094 | 12/2004 |
| JP | 2005-36374 | 2/2005 |
| WO | WO 92/16434 | 10/1992 |
| WO | WO 99/05926 | 2/1999 |
| WO | 2004/113599 A1 | 12/2004 |
| WO | 2004/113601 A1 | 12/2004 |
| WO | 2005/010258 A1 | 2/2005 |
| WO | 2005/038112 A1 | 4/2005 |
| WO | 2005/095692 A1 | 10/2005 |
| WO | 2006/041200 A1 | 4/2006 |
| WO | 2006/043677 A1 | 4/2006 |
| WO | 2006/090808 A1 | 8/2006 |

OTHER PUBLICATIONS

Office Action mailed Sep. 25, 2008 for U.S. Appl. No. 11/053,120.
Office Action mailed Nov. 13, 2008 for U.S. Appl. No. 10/967,635.
Office Action mailed Apr. 20, 2005 for U.S. Appl. No. 10/805,681.
Office Action mailed Nov. 14, 2005 for U.S. Appl. No. 10/805,681.
Office Action mailed May 5, 2006 for U.S. Appl. No. 10/805,681.
Office Action mailed Oct. 13, 2006 for U.S. Appl. No. 10/805,681.
Office Action mailed Jan. 16, 2007 for U.S. Appl. No. 10/805,681.
Office Action mailed Oct. 16, 2007 for U.S. Appl. No. 10/805,681.
Office Action mailed Feb. 7, 2007 for U.S. Appl. No. 10/967,635.
Office Action mailed May 4, 2007 for U.S. Appl. No. 10/967,635.
Office Action mailed Aug. 20, 2007 for U.S. Appl. No. 10/967,635.
Office Action mailed Mar. 31, 2008 for U.S. Appl. No. 10/967,635.
Office Action mailed Sep. 12, 2007 for U.S. Appl. No. 11/040,165.
Office Action mailed Nov. 26, 2007 for U.S. Appl. No. 11/040,165.
Office Action mailed Apr. 7, 2008 for U.S. Appl. No. 11/040,165.
Notice of Allowance mailed Jun. 13, 2008 for U.S. Appl. No. 11/040,165.
Office Action mailed Apr. 9, 2007 for U.S. Appl. No. 11/053,705.
Office Action mailed Jul. 1, 2008 for U.S. Appl. No. 11/053,705.
Office Action mailed Apr. 9, 2007 for U.S. Appl. No. 11/053,074.
Office Action mailed Jun. 27, 2008 for U.S. Appl. No. 11/053,074.
Office Action mailed Apr. 9, 2007 for U.S. Appl. No. 11/053,120.
Office Action mailed Jul. 1, 2008 for U.S. Appl. No. 11/053,120.
Office Action mailed Aug. 10, 2005 for U.S. Appl. No. 11/052,996.
Office Action mailed Jan. 25, 2006 for U.S. Appl. No. 11/052,996.
Office Action mailed May 18, 2006 for U.S. Appl. No. 11/052,996.
Office Action mailed Nov. 2, 2006 for U.S. Appl. No. 11/052,996.
Office Action mailed Jun. 27, 2007 for U.S. Appl. No. 11/052,996.
Office Action mailed Dec. 11, 2007 for U.S. Appl. No. 11/052,996.
Office Action mailed May 15, 2008 for U.S. Appl. No. 11/052,996.
Office Action mailed Jun. 16, 2008 for U.S. Appl. No. 11/052,996.
International Search Report and Written Opinion mailed Jun. 6, 2005 for PCT/US2005/005191.
International Search Report and Written Opinion mailed Jan. 26, 2006 for PCT/US2005/035831.

* cited by examiner

ARTICLE OF APPAREL INCORPORATING A ZONED MODIFIABLE TEXTILE STRUCTURE

CROSS-REFERENCE TO RELATED APPLICATIONS

This U.S. patent application is a continuation application and claims priority to U.S. patent application Ser. No. 11/040,165, which was filed in the U.S. Patent and Trademark Office on 24 Jan. 2005 and entitled Article Of Apparel Incorporating A Zoned Modifiable Textile Structure, such prior U.S. patent application being entirely incorporated herein by reference. U.S. patent application Ser. No. 11/040,165 is a continuation-in-part application and claims priority to (a) U.S. patent application Ser. No. 10/839,695, which was filed in the U.S. Patent and Trademark Office on 6 May 2004 and entitled Article Of Apparel Utilizing Zoned Venting And/Or Other Body Cooling Features Or Methods and (b) U.S. patent application Ser. No. 10/967,635, which was filed in the U.S. Patent and Trademark Office on 19 Oct. 2004 and entitled Article Of Apparel Incorporating A Modifiable Textile Structure, which is also a continuation-in-part application of and claims priority to U.S. patent application Ser. No. 10/805,681, which was filed in the U.S. Patent and Trademark Office on 19 Mar. 2004 and entitled Article Of Apparel Incorporating A Modifiable Textile Structure, such prior U.S. Patent Applications being entirely incorporated herein by reference.

BACKGROUND OF THE INVENTION

1. Field of the Invention

The present invention relates to apparel. The invention concerns, more particularly, an article of apparel incorporating zones with a textile having a structure that changes or is otherwise modified by a physical stimulus, such as the presence of water or a temperature change, to modify a property of the textile. The invention has application, for example, to articles of apparel intended for use during athletic activities.

2. Description of Background Art

Articles of apparel designed for use during athletic activities generally exhibit characteristics that enhance the performance or comfort of an individual. For example, apparel may incorporate an elastic textile that provides a relatively tight fit, thereby imparting the individual with a lower profile that minimizes wind resistance. Apparel may also be formed from a textile that wicks moisture away from the individual in order to reduce the quantity of perspiration that accumulates adjacent to the skin. Furthermore, apparel may incorporate materials that are specifically selected for particular environmental conditions. Examples of various types of articles of apparel include shirts, headwear, coats, jackets, pants, underwear, gloves, socks, and footwear.

The characteristics of the textiles that are incorporated into apparel are generally selected based upon the specific activity for which the apparel is intended to be used. A textile that minimizes wind resistance, for example, may be suitable for activities where speed is a primary concern. Similarly, a textile that reduces the quantity of perspiration that accumulates adjacent to the skin may be most appropriate for athletic activities commonly associated with a relatively high degree of exertion. Accordingly, textiles may be selected to enhance the performance or comfort of individuals engaged in specific athletic activities.

Textiles may be defined as any manufacture from fibers, filaments, or yarns characterized by flexibility, fineness, and a high ratio of length to thickness. Textiles generally fall into two categories. The first category includes textiles produced directly from webs of fibers or filaments by bonding, fusing, or interlocking to construct non-woven fabrics and felts. The second category includes textiles formed through a mechanical manipulation of yarn, thereby producing a woven fabric.

Yarn is the raw material utilized to form textiles in the second category and may be defined as an assembly having a substantial length and relatively small cross-section that is formed from at least one filament or a plurality of fibers. Fibers have a relatively short length and require spinning or twisting processes to produce a yarn of suitable length for use in textiles. Common examples of fibers are cotton and wool. Filaments, however, have an indefinite length and may merely be combined with other filaments to produce a yarn suitable for use in textiles. Modern filaments include a plurality of synthetic materials such as rayon, nylon, polyester, and polyacrylic, with silk being the primary, naturally-occurring exception. Yarn may be formed from a single filament or a plurality of individual filaments grouped together. Yarn may also include separate filaments formed from different materials, or the yarn may include filaments that are each formed from two or more different materials. Similar concepts also apply to yarns formed from fibers. Accordingly, yarns may have a variety of configurations that generally conform to the definition provided above.

The various techniques for mechanically-manipulating yarn into a textile include interweaving, intertwining and twisting, and interlooping. Interweaving is the intersection of two yarns that cross and interweave at substantially right angles to each other. The yarns utilized in interweaving are conventionally referred to as warp and weft. Intertwining and twisting encompasses procedures such as braiding and knotting where yarns intertwine with each other to form a textile. Interlooping involves the formation of a plurality of columns of intermeshed loops, with knitting being the most common method of interlooping.

One challenge faced by athletes when competing or training, particularly in moderate to hot temperature conditions, is heat. Not only must the athlete cope with heat from the external environment, but the athlete also must cope with heat generated within the body of the athlete as a result of physical exertion.

Substantial heat may be generated in an athlete's body as a result of physical activity and exertion. In general, the core temperature of a body rises with increased physical activity. Less than 25% of the energy created during physical activity is converted into work energy (e.g., energy used to move the body and/or resist an applied force). The remaining 75%+ of the created energy typically must be dissipated as released heat. The human body's most effective mechanism for dealing with excess heat is through evaporative cooling. When a core body temperature rises to a certain level, the body will start to sweat. When this liquid sweat evaporates, the physical conversion of the liquid to its corresponding gas form (i.e., the drying) draws heat from the nearest heat source. In the case of sweat, the nearest heat source is the skin. In this manner, sweating cools a person due to the evaporative cooling action as the sweat dries. This evaporation of sweat is dependent upon the water vapor pressure (or relative humidity) of the air in contact with the skin. Air movement also is an important factor. For example, ambient air gains humidity as it picks up moisture during the evaporation of sweat. In the absence of adequate air movement (ventilation), this humidified air becomes trapped in areas surrounding the skin, thus inhibiting the cooling provided by the continued evaporation of sweat. Failure to properly release and move heat away from the body during exercise in a warm environment can cause a dangerous rise in the person's body temperature, potentially resulting in adverse health consequences, such as heat exhaustion or heat stroke.

SUMMARY OF THE INVENTION

The present invention involves an article of apparel having a first material and a second material. The first material exhibits a dimensional transformation upon exposure to a physical stimulus to change a property of the first material. The second material, however, is substantially stable upon exposure to the physical stimulus. A variety of physical stimuli, such as water or changes in temperature, may induce the dimensional transformation.

The article of apparel may include a torso region and a pair of arm regions, and the first material may form one or both of a center back area of the torso region and side areas of the torso region. The first material may also form one or more of an upper area of the torso region, at least a portion of the pair of arm regions, and a lower back area of the torso region. In some embodiments, a plurality of slits are formed in the first material.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

I. Introduction

Figure 1:
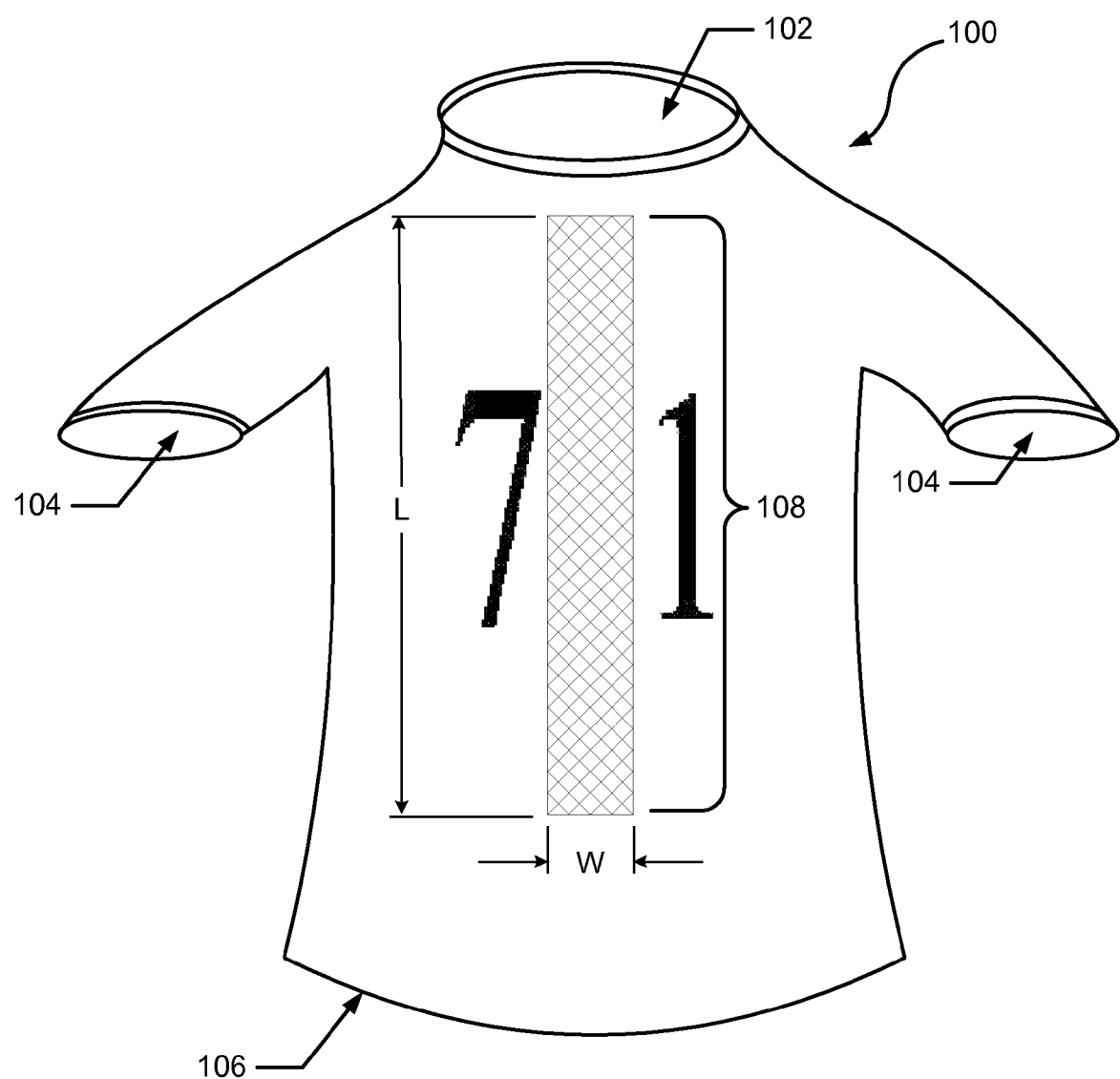
FIG. 1 illustrates an example article of apparel in accordance with the invention having a center back vented zone.

The following material discloses various articles of apparel that incorporate zoned venting structures to provide enhanced or improved cooling effects. The following material also discloses a variety of textiles with structures that are modified by a physical stimulus in order to change the properties of the textiles or articles of apparel that incorporates the textiles. Although the zoned venting structures may be formed from a mesh material, for example, some articles of apparel may incorporate zones formed from the textiles that are modified by a physical stimulus. As an example, the zones may have a first air permeability when exposed to dry or cool environments, and the same zones of the apparel may have a second, greater air permeability when exposed to water or hot environments. Accordingly, the air permeability of the articles of apparel may increase in the presence of water (e.g., perspiration) or heat. Among other configurations, the zones may be positioned along a center of a back portion of the apparel or along side portions of the apparel. As another example, zones in an upper torso area and lower back area may increase in texture when exposed to water, thereby holding the apparel away from the wearer.

II. Terminology

The following terms are used in this specification, and unless otherwise noted or clear from the context, these terms have the meanings provided below.

"Air permeability," as used in this specification, means the volume of air (e.g., in cubic feet) that passes through a given area of the material tested (e.g., a square foot) in a given time period (e.g., a minute) under predetermined testing conditions. While various ways of measuring air permeability of a material are known and may be used, one suitable method of measuring air permeability involves the use of a Frazier Low Pressure Air Permeability Machine 750 using standard test ASTM D737-96.

A given type of material (e.g., a polyester, spandex, cotton, wool, or other type of material) may have a wide range of different air permeabilities, depending on various factors associated with the specific material sample. For example, the air permeability characteristics of a given material may depend on various characteristics of the ultimate fabric sample containing the material, such as: thread or fiber thickness; thread or fiber count; yarn twist; weave or knit density; weave or knit construction; material or weave flexibility or stretchability; the presence or absence of mesh openings (or other openings); the mesh or opening size; the percentage of material surface area covered by mesh or openings; fabric thickness; number of plies; surface and/or finishing treatments (if any); and the like. Accordingly, in at least some examples of this invention, the various "article of apparel portions" having different air permeabilities, as these terms are used in the present specification, may be made from the same type of material, but characteristics of that material may be adjusted in at least one of the article of apparel portions to alter its air permeability (e.g., the fabric may be treated or otherwise constructed or arranged in the vented zone to increase its air permeability as compared to the air permeability of the fabric at locations in the first article of apparel portion (i.e., the portion not containing the vented zone) or the fabric in the first article of apparel portion may be treated or otherwise constructed or arranged to lower its air permeability as compared to that of the material in the vented zone). In other examples of the invention, a different material may make up the vented zone as compared to the material in the first article of apparel portion.

III. General Apparel Configurations

In general, aspects of this invention relate to article of apparels having vented zones at specifically targeted locations of the article of apparel structure to improve cooling efficiency and effectiveness and thereby, in at least some instances, increase the athlete's comfort level and improve his or her performance. As described above, much heat energy is generated in an athlete's body as a result of physical exertion, and this heat energy must be dissipated in some manner to provide a more comfortable workout and/or to prevent the athlete's core body temperature from rising to dangerous levels. Physiological research conducted in connection with this invention demonstrated that if a limited area of mesh is positioned on an athlete's torso, applying those mesh panels to the sides and down the center of the back provided the most effective ventilatory cooling during work in heat. Article of apparels having targeted venting zones provided at one or more of these locations allow a significant reduction in the core body temperature rise during exercise and physical exertion as compared to article of apparels having no venting and article of apparels having venting in other areas.

Article of apparels having targeted venting in accordance with at least some aspects of this invention may include, for example: (a) a first article of apparel portion formed of a fabric material, wherein the first article of apparel portion has an air permeability of less than 550 ft$^3$/min per ft$^2$; and (b) a second article of apparel portion forming an article of apparel structure with at least the first article of apparel portion, wherein the second article of apparel portion includes a first vented zone, wherein a material forming the first vented zone has an air permeability of at least 550 ft$^3$/min per ft$^2$, and wherein the first vented zone is at least 12 in$^2$ and is provided at a targeted location in the article of apparel structure to cool the wearer's body. The vented zone may be any desired size without departing from the invention, for example, at least 20 in$^2$, or even at least 30 in$^2$. One or more, additional article of apparel portions including one or more additional vented zones like those described above may be included in the article of apparel structure without departing from the invention. Such additional vented zones, when present, may be located separate from the first vented zone. In at least some examples of the invention, the first article of apparel portion may form a majority of the article of apparel structure.

Article of apparels according to at least some more specific examples of the invention fit at least a portion of a torso of a wearer and include: (a) a first article of apparel portion formed of a fabric material and having an air permeability of less than 550 ft$^3$/min per ft$^2$; and (b) a second article of apparel portion forming an article of apparel structure with at least the first article of apparel portion, wherein the second article of apparel portion includes a first vented zone, wherein a material forming the first vented zone has an air permeability of at least 550 ft$^3$/min per ft$^2$. In at least some examples, at least a portion of the first vented zone may be from about 2 to about 6 inches in a first dimension and at least about 10 inches in another dimension and extend along a center back portion of the article of apparel structure. In other examples, at least a portion of the first vented zone may be from about 2 to about 6 inches in a first dimension and at least about 6 inches in another dimension and extend along a first side portion of the article of apparel structure. Optionally, each side portion of the article of apparels may include vented zones like those described above. As still another option, article of apparels in accordance with at least some examples of this invention may include any combination or all of the center back vented zone and one or more side vented zones.

In at least some examples, the first article of apparel portion may have an air permeability of less than 500 ft$^3$/min per ft$^2$, and even less than 450 ft$^3$/min per ft$^2$. Additionally or alternatively, at least some example article of apparels will have a second article of apparel portion having an air permeability of at least 600 ft$^3$/min per ft$^2$, and in some examples, the air permeability will be at least 700 ft$^3$/min per ft$^2$ and even at least 800 ft$^3$/min per ft$^2$.

Zoned venting, like that described above, helps keep an athlete cooler by increasing air flow over various targeted regions of the body (e.g., the center back and two sides). The body releases a significant amount of its excess heat in the center back area, and increased air flow in this region, via zoned venting, speeds up the evaporation of sweat from the skin, and hence, speeds up the evaporative cooling process (as described above). Additionally, this improved air flow moves fresh and relatively cool air into the targeted regions and moves the heated air out. Vented zones at the athlete's sides help improve intake and exhaust air flow when the body is moving forward or laterally, movement that typically occurs during exercise and/or sporting events. When vented zones are provided at the center back and both lateral sides, air can flow into the article of apparel at the article of apparel sides and around to the back and out, evaporating sweat and moving heated air away from the body.

In at least some studies, the rise in core body temperature during exercise when wearing an example article of apparel in accordance with the invention (e.g., an article of apparel having center back and two side vented zones) was between about 0.2° F. to 0.5° F. lower as compared to exercise under similar conditions wearing article of apparels vented in other areas (with the same total venting area) and as compared to exercise under similar conditions wearing unvented article of apparels. Although this may be meaningless to the athlete who is merely "warm," an increase of even a few tenths of a degree can be very distressing to the athlete who is approaching his/her limit of heat tolerance.

Additional aspects of the invention relate to methods for forming article of apparels having targeted vented zones, e.g., like those described above. Such methods may include, for example: (a) providing a first article of apparel portion formed of a fabric material, wherein the first article of apparel portion has an air permeability of less than 550 ft$^3$/min per ft$^2$; (b) providing a second article of apparel portion including a first vented zone, wherein a material forming the first vented zone has an air permeability of at least 550 ft$^3$/min per ft$^2$, and wherein the first vented zone is at least 12 in$^2$, and in some examples may be at least 20 in$^2$, or even at least 30 in$^2$; and (c) forming an article of apparel structure including at least the first article of apparel portion and the second article of apparel portion, wherein the first vented zone is provided at a targeted location in the article of apparel structure to cool the wearer's body. If desired, the article of apparel structure may be formed to include a plurality of vented zones, as generally described above.

As a more specific example, for article of apparels that fit at least a portion of a torso of a wearer, methods in accordance with some examples of the invention may include: (a) providing a first article of apparel portion formed of a fabric material, wherein the first article of apparel portion has an air permeability of less than 550 ft$^3$/min per ft$^2$; (b) providing a second article of apparel portion including a first vented zone, wherein a material forming the first vented zone has an air permeability of at least 550 ft$^3$/min per ft$^2$, and wherein at least a portion of the first vented zone is from about 2 to about 6 inches in a first dimension and at least about 6 or at least about 10 inches in a second dimension; and (c) forming an article of apparel structure including at least the first article of apparel portion and the second article of apparel portion, wherein the first vented zone extends along a center back portion of the article of apparel structure or along a side portion of the article of apparel structure. Again, plural vented zones may be included in the article of apparel structure without departing from the invention.

As noted above, additional aspects of this invention relate to systems and methods for cooling an athlete's body during an event or exercise routine. Systems in accordance with at least some examples of this invention may include: (a) a piece of apparel or athletic equipment; and (b) a container for receiving liquid and the piece of apparel or athletic equipment. The container further may include instructions and/or indicia indicating at least one amount of a liquid (such as water) to be included in the container to wet the piece of apparel or athletic equipment prior to it being donned by a wearer. As another option, the container may be appropriately sized such that a user may place the piece of apparel or athletic equipment in the container and then fill (or substantially fill) the container with liquid. The container also may include a closure system, e.g., for holding the article of apparel and the liquid in a liquid tight manner. The container may be repeatably openable and closeable, so that the article of apparel can be wet repeatedly, if necessary or desired, e.g., for numerous events or exercise routines and/or for lengthy events or exercise routines.

In at least some examples, the piece of apparel or athletic equipment may constitute an article of apparel for at least a torso of the wearer, optionally including one or more of the venting zones, such as the various article of apparels described above.

Methods in accordance with these aspects of the invention may include, for example: (a) wetting a piece of apparel or athletic equipment; (b) at least 20 minutes prior to a start of an event or exercise routine, donning the wetted piece of apparel or athletic equipment and wearing it in a wetted condition (optionally while resting, maintaining a low level of physical activity, and/or staying in a cool environment) so as to cool a wearer's body prior to the start; and (c) participating in the event or exercise routine. In some instances, the athlete will continue resting, maintain a low activity level, and/or remain in a cool location for at least 20 minutes, in order to pre-cool the body prior to the event or exercise routine. Optionally, if desired, the piece of apparel or athletic equipment may be doffed prior to participating in the event or exercise routine, and further, if desired, it may be re-donned after the event or routine (optionally with re-wetting, if necessary) and used to cool the body after the event or routine. As another alternative, the piece of apparel or athletic equipment may be worn during and/or after the event or exercise routine, with re-wetting if and when necessary, to allow the athlete to benefit from the cooling effects before, during, and/or after the event or routine.

In at least some example methods according to the invention, the athlete further may warm up after donning the piece of apparel or athletic equipment and shortly before participating in the event or exercise routine. If desired, the athlete may warm up while wearing the pre-wetted piece of apparel or athletic equipment, to keep the athlete's body cool while the muscles are stretched and warmed up. The warm up may begin at any suitable time, such as after an initial pre-cooling time period of at least about 20 minutes and about 10 or 15 minutes before the event or exercise routine starts.

Specific examples of the invention are described in more detail below. The reader should understand that these specific examples are set forth merely to illustrate examples of the invention, and they should not be construed as limiting the invention.

IV. Exemplar Apparel Configurations

Apparel having Zoned Venting

The figures in this application illustrate various examples of apparel in accordance with this invention. When the same reference number appears in more than one drawing, that reference number is used consistently in this specification and the drawings to refer to the same part or element throughout.

FIG. 1 illustrates an example article of apparel 100 in accordance with one example of this invention for at least partially fitting a torso of a wearer. The article of apparel 100 includes a head or neck opening 102, two arm openings 104, and a waist opening 106, as is conventional and known in the art. While the article of apparel 100 is shown as a short-sleeved athletic jersey, any desired article of apparel style may be used without departing from the invention, including, for example: a long sleeved jersey; a tank top type jersey; a tight, body-fitting article of apparel, such as a track suit, wrestling uniform, or leotard; and the like.

The article of apparel 100 includes a vented zone 108 that extends along a center back portion of the article of apparel structure (i.e., along the article of apparel wearer's spine). The vented zone 108 may be of any suitable or desired size, shape, arrangement, or dimension without departing from the invention, for example, depending on the overall size of the article of apparel 100. In at least some examples, for a center back vented zone like zone 108 shown in FIG. 1, the zone may be at least about 20 in$^2$, and in some examples, it may be at least about 30 in$^2$, or even at least about 40 in$^2$ or 80 in$^2$ or larger. For a generally rectangular vented zone, like that illustrated in FIG. 1, the zone 108 (or at least a portion thereof) in some examples may be 2-6 inches wide (dimension "W" in FIG. 1). In some examples, at least a portion of the vented zone 108 may be from about 2 to about 5 inches wide or from about 3 to about 5 inches wide. In still other more specific examples, men's article of apparels may have an about 4 inch wide center back vented zone 108, and women's article of apparels may have an about 3 inch wide center back vented zone 108.

The overall length (dimension "L" in FIG. 1) of a generally rectangular center back vented zone 108 like that illustrated in FIG. 1 also may vary, for example, depending on the overall size of the article of apparel. As examples, the center back vented zone 108 may extend from proximate to the neck opening 102 in the article of apparel structure 100 to a waist area of the article of apparel structure 100 (i.e., the area where a wearer's waist would be located when the article of apparel 100 is worn), as shown in FIG. 1. In numerical terms, the center back vented zone 108 in at least some examples of the invention may extend at least 10 inches (dimension "L"), or even at least 15 inches or at least 20 inches or more in some examples. "Proximate" to the neck opening 102, as used in this example (and as also generally used in this specification), means having an end within about 3 inches from the neck opening 102. Vented zones terminating or beginning at an opening are considered to be located "proximate to" the opening, for purposes of this specification.

Figure 2:
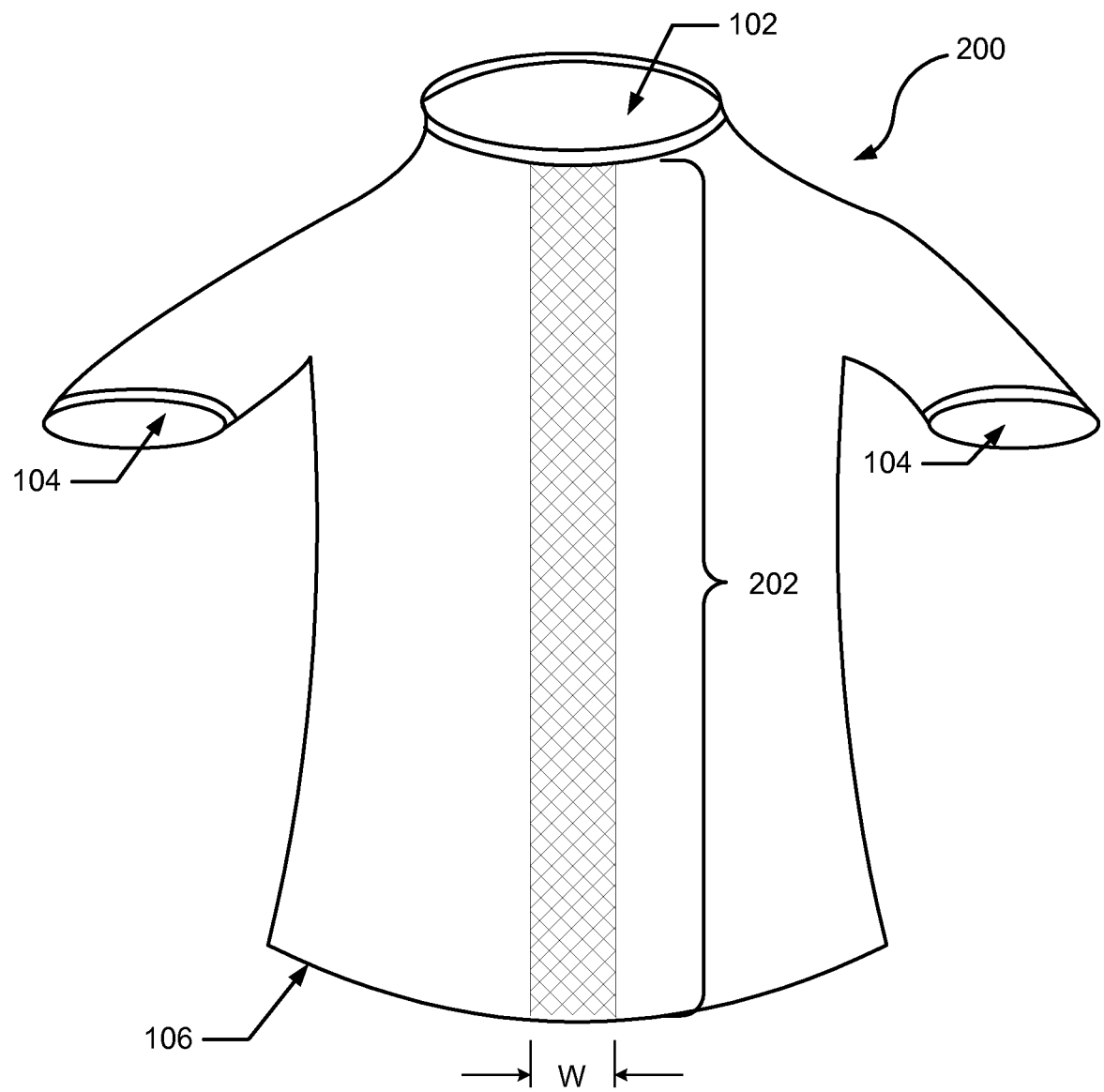
FIG. 2 illustrates another example article of apparel in accordance with the invention having a center back vented zone.

FIG. 2 illustrates another example article of apparel 200 in accordance with some aspects of this invention. In this example, the center back vented zone 202 extends essentially the entire length of the center back of the article of apparel 200, i.e., from at the neck opening 102 (or closely proximate to it) to the waist opening 106 (or closely proximate to it). The term "closely proximate," as used in this example (and as also generally used in this specification), means having an end within about 1 inch from the respective opening in the article of apparel. Vented zones terminating or beginning at an opening are considered to be located "closely proximate to" the opening, for purposes of this specification.

Figure 3:
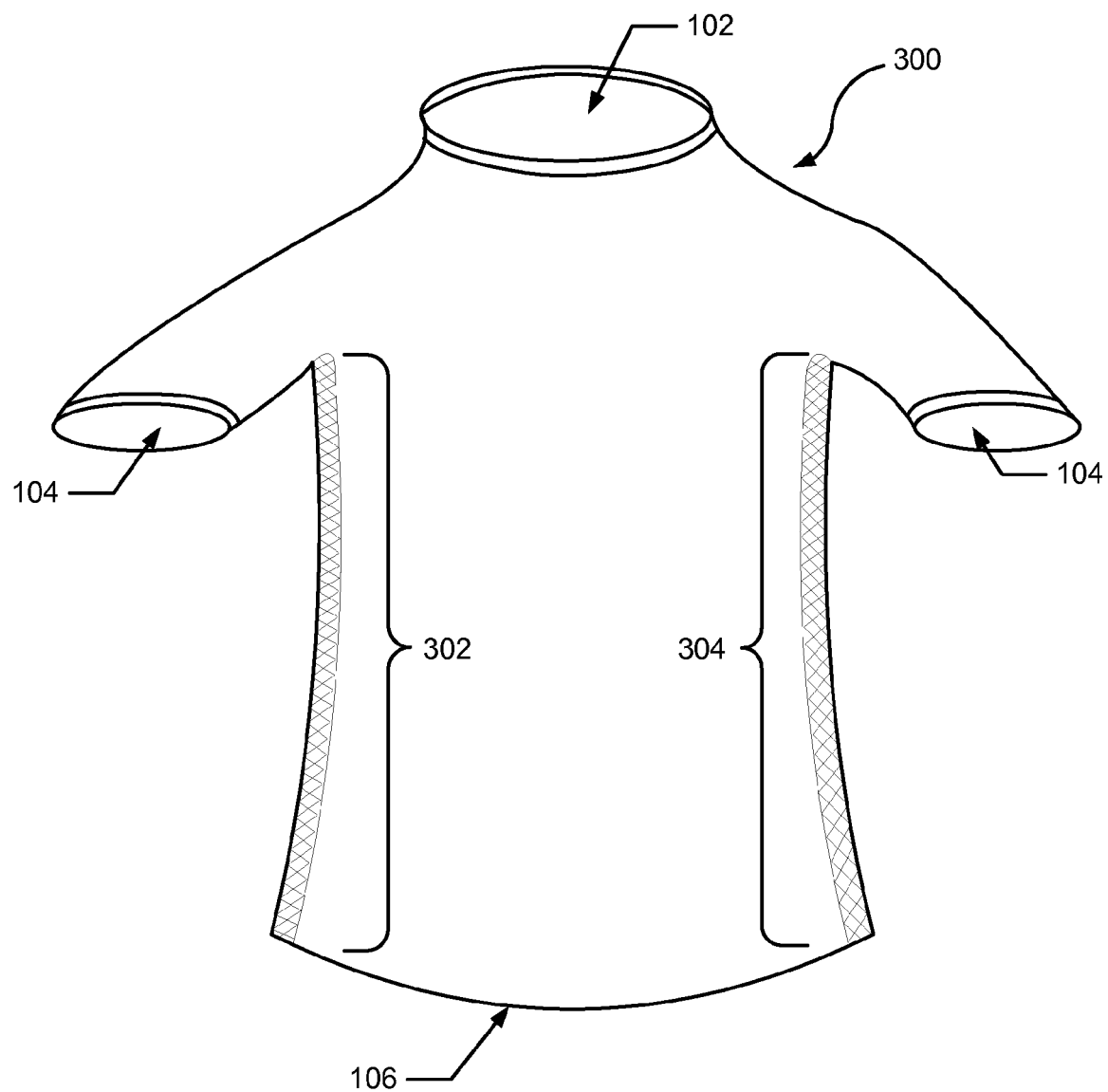
FIG. 3 illustrates an example article of apparel in accordance with the invention having two side vented zones.

Another example of an article of apparel 300 in accordance with at least some aspects of this invention is illustrated in FIG. 3. In this example, the article of apparel 300 includes two vented zones 302 and 304, one zone located beneath each of the article of apparel structure's sleeves and extending toward the article of apparel structure's waist opening 106. For these side vented zones 302 and 304, the various sizes, shapes, arrangements, and dimensions also may vary without departing from the invention, for example, depending on the overall size of the article of apparel. Additionally, the dimensions, size, shape, and arrangement of a side vented zone need not be identical to those of the vented zone on the opposite side of the article of apparel, although the vented zones may be the same without departing from the invention. As some examples, each side vented zone 302 and 304 may be at least about 12 in$^2$, and in some examples, at least about 20 in$^2$ or even at least 30 in$^2$ or more. For generally rectangular shaped vented zones, like those illustrated in FIG. 3, at least a portion of each side vented zone 302 and 304 may be about 2 to about 6 inches wide and extend at least partially down the side portion of the article of apparel 300 (e.g., to be located immediately beneath the user's arms and at the user's sides when wearing the article of apparel 300). In some examples, at least a portion of the side vented zones 302 and 304 may be from about 2 to about 5 inches wide or from about 3 to about 5 inches wide. As still more specific examples, men's article of apparels may have side vented zones 302 and 304 that are about 3 inches wide, and women's article of apparels may have side vented zones 302 and 304 that are about 2.5 inches wide.

The overall length of the side vented zones 302 and 304 also may vary without departing from the invention, for example, depending on the size of the article of apparel. As examples, the side vented zones may extend from proximate to (or closely proximate to) an armpit seam or proximate to (or closely proximate to) an arm opening (e.g., along the article of apparel's sleeves or at an arm opening for a tank top type article of apparel) in the article of apparel structure 300 to a waist area of the article of apparel structure 300. In other examples, each side vented zone 302 and 304 may extend proximate to or closely proximate to a waist opening 106 in the article of apparel structure 300, as illustrated in FIG. 3. For some more specific numeric examples, the side vented zones 302 and 304 may extend at least 6 inches along the side of the article of apparel structure 300, and even at least 10 inches or at least 15 inches in other examples.

Figure 4:
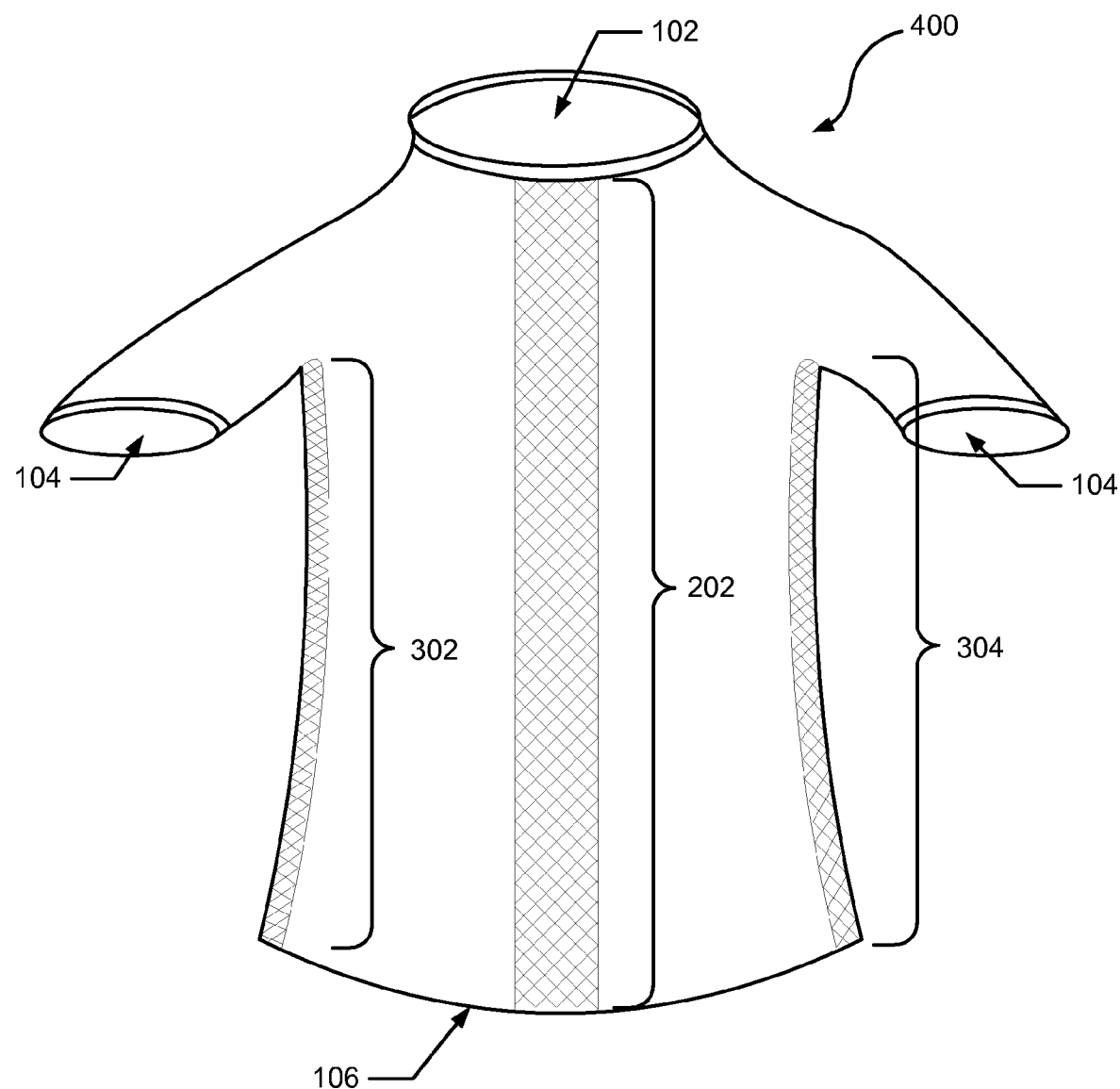
FIG. 4 illustrates an example article of apparel in accordance with the invention having a center back vented zone and two side vented zones.

FIG. 4 illustrates another example article of apparel structure 400. In this illustrated example, the article of apparel structure 400 includes both a center back vented zone 202 and two side vented zones 302 and 304. While the illustrated example article of apparel structure 400 shows the vented zones extending all the way or closely proximate to the waist opening 106, the various vented zones 202, 302, and 304 can take on any suitable dimensions, size, arrangement, and shape without departing from the invention, including, for example, the various dimensions, sizes, arrangements, and shapes described above. As some more specific examples, one or more of the vented zones 202, 302, and 304 could end generally in the waist area of the article of apparel structure 400 (rather than at or proximate to the waist opening 106), one or both of the side vented zones 302 and 304 could extend all the way to the arm openings 104, or the like.

Figure 5:
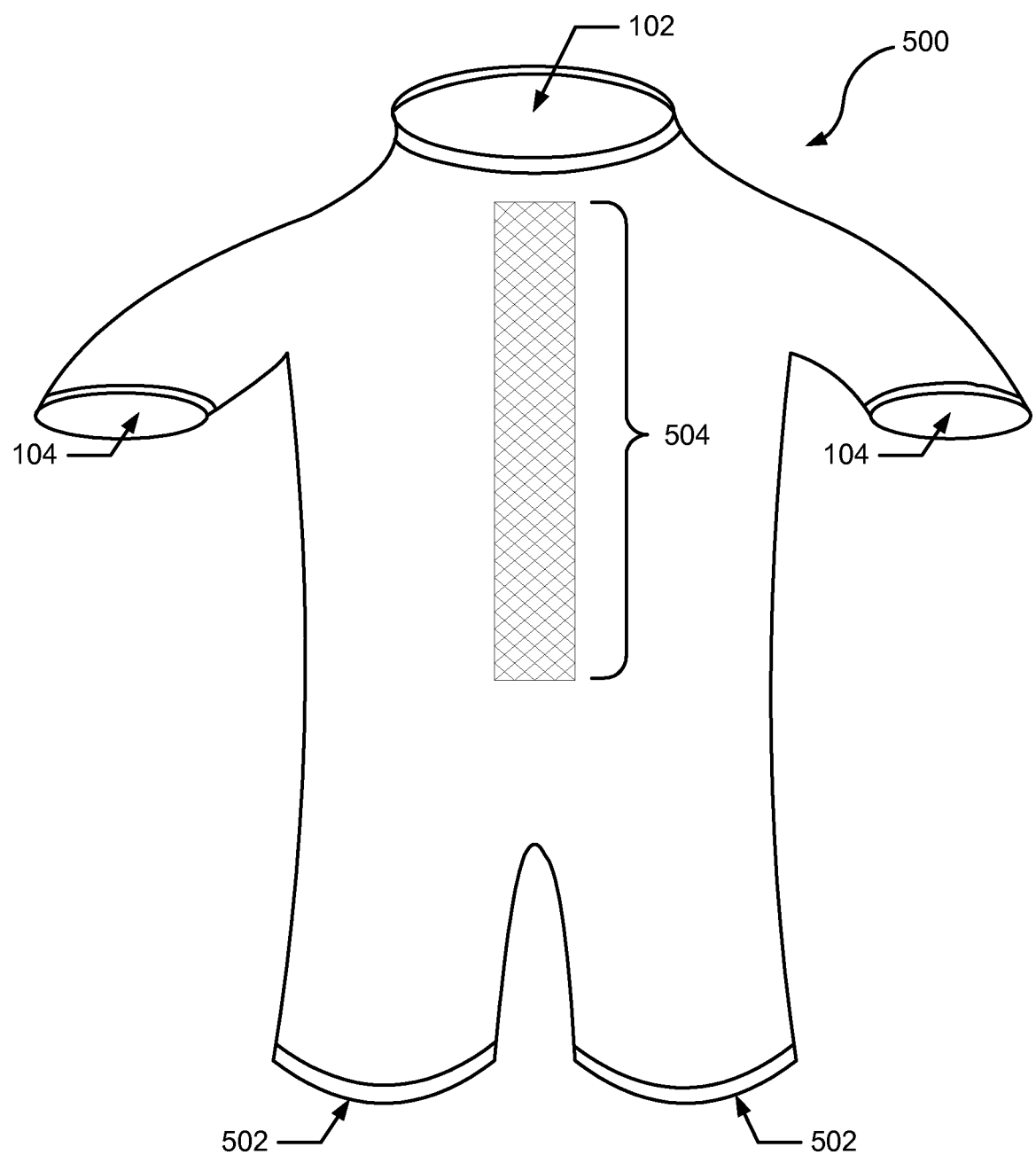
FIG. 5 illustrates another example article of apparel in accordance with the invention having a center back vented zone.

Aspects of this invention are not limited to use with jerseys, tank tops, and other article of apparels for covering only the torso of a wearer. FIG. 5 illustrates another example article of apparel structure 500 in which aspects of the invention may be used. In FIG. 5, the article of apparel 500 is a leotard or track suit type article of apparel that at least partially covers both the wearer's torso, waist and upper leg areas. As illustrated, this example article of apparel structure 500 includes a neck or head opening 102, two arm openings 104, and two leg openings 502. In this example, the article of apparel structure 500 includes a single center back vented zone 504 that extends from proximate to the neck opening 102 down to the waist area of the article of apparel structure 500. The vented zone 504 may take on any desired size, shape, dimensions, and arrangement, including the various sizes, shapes, dimensions, and arrangements described above in conjunction with FIGS. 1, 2, and 4.

Figure 6:
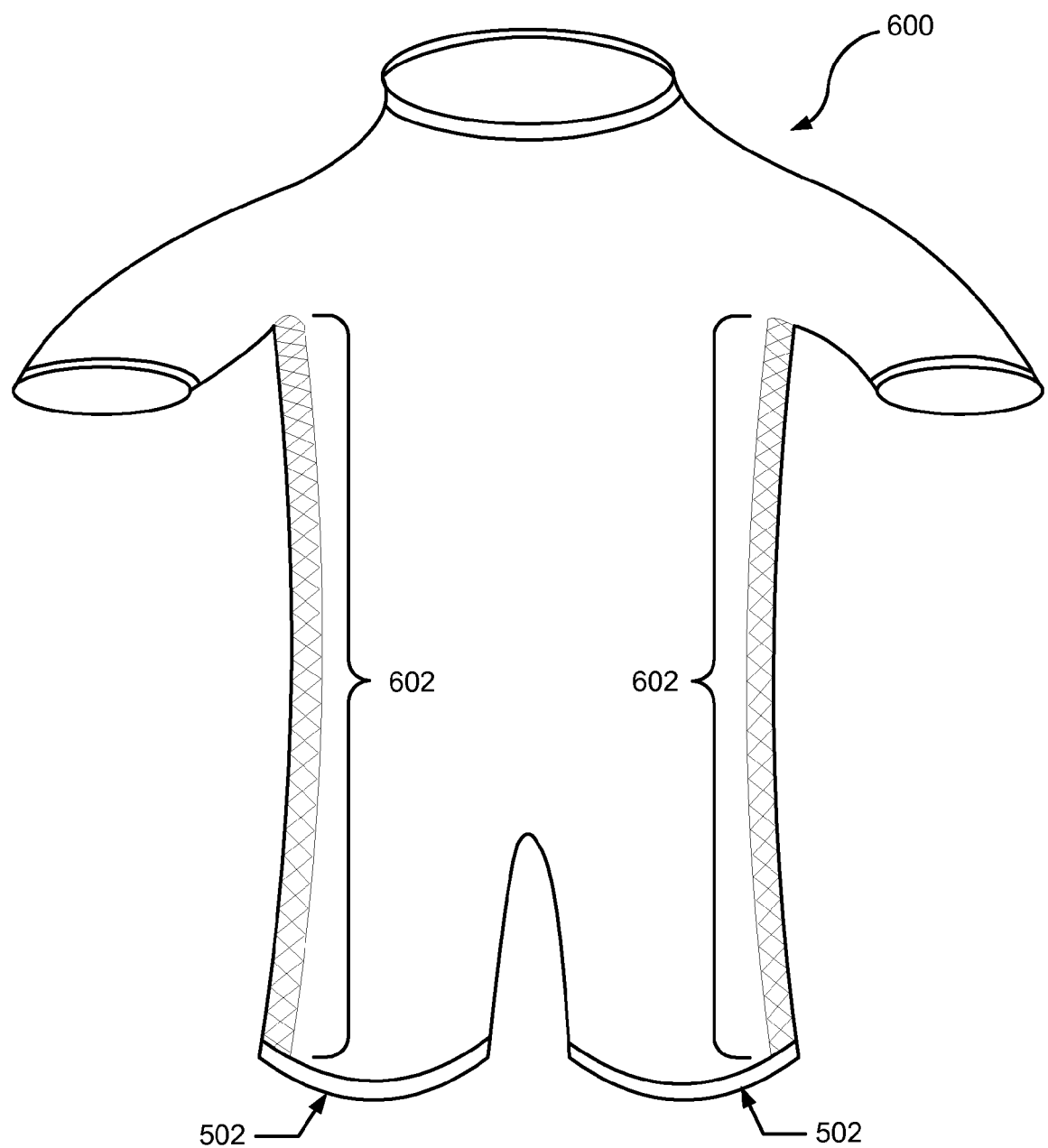
FIG. 6 illustrates another example article of apparel in accordance with the invention having two side vented zones.

FIG. 6 illustrates another example leotard or track suit type article of apparel structure 600 in accordance with aspects of this invention. In this example, rather than a center back vented zone, vented zones 602 are provided along each side of the article of apparel structure 600. While in the illustrated example each side vented zone 602 extends all the way down and closely proximate to leg opening 502, any suitable or desired size, shape, arrangement, and dimensions may be used for the side vented zones 602, including the various sizes, shapes, arrangements, and dimensions described above in conjunction with FIGS. 3-4.

Figure 7:
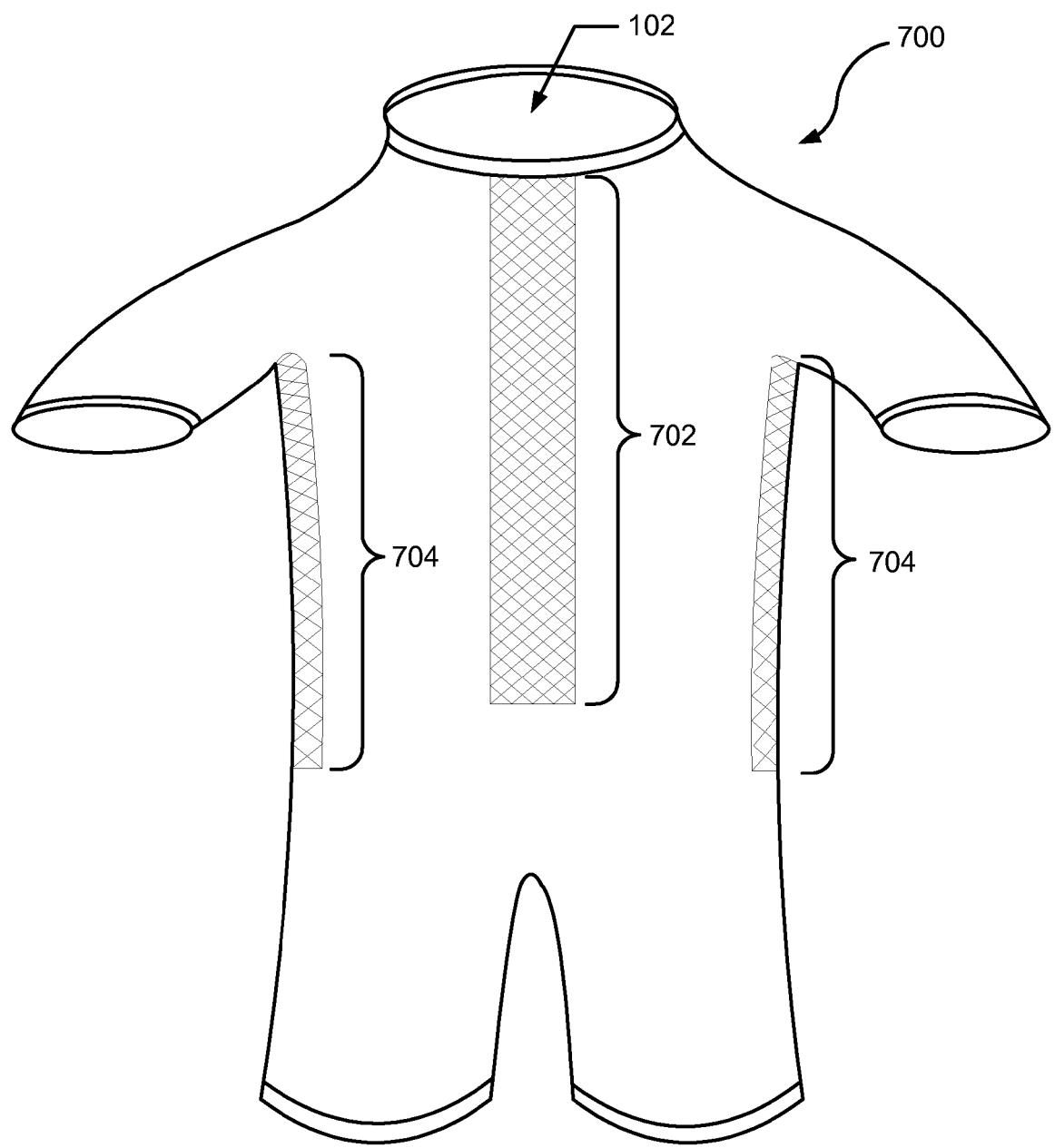
FIG. 7 illustrates another example article of apparel in accordance with the invention having a center back vented zone and two side vented zones.

FIG. 7 illustrates another example leotard or track suit type article of apparel structure 700 in accordance with some examples of this invention. In this example, the article of apparel structure 700 includes a center back vented zone 702 and two side vented zones 704. The example illustrated in FIG. 7 illustrates various other dimensions and arrangements of the vented zones 702 and 704 within the article of apparel structure 700. For example, in the structure 700 of FIG. 7, the center back vented zone 702 extends substantially all the way or closely proximate to the neck opening 102 in the article of apparel structure 700. The side vented zones 704 and the center back vented zone 702 in this example all terminate at their lower ends in the waist area of the article of apparel structure 700. Of course, any suitable or desired size, shape, arrangement, and dimensions may be used for the various vented zones 702 and 704 without departing from the invention, including the various sizes, shapes, arrangements, and dimensions described above in conjunction with FIGS. 1-6.

Figure 8:
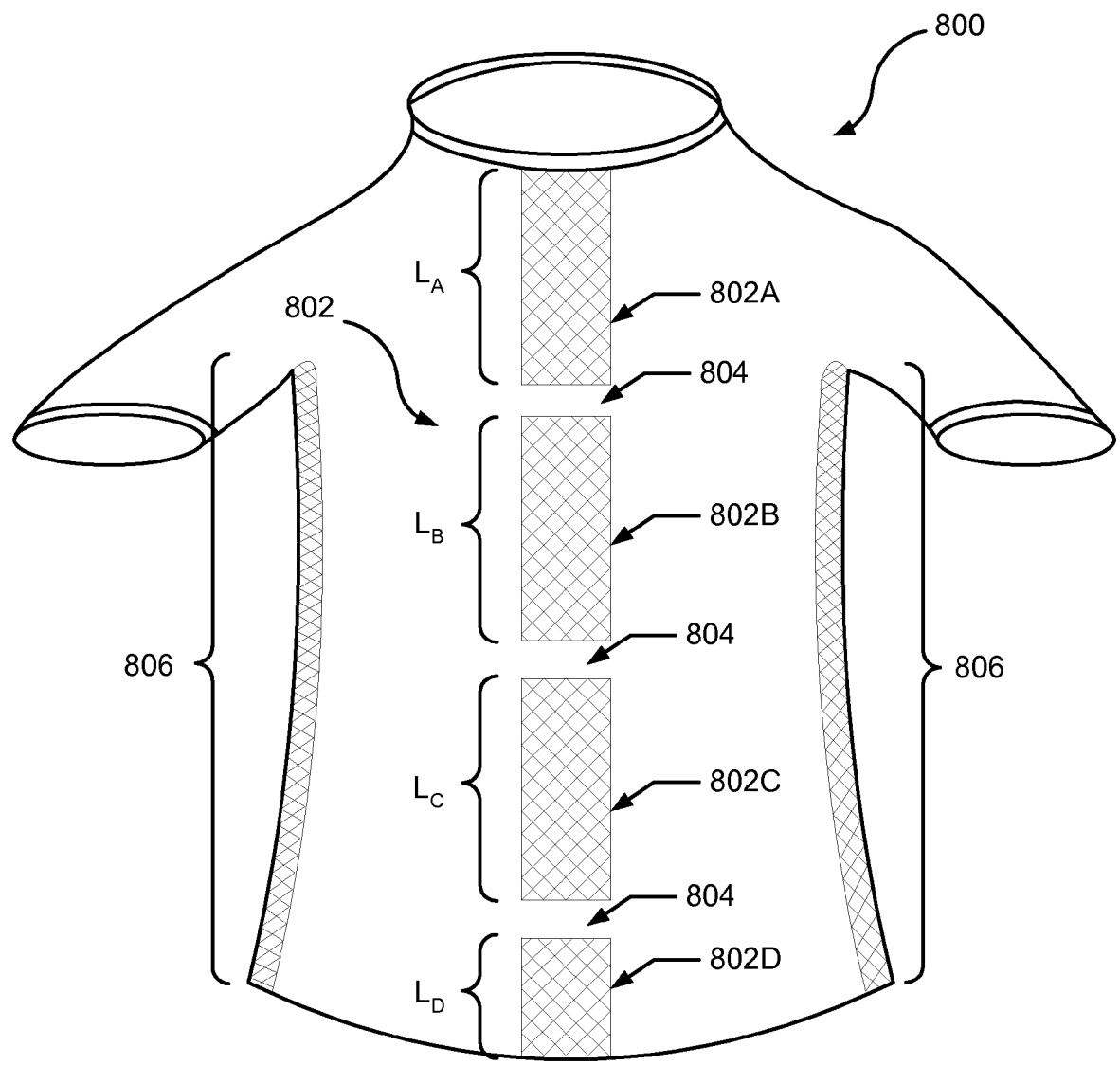
FIG. 8 illustrates an example article of apparel in accordance with the invention in which one vented zone is discontinuous.

The various vented zones in an article of apparel structure (e.g., the center back vented zone and/or one or more the side vented zones) also may be continuous or discontinuous, for example, over their width and/or length and/or other dimensions, without departing from the invention. FIG. 8 illustrates an example article of apparel structure 800 in which the center back vented zone 802 is discontinuous over its length, but the side vented zones 806 are continuous over their lengths. As illustrated, vented zone 802 is made up of four distinct vented zone regions, namely regions 802A, 802B, 802C, and 802D, wherein the material of the remainder of the article of apparel (e.g., material having an air permeability less than 600 ft$^3$/minute/ft$^2$) is provided between the vented zone regions 802A, 802B, 802C, and 802D (i.e., in the regions labeled 804). Any number of vented zone regions may be included in an article of apparel structure without departing from the invention. In at least some examples, the overall length of the vented zone 802, which corresponds to the sum of the lengths of the vented zone regions 802A through 802D (i.e., $L_A + L_B + L_C + L_D$), may be at least 10 inches, or even at least 15 inches or at least 20 inches or more in some examples. Alternatively, in at least some examples, any one or more individual vented zone region 802A through 802D may be at least 10 inches long, or at least 15 or 20 inches long without departing from the invention.

Figure 9:
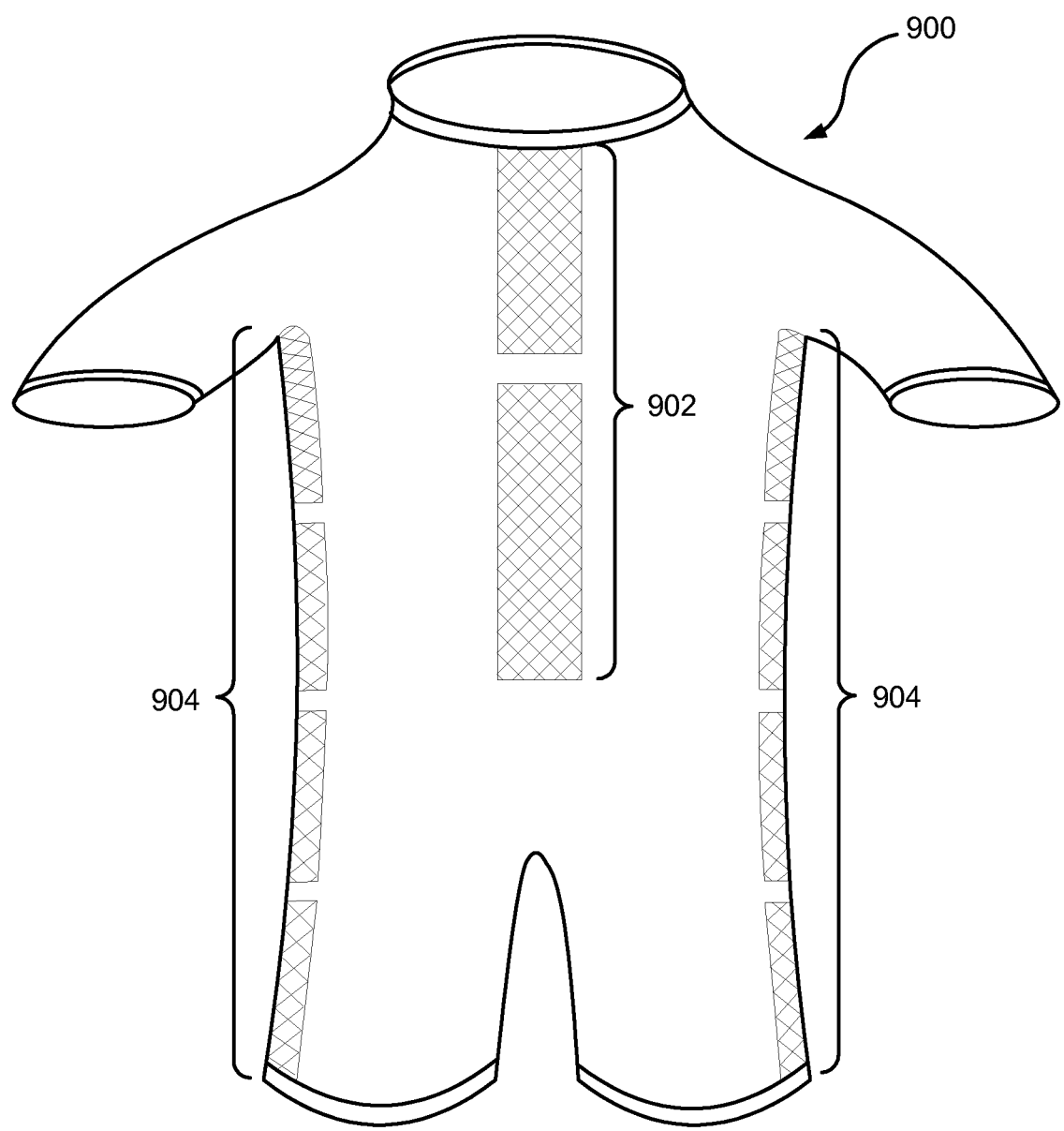
FIG. 9 illustrates an example article of apparel in accordance with the invention in which all of the vented zones are discontinuous.

FIG. 9 illustrates another example of an article of apparel structure 900 of the leotard or track suit type in which all of the illustrated vented zones are discontinuous. Specifically, in this example, both the center back vented zone 902 and the side vented zones 904 are discontinuous and composed of a plurality of vented zone regions. The size, shape, arrangement, and dimensions of the various vented zones 902 and 904 and their associated vented zone regions can vary widely, including, for example, in the various manners described above in conjunction with FIGS. 1-8.

Article of apparels in accordance with aspects of the present invention may be made from any desired material without departing from the invention, including from conventional materials known to those skilled in the art. In at least some examples of the invention, the fabric material forming the vented zone(s) may be a mesh type material or a material formed to include mesh openings, while the fabric material making up the other portions of the article of apparel may be a non-mesh material (or not processed to include mesh openings and/or containing fewer mesh openings). The article of apparel portions other than the portions including the vented zones, in at least some examples of the invention, may make up a majority of the article of apparel structure and/or may cover a majority of the torso and/or the lower torso of the wearer.

As mentioned above, the entire article of apparel may be made from a single type of material (and even from a single piece of material), in at least some examples of the invention, but the material provided in the vented zones of the article of apparel may be processed or otherwise altered in some manner to increase its air permeability (and thereby provide the vented zone). Such processing may include, for example: laser treatments (to perforate the material and/or provide a mesh structure); calendaring, rolling, and/or other physical treatments to perforate the material and/or provide a mesh structure; stretching the fabric and/or weave (to increase inter-fiber distance); and the like. Additionally or alternatively, in some examples, the entire article of apparel may be made from a single type of material, but material provided in the portions of the article of apparel not including the vented zones may be processed or otherwise altered in some manner to reduce its air permeability (e.g., by heat treatment to reduce inter-fiber distance in the weave, by applying a second layer or ply, and the like). As still another alternative, different types of weaves and/or yarn or fiber thicknesses may be used in the various regions of the article of apparel structure to provide the vented regions and/or the less air permeable regions. The processing or other activity to alter the air permeability of at least some portion of the article of apparel, if any, may take place either before or after the actual article of apparel structure is formed (e.g., sewn together) without departing from the invention.

In still other examples, article of apparels in accordance with the invention may be made such that different types of material (and/or different pieces of material) make up the various portions of the article of apparel structure. Such pieces of material may be sewn together and/or otherwise joined together to form an article of apparel structure in any suitable or desired manner without departing from the invention, including in conventional manners known in the art. Any desired number of different types of materials and/or materials having different air permeability characteristics may be included in article of apparels without departing from the invention. Additionally, if desired, the materials used for creating the various vented zones may be the same or different within a single article of apparel, and, if desired, the different vented zones may have different air permeability characteristics with respect to one another within a single article of apparel.

Examples of suitable materials for the article of apparels in accordance with the invention include both natural and synthetic materials and mixtures thereof. More specific examples of suitable natural materials include: leathers, cotton materials, wool materials, silk materials, and the like. More specific examples of synthetic materials include: polyesters, vinyls, nylons, rubbers, spandex, polyester microfibers, polyester microfiber cotton blends, polyester microfiber cotton spandex blends, and the like. In some examples, article of apparels in accordance with the invention may include peppermint coated or infused fabric or fibers, as described in more detail below.

Additional aspects of the invention relate to methods for forming article of apparels like those described above. Such methods may include, for example: (a) providing a first article of apparel portion formed of a fabric material, wherein the first article of apparel portion has an air permeability of less than 550 ft$^3$/min per ft$^2$; (b) providing a second article of apparel portion including a first vented zone, wherein a material forming the first vented zone has an air permeability of at least 550 ft$^3$/min per ft$^2$; and (c) forming an article of apparel structure including at least the first article of apparel portion and the second article of apparel portion, wherein the first vented zone extends along a center back portion of the article of apparel structure or along a side portion of the article of apparel structure. Optionally, as described above, vented zones, like those described above, may be provided in the center back portion, along one side, and/or along both sides of the article of apparel structure without departing from the invention. Alternatively, article of apparels may be formed for covering other portions of the body and/or the vented zones may be provided at locations other than and/or in addition to the article of apparel's back center or sides.

The various method steps described above may take place in any order without departing from the invention. For example, as mentioned above, the article of apparel may be formed first (e.g., from a single type of fabric material), and then the vented zone or zones may be provided (at the appropriate desired location(s)) by increasing the air permeability of the fabric at the vented zone location (e.g., by perforating the fabric, by laser treatment, by creating a mesh structure, by eliminating a layer or ply of material, by stretching the fabric, or in any other suitable or desired manner). As another option, two different article of apparel portions (having different air permeabilities, and optionally formed of different types of materials) may be provided and then the article of apparel structure may be formed in any suitable or desired manner, for example, by sewing the article of apparels portions together (optionally with an intervening fabric between the two article of apparel portions), or in any other conventional manner.

The vented zones also may take on any suitable or desired color or shape without departing from the invention. As examples, the article of apparel portion(s) including the vented zones may be made a different color from the article of apparel portions having a lower air permeability, and indeed the various vented zones may be differently colored from one another. As another example, there is no need to make the vented zones in a rectangular shape as illustrated in FIGS. 1-9, but rather, the vented zones may be round, oval, elliptical, or any other desired shape without departing from the invention. Different shapes may be used in a single article of apparel or in a single vented zone. If desired, the vented zones themselves and/or discontinuities in the vented zone structures may be used, for example, to form or partially form printed information, logos, trademarks, designs, and the like in the article of apparel structure. Any type of information or design may be included or formed by the vented zones and discontinuities in the vented zones without departing from this invention.

Pre-Cooling and Body Temperature Regulation and Reduction

Additional aspects of the invention relate to apparel and/or equipment technology that may be pre-wetted and used, e.g., in a predetermined protocol, prior to, during, and/or after an athletic event or exercise routine, in an effort to cool the athlete's body and/or regulate or reduce the body's temperature. Such pre-cooling and/or temperature maintenance and reduction efforts may help slow the rise of the body's core temperature before and during the event or exercise, and also reduce the temperature after the event or exercise, using both evaporative and conductive cooling processes (e.g., evaporative cooling like the sweating process described above, and conductive cooling when the pre-wetted article of apparel or equipment may be used as a medium to conduct heat from the warm skin to the cooler air, thereby leaving the body cooler).

In at least some examples of the invention, at least some portion of an athlete's apparel or equipment may be pre-wetted with water (or another desired liquid) before the event or exercise begins, and this pre-wetted apparel or equipment then may be worn by the athlete. Therefore, when the wetted apparel or equipment is donned by the athlete, the athlete's core body temperature has not yet risen as a result of the physical exertion associated with the event or exercise, and the sweating response (in at least some instances) has not yet been triggered. While not wishing to be bound by any particular theory or method of operation, it is believed that wearing the article of apparel or equipment in a pre-wetted condition before the event or exercise begins will cool the outer layer of the athlete's body and the blood contained in that layer. Once the event or exercise starts (the athlete optionally may remove all or part of the pre-wetted article of apparel during the event or exercise, if desired), increased blood circulation moves warmer blood from the body's core to the cooler outer body layer, and the continuing circulation moves cooler blood from the body's outer layer to its core. This action has been shown to contribute to a slower rise in core body temperature during the event or exercise. After the event or exercise, the wetted apparel or equipment (or another piece of wetted apparel or equipment and/or a rewetted piece of apparel or equipment) may be used (re-donned, if necessary) to speed up cooling of the body, which results in a faster drop in the core body temperature. This procedure, while effective and useful, is not recommended as a method of choice for the medical treatment of hyperthermia.

Any suitable or desired piece of apparel, article of apparel, or equipment may be pre-wet and used in methods according to examples of the invention. For example, in at least some instances, a piece of apparel having zoned venting, like those described above in conjunction with FIGS. 1-9, may be pre-wet and used in the various example pre-event or exercise cooling protocols (as will be described in more detail below). As another example, a piece of pre-wetted apparel or equipment may be used for pre-event or routine cooling, doffed immediately prior to the event or exercise routine, and then a piece of apparel having zoned venting like that described above, can be donned for the actual event or exercise. Optionally, if desired, an article of apparel having zoned venting can be worn under the pre-wetted piece of apparel or equipment such that this article of apparel will remain when the pre-wetted article of apparel is doffed for the event or routine.

While various pre-event or routine body cooling protocols may be used in accordance with examples of the invention, some more specific examples of suitable protocols follow. In at least some examples, a piece of apparel or other equipment in accordance with aspects of this invention may be pre-wet with a predetermined amount of water, e.g., using at least about 0.5 ml of water per gram of dry fabric. In some examples, article of apparels or other equipment in accordance with aspects of the present invention may be sold in or with a water-tight container, optionally in a pre-wetted condition. The volume of water needed to pre-wet the apparel or equipment may vary, e.g., depending on the material type; the apparel size, configuration, or style; the degree of wetness desired; ambient temperature; the type or length of event or routine; etc.

In one pre-event or pre-exercise cooling protocol, the pre-wetted apparel or equipment initially may be donned by the athlete some time prior to the start of the event or exercise routine, e.g., at least 20 minutes before the event or exercise routine is to start, and in some examples at least 25, 30, or even 40 minutes before the event or exercise routine is to start. As part of this example pre-event or exercise cooling protocol, the athlete then will stay in the coolest environment reasonably available (e.g., in the shade, in the locker room, in air-conditioning, near a fan or other cooling device, and the like) for at least about 20 minutes, while resting and/or with minimal physical activity, to support maximum pre-event cooling. If necessary or desired, the apparel or equipment may be re-wet as needed during this pre-event cooling time period.

As the start of the event approaches, the athlete may need or desire a warm-up time period. If a warm-up is desired, the athlete may start the warm-up (e.g., a light warm up) about 20 minutes or less, and in some examples, about 10 minutes or 15 minutes or less, before the event or exercise routine is to begin. In at least some examples, the pre-wetted apparel or equipment may continue to be worn during this warm-up period. In this manner, when the athlete begins the event or exercise, he or she will be stretched and warmed up, but the body still will be somewhat cooler than would be the case without this pre-cooling regimen.

During the event or exercise routine, in at least some examples, the athlete may wear the pre-wetted apparel or equipment, if desired or allowed by the rules of the competition. Doing so may help further reduce the rate-of-rise in the athlete's core body temperature during the physical exertion associated with the event or exercise. Additionally, as noted above, a pre-wetted piece of apparel or equipment also may be worn after the event or exercise routine, to enhance cooling. Alternatively, in some examples, a portion of the wetted piece of apparel or equipment may be removed for the event or routine, such as sleeves, pant legs, and the like.

A piece of apparel used in accordance with these aspects of the invention may be made from any desired natural, synthetic, or blended materials or combinations thereof, in any desired configuration, style, or combination, optionally with the vented zones as described above in conjunction with FIGS. 1-9. As examples, the piece of apparel may be a T-shirt, jersey, pants, or track suit type article of apparel (like those described above), of any desired size, optionally sleeveless, short-sleeved, long-sleeved, with removable sleeves, with removable pant legs, etc. In at least some examples of the invention, the apparel product for the pre-wetting protocol (optionally including the vented zones as described above) may be constructed from high-performance sweat management materials (e.g., like thin, lightweight fabrics made from or containing polyester microfibers, polyester microfiber cotton blends, polyester microfiber cotton spandex blends, polyester spandex blends, and the like) optionally, materials that have been infused with peppermint (e.g., materials including peppermint microcapsules in or adhered to at least some fibers making up the material, materials exposed to or coated with peppermint oil, materials having peppermint microcapsules or oil applied to the fibers via a binder or textile finish, or the like). Studies indicate that peppermint infused fabrics may help decrease an athlete's perception of how hard he/she is working, reduce fatigue, boost mood, and/or increase alertness. In some more specific examples, apparel in accordance with various aspects of this invention may be made from or include a "Sphere Dry" polyester knit material and/or a Dri-FIT polyester material, as included in various commercial products available from NIKE, Inc., of Beaverton, Oreg. Optionally, the Sphere Dry and/or Dri-FIT materials (or other materials, equipment, etc.) may be infused or coated with peppermint microcapsules or peppermint oil in any suitable or desired manner (e.g., bound to the fabric and/or applied as a fabric or textile finish). Suitable peppermint microcapsules and/or peppermint oil are known in the art and commercially available, e.g., from International Flavors & Fragrances ("IFF").

Of course, variations and modifications of the pre-event or pre-exercise cooling protocol may be used without departing from the invention. For example, a limited amount of water may be used for the pre-wetting process, to avoid overly saturating the pre-wetted article of apparel or equipment. As examples, for a T-shirt or jersey type article of apparel, the article of apparel may be pre-wet with 0.5 ml to 3 ml of water per gram of material in the piece of apparel (when dry). In some examples, the pre-wetting water amount may be about 0.8 to 1.5 ml of water per gram of dry material, and about 1 ml/g, in at least some examples. The various time periods described in the protocol above (e.g., the pre-event rest and cooling time period, the warm-up time period, and any desired post-event cool down time period) may vary widely, depending, for example, on athlete preference, the type of event or workout, the length of the event or workout, the ambient temperature, the energy expended during the event or workout, and the like.

Figure 10A:
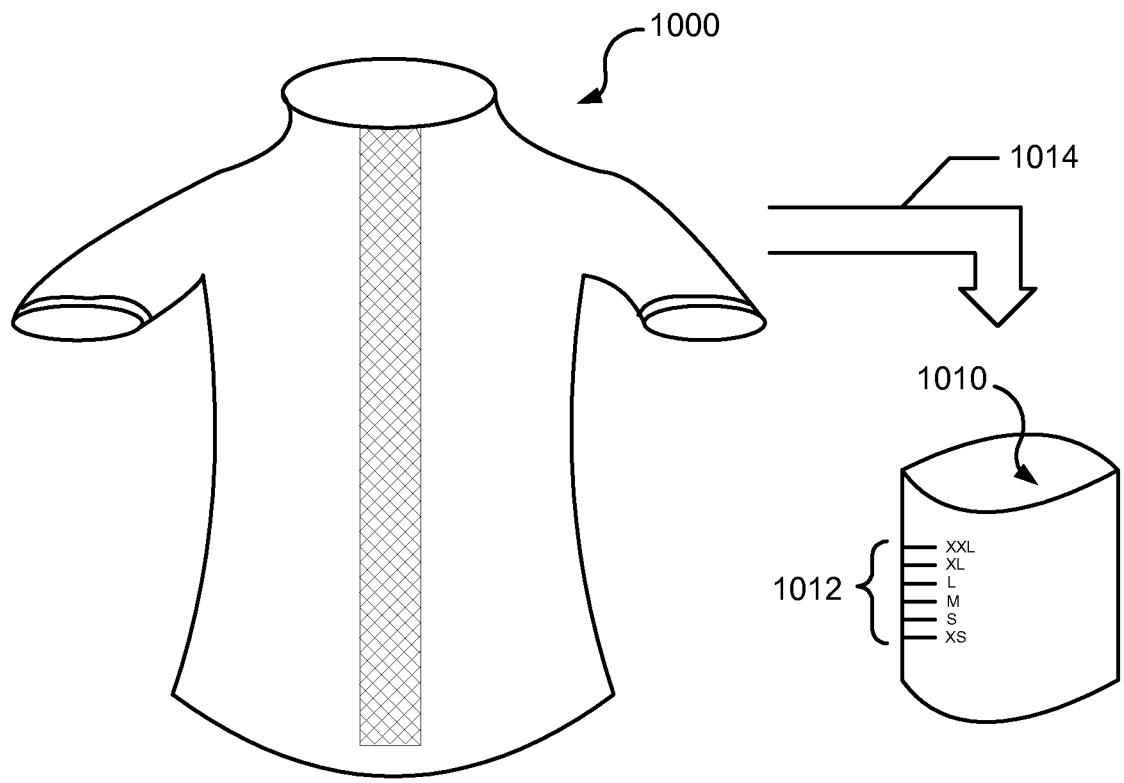
FIGS. 10A and 10B illustrate example protocols, methods, and/or packaging useful for pre-wetting an article of apparel or other athletic equipment in accordance with at least some aspects of this invention.

As shown in FIG. 10A, in at least some instances, apparel or equipment 1000 used for pre-wetting protocols in accordance with aspects of the invention may include a container 1010 used for the pre-wetting process. The container 1010 may take on any suitable form, such as a bag, a plastic tube and cover assembly, and the like. The example illustrated in FIG. 10A shows a container 1010 in the form of a plastic or fabric bag, optionally a transparent bag that is recyclable and/or made from recycled material. In at least some examples, the container 1010 may be made of a material that can dry easily (e.g., does not substantially absorb or retain water) and one that is resistant to growth of mold, bacteria, and the like (or is treated to resist such growth). In some examples, the container 1010 may include markings, gradations, or other indicia 1012 thereon, e.g., akin to markings on a measuring cup, to indicate an appropriate amount of water to add into the container 1010 for apparel wetting purposes, e.g., for various article of apparel 1000 sizes and/or characteristics. Any suitable style of indicia 1012, form or mechanism for including the indicia 1012, or information may be included in the indicia 1012 without departing from the invention. As another example, the container 1010's size may be selected, e.g., based on the associated article of apparel's size and/or other characteristics (such as material type), such that when the article of apparel 1000 is placed in the container 1010, the container 1010 then may be filled or substantially filled with water, to thereby provide the appropriate water amount and pre-wetting level.

Figure 10B:
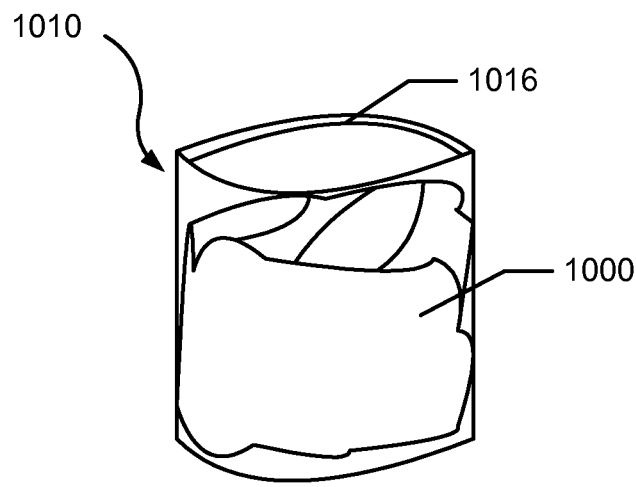

In use, water is added to the container 1010 to the appropriate level for the article of apparel 1000 size, and the article of apparel 1000 is placed in the container 1010 as shown by the arrow 1014 in FIG. 10A and as illustrated in FIG. 10B. Alternatively, the article of apparel 1000 may be placed in the container 1010 and the water then added, as mentioned above. The container 1010 then may be closed and/or sealed in any appropriate manner (e.g., using a cover, a water tight zip-type seal 1016, by hand, etc.) if desired, and container 1010 and article of apparel 1000 may be squeezed, shaken, and otherwise handled as needed to appropriately and uniformly wet the article of apparel 1000. The article of apparel 1000 then can be removed from the container 1010 and donned by the athlete, and the pre-event cooling time period may begin. Container 1010 (and this procedure) can be used repeatedly by the athlete, e.g., for numerous events or exercise outings, repeatedly over long events or outings, etc.

Optionally, if desired, in at least some instances, pieces of apparel and other equipment in accordance with the invention may be packaged for sale, distribution, and/or use in or along with a container like that illustrated in FIGS. 10A and 10B. Optionally, in at least some instances, the apparel or equipment may be packaged for sale, distribution and/or use in a container along with water or other liquid, in a pre-wetted condition.

V. Apparel with A Modifiable Textile Structures

The various article of apparels 100, 200, 300, 400, 500, 600, 700, 800, 900, and 1000 disclosed above incorporate a mesh material in specific zones. A variety of other materials may also be suitable for the various article of apparels 100, 200, 300, 400, 500, 600, 700, 800, 900, and 1000. With reference to FIG. 4, for example, article of apparel 400 includes center back vented zone 202 and side vented zones 302 and 304, which are formed from a mesh or otherwise air-permeable material. More particularly, center back vented zone 202 and side vented zones 302 and 304 are formed of a material that is more air permeable than other portions of article of apparel 400.

The enhanced cooling effect imparted by center back vented zone 202 and side vented zones 302 and 304 is beneficial when the athlete's body has an elevated temperature, for example. The enhanced cooling effect may be less beneficial, however, when the athlete's body is at a resting temperature, for example. Accordingly, the degree of air permeability in areas of article of apparel 400 corresponding with the back and sides that is beneficial may change in relation to the athlete's body temperature. As discussed in the following material, various textile structures that change or are otherwise modified by a physical stimulus, such as the presence of water or a temperature change, may be incorporated into any of article of apparels 100, 200, 300, 400, 500, 600, 700, 800, 900, and 1000.

VI. Exemplar Modifiable Textile Structures

Figure 11:
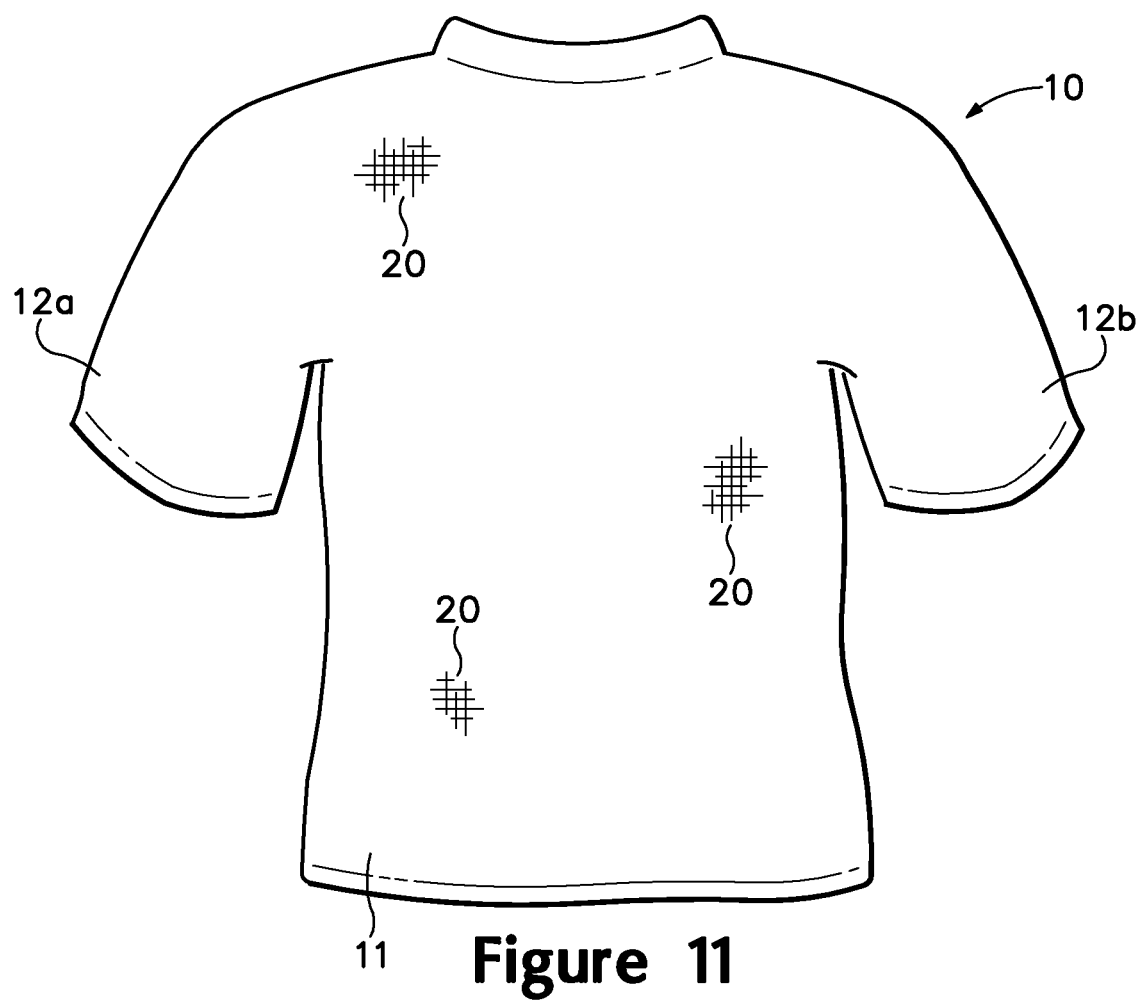
FIG. 11 is a plan view of an article of apparel incorporating a first textile structure in accordance with the present invention.

An article of apparel 10 is depicted in FIG. 11 as having the general configuration of a conventional short-sleeved shirt. One skilled in the relevant art will recognize, however, that the various textiles disclosed in the following material may be incorporated into articles of apparel exhibiting a variety of configurations, including long-sleeved shirts, headwear, coats, jackets, pants, underwear, gloves, socks, and footwear, for example. Accordingly, the various concepts disclosed in the following discussion and accompanying figures with respect to apparel 10 may be utilized in connection with a variety of apparel configurations.

The primary elements of apparel 10 include a torso portion 11 and two arm portions 12a and 12b. Torso portion 11 corresponds with a torso of an individual and, therefore, covers the torso when worn. Similarly, arm portions 12a and 12b respectively correspond with a right arm and a left arm of the individual and cover the arms when worn. Apparel 10 exhibits, therefore, the general configuration of a conventional long-sleeved shirt. In contrast with the conventional long-sleeved shirt, however, apparel 10 is at least partially formed from a textile with a structure that is modified by a physical stimulus, thereby changing properties of the textile. For example, the permeability or texture of the textiles may change when exposed to water, increased temperature, or moving air (i.e., wind). Accordingly, the structures of the textiles may be modified in order to provide apparel 10 with different properties. The following material discloses a variety of textiles with a structure that is modified by a physical stimulus in order to change the properties of the textile or apparel 10.

First Textile Structure

Figure 12:
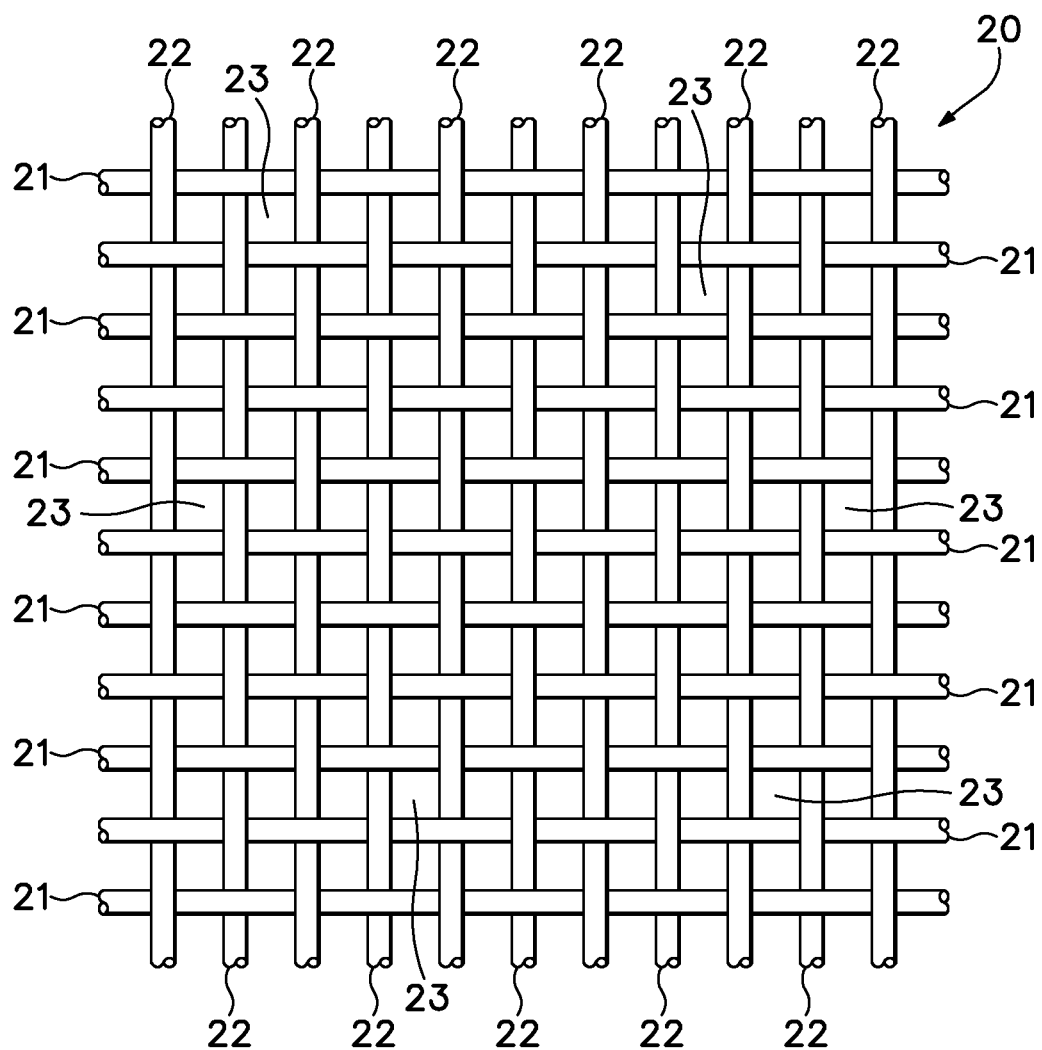
FIG. 12 is a plan view of a portion of the first textile structure in an unexposed state.
Figure 13:
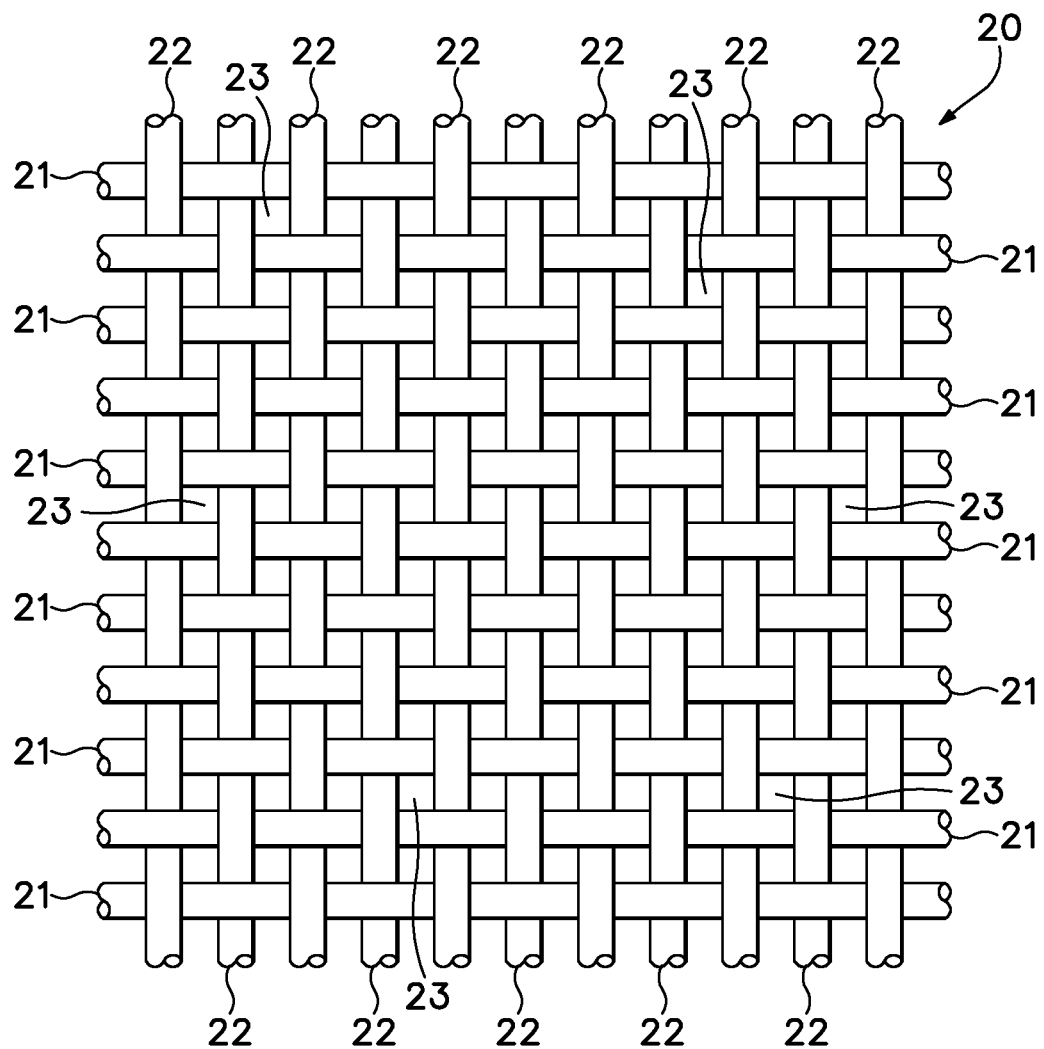
FIG. 13 is a plan view of the portion of the first textile structure in an exposed state.

A portion of a textile 20 that is suitable for apparel 10 is disclosed in FIGS. 12 and 13. Textile 20 has the structure of an interwoven material that includes a plurality of weft yarns 21 and a plurality of warp yarns 22. Textile 20 may be formed, therefore, by mechanically-manipulating yarns 21 and 22 thorough an interweaving process, which involves crossing and interweaving yarns 21 and 22 at substantially right angles to each other. The process of crossing and interweaving yarns 21 and 22 at substantially right angles to each other forms a plurality of discrete openings 23 that are located between the various yarns 21 and 22.

Each of yarns 21 and 22 are formed from one or more filaments or fibers that experience a dimensional transformation when exposed to a specific physical stimulus. In other words, the dimensions (i.e., length and thickness, for example) of yarns 21 and 22 change when textile 20 is in the presence of the physical stimulus. The dimensional transformation of yarns 21 and 22 has an effect upon the structure of textile 20. More particularly, the dimensional transformation of yarns 21 and 22 modifies the structure of textile 20, thereby changing the properties of textile 20. Accordingly, exposing textile 20 to the physical stimulus has the effect of changing the properties of textile 20, thereby changing the properties of apparel 10.

The manner in which exposing textile 20 to a physical stimulus has an effect upon the properties of textile 20 will now be discussed. With reference to FIG. 12, textile 20 is depicted in an unexposed state, in which yarns 21 and 22 are not exposed to the physical stimulus. With reference to FIG. 13, however, textile 20 is depicted in an exposed state, in which yarns 21 and 22 are exposed to the physical stimulus. In the unexposed state, yarns 21 and 22 exhibit dimensions with a relatively narrow thickness such that the area of each opening 23 is relatively large. In the exposed state, however, yarns 21 and 22 exhibit a greater thickness, which decreases the area of each opening 23. That is, exposing yarns 21 and 22 to the physical stimulus causes yarns 21 and 22 to increase in thickness, which decreases the area of each opening 23 and modifies the structure of textile 20.

The modification in the structure of textile 20 (i.e., decreasing the area of openings 23) changes the properties of textile 20. In the unexposed state, each opening 23 is relatively large. In the exposed state, however, the area of each opening 23 is decreased, which decreases the overall permeability of textile 20 to water, light, and moving air, for example. That is, the smaller area of each opening 23 in the exposed state decreases the ease with which water, light, and moving air may penetrate or otherwise extend through textile 20. Accordingly, exposing textile 20 to a physical stimulus changes the permeability properties of textile 20, thereby changing the permeability properties of apparel 10.

Various physical stimuli may induce a dimensional transformation of yarns 21 and 22, including the presence of water (whether in a liquid or gaseous state), increased temperature, or moving air, for example. With regard to water, many materials exhibit a tendency to absorb water and swell or otherwise transform dimensionally. The dimensional transformation may occur relatively rapidly due to immersion or contact with liquid water. In addition, the dimensional transformation may occur relatively slowly due to a prolonged exposure to air with a relative humidity that is greater than 75 percent, for example. Textile 20, and particularly yarns 21 and 22, may be formed from one or more of these materials that exhibit a tendency to transform dimensionally in the presence of a physical stimulus such as water. Furthermore, yarns 21 and 22 may be formed from materials that transform dimensionally due to temperature increases or moving air.

Yarns 21 and 22, as discussed above, may be formed from a variety of materials that transform dimensionally in the presence of water. For example, at least a portion of the filaments or fibers in yarns 21 and 22 may be formed of a moisture-absorptive polyester material, such as the various moisture-absorptive polyester materials manufactured by Tejin Fibers Limited of Japan. In some embodiments, yarns 21 and 22 may be a 75 denier, 72 filament semi-dull textured polyester yarn, and suitable formulations for the fiber or filament contents of yarns 21 and 22 include: (i) 70 percent generally non-absorptive polyester and 30 percent moisture-absorptive polyester; (ii) 76 percent generally non-absorptive polyester and 24 percent moisture-absorptive polyester; (iii) 80 percent generally non-absorptive polyester and 20 percent moisture-absorptive polyester; or (iv) 84 percent cationic-dyeable polyester that is also generally non-absorptive and 16 percent moisture-absorptive polyester. Accordingly, the percentage of the fibers or filaments formed from moisture-absorptive polyester may vary considerably within the scope of the present invention, and may also range from 5 percent to 100 percent in some embodiments. In each of the examples above, a non-absorptive or otherwise dimensionally-stable polyester fibers or filaments are combined with a moisture-absorptive polyester fibers or filaments. Other non-absorptive polymer fibers or filaments may also be utilized, such as rayon, nylon, and polyacrylic. In addition, silk, cotton, or wool may be utilized in yarns 21 and 22. Accordingly, a wide range of materials are suitable for the various yarns 21 and 22.

When incorporated into article of apparel 10, textile 20 may be utilized to protect or otherwise insulate the individual from specific environmental conditions. As discussed above, one physical stimulus that induces a dimensional transformation in yarns 21 and 22 is water, such as rain. When rain or another source of water (i.e., the physical stimulus) is not present, textile 20 is in the unexposed state and exhibits a relatively high permeability that permits air to freely enter and exit apparel 10, thereby cooling the individual. When significant quantities of water contact apparel 10, thereby placing textile 20 in the exposed state, textile 20 exhibits a relatively low permeability that inhibits the movement of water through textile 20. More specifically, water in the form of rain that contacts apparel 10 will cause openings 23 to decrease in area and limit the quantity of water that enters apparel 10. When yarns 21 and 22 are formed from a material that transforms dimensionally in the presence of heat, sunlight or other heat sources induce openings 23 to decrease in area and limit the quantity of solar radiation that enters apparel 10. In addition, moving air in the form of wind may induce openings 23 to decrease in area to limit the quantity of air that passes through apparel 10. Accordingly, forming textile 20 from yarns 21 and 22 that transform dimensionally in the presence of one or more physical stimuli may be utilized to effectively insulate the individual from specific environmental conditions, such as rain, sunlight, or wind.

Based upon the above discussion, textile 20 may be formed from various yarns 21 and 22 that transform dimensionally in the presence of a physical stimulus. The dimensional transformation of yarns 21 and 22 modify the structure of textile 20, thereby inducing a change in the properties of textile 20. When incorporated into apparel 10, the change in the properties of textile 20 when exposed to the physical stimulus may be utilized to insulate the individual from specific environmental conditions, such as rain, sunlight, or wind. Accordingly, textile 20 effectively adapts to changing environmental conditions in order to enhance the comfort of the individual wearing apparel 10.

Second Textile Structure

With respect to textile 20, both of yarns 21 and 22 are at least partially formed from materials that transform dimensionally in the presence of a physical stimulus. In some embodiments, however, various yarns may be entirely formed from a material that does not dimensionally-transform to a significant degree in the presence of a physical stimulus. That is, some of the yarns forming the textile of apparel 10 may be formed from a dimensionally-stable yarn that is not significantly affected by the physical stimulus.

Figure 14:
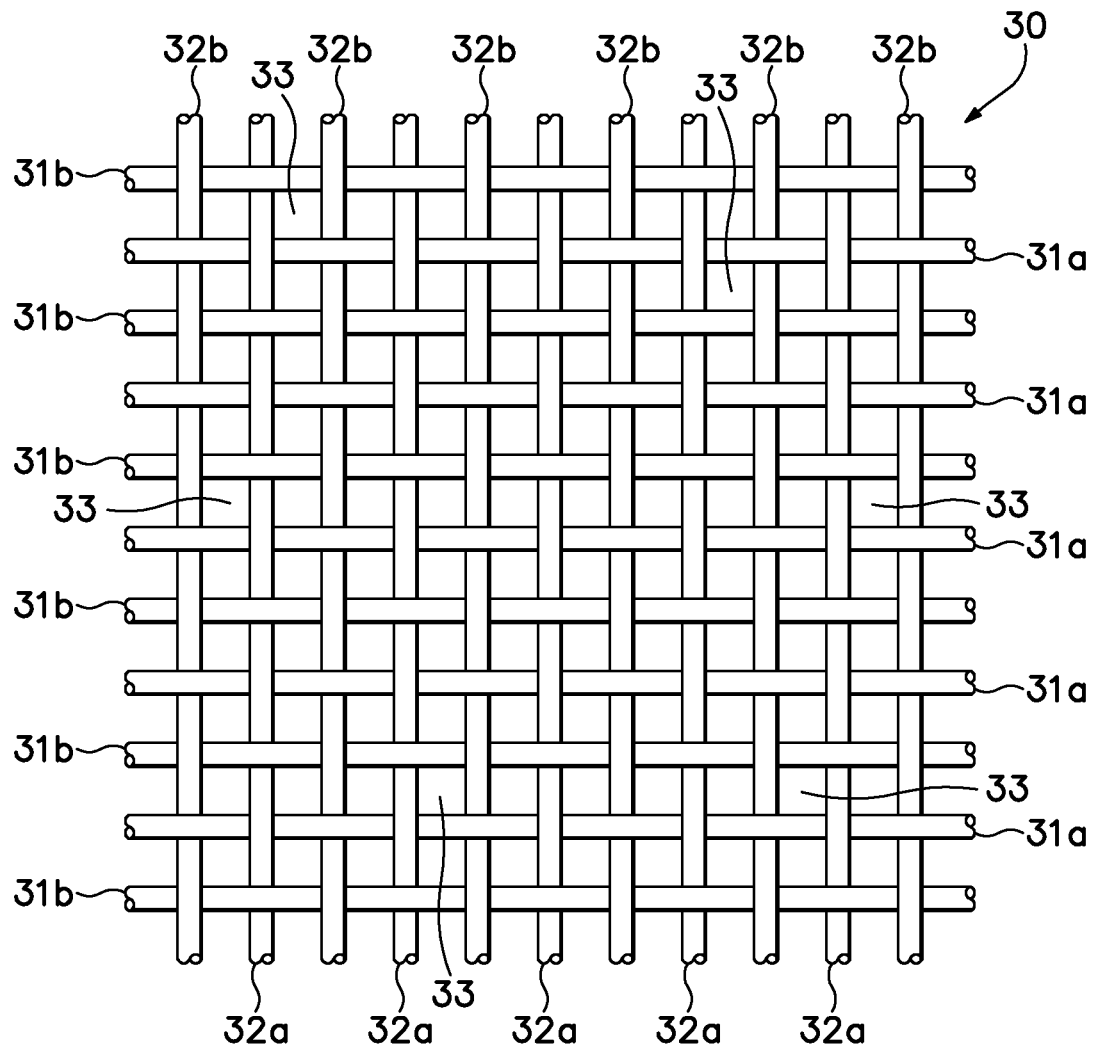
FIG. 14 is a plan view of a portion of a second textile structure in an unexposed state.
Figure 15:
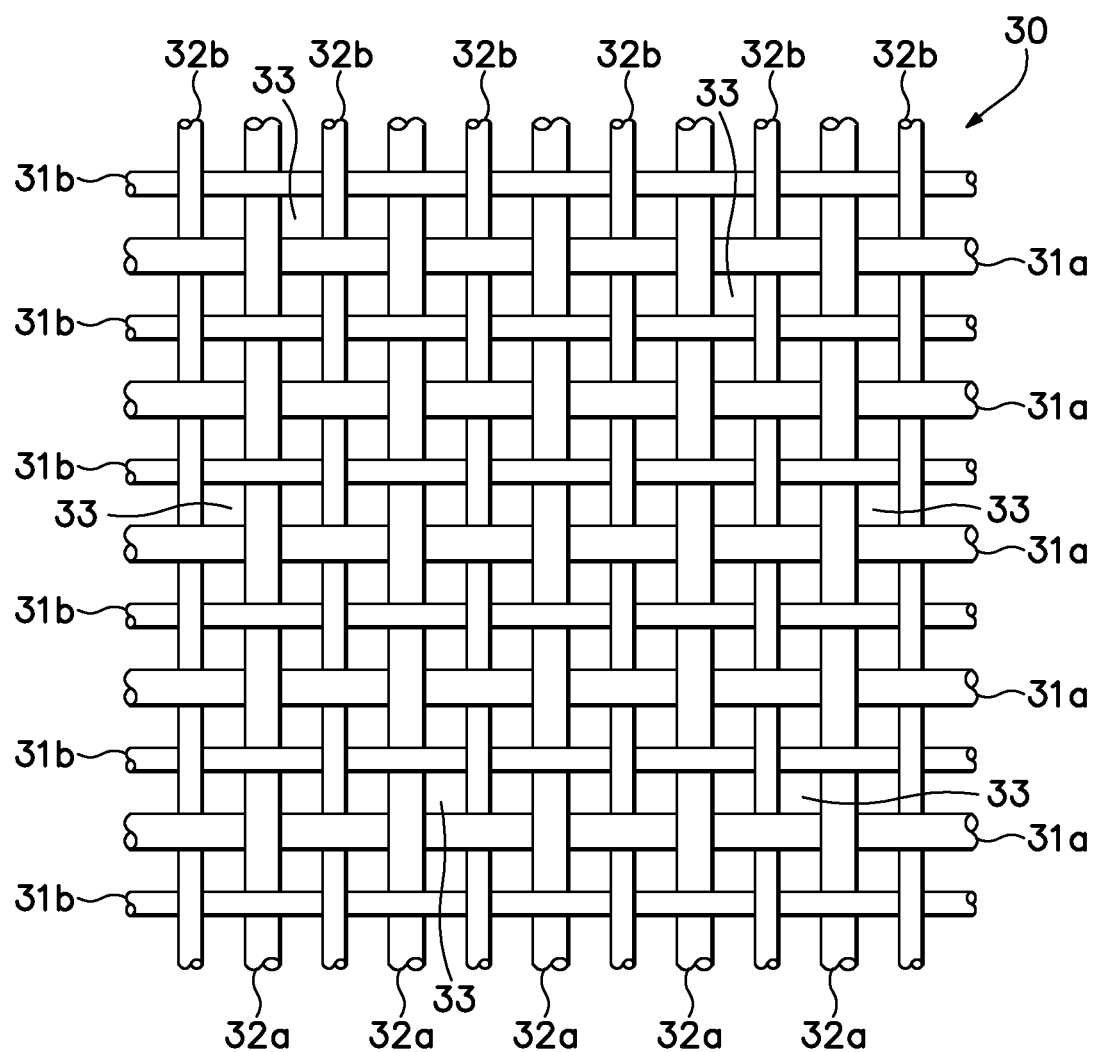
FIG. 15 is a plan view of the portion of the second textile structure in an exposed state.

A textile 30 is depicted in FIGS. 14 and 15 that includes a plurality of weft yarns 31a, a plurality of other weft yarns 31b, a plurality of warp yarns 32a, and a plurality of other warp yarns 32b that define various openings 33. Whereas yarns 31a and 32a are formed from a material that dimensionally-transforms in the presence of a physical stimulus, yarns 31b and 32b are formed from a dimensionally-stable yarn that is not significantly affected by the physical stimulus.

The manner in which exposing textile 30 to a physical stimulus has an effect upon the properties of textile 30 will now be discussed. With reference to FIG. 14, textile 30 is depicted in an unexposed state, in which yarns 31a, 31b, 32a, and 32b are not exposed to the physical stimulus. With reference to FIG. 15, however, textile 30 is depicted in an exposed state, in which yarns 31a, 31b, 32a, and 32b are exposed to the physical stimulus. In the unexposed state, each of yarns 31a, 31b, 32a, and 32b exhibit dimensions with a relatively narrow thickness such that the area of each opening 33 is relatively large. In the exposed state, however, yarns 31a and 32a exhibit a greater thickness, which decreases the area of each opening 33. That is, exposing yarns 31a and 32a to the physical stimulus causes yarns 31a and 32a to increase in thickness, which decreases the area of each opening 33 and modifies the structure of textile 30. As discussed above, yarns 31b and 32b are formed from a dimensionally-stable yarn that is not significantly affected by the physical stimulus. Accordingly, 31b and 32b do not transform dimensionally when exposed to the physical stimulus.

The modification in the structure of textile 30 (i.e., decreasing the area of openings 33) changes the properties of textile 30. In the unexposed state, each opening 33 is relatively large. In the exposed state, however, the area of each opening 33 is decreased, which decreases the overall permeability of textile 30 to water, light, and moving air, for example. That is, the smaller area of each opening 33 in the exposed state decreases the ease with which water, light, and moving air may penetrate through textile 30. Accordingly, exposing textile 30 to a physical stimulus changes the permeability properties of textile 30. Given that textile 30 may replace textile 20 in apparel 10, exposing textile 30 to a physical stimulus may be utilized to effectively change the permeability properties of apparel 10.

An advantage of forming yarns 31b and 32b from a dimensionally-stable yarn that is not significantly affected by the physical stimulus relates to the dimensional stability of textile 30. Yarns 31b and 32b form a web in textile 30 that does not significantly change dimensions when exposed to the physical stimulus. Whereas yarns 31a and 32a transform dimensionally, yarns 31b and 32b remain dimensionally-stable (i.e., in their original dimensions). Accordingly, yarns 31b and 32b may be utilized to ensure that the shape and dimensions of textile 30 are retained, despite the dimensional transformation of yarns 31a and 32a.

Third Textile Structure

Figure 16:
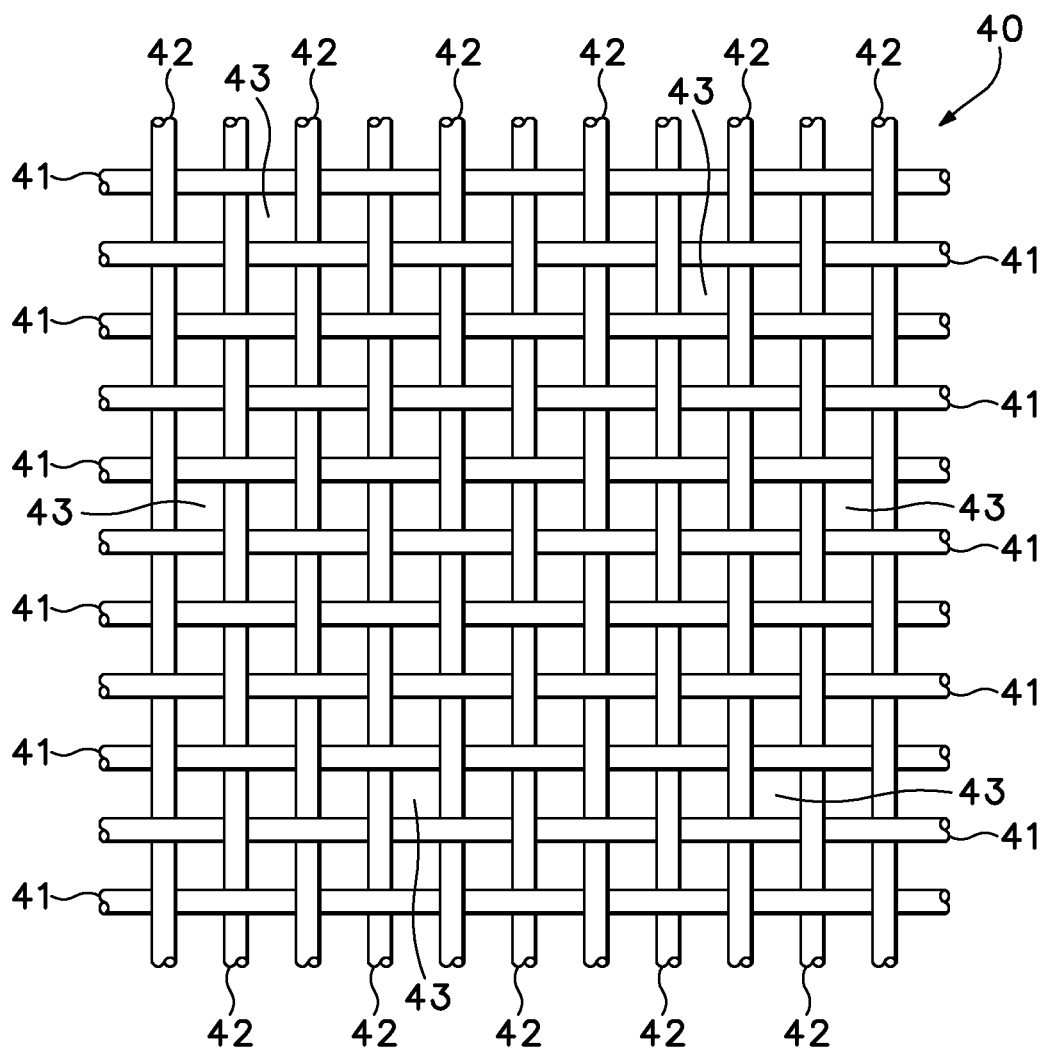
FIG. 16 is a plan view of a portion of a third textile structure in an unexposed state.
Figure 17:
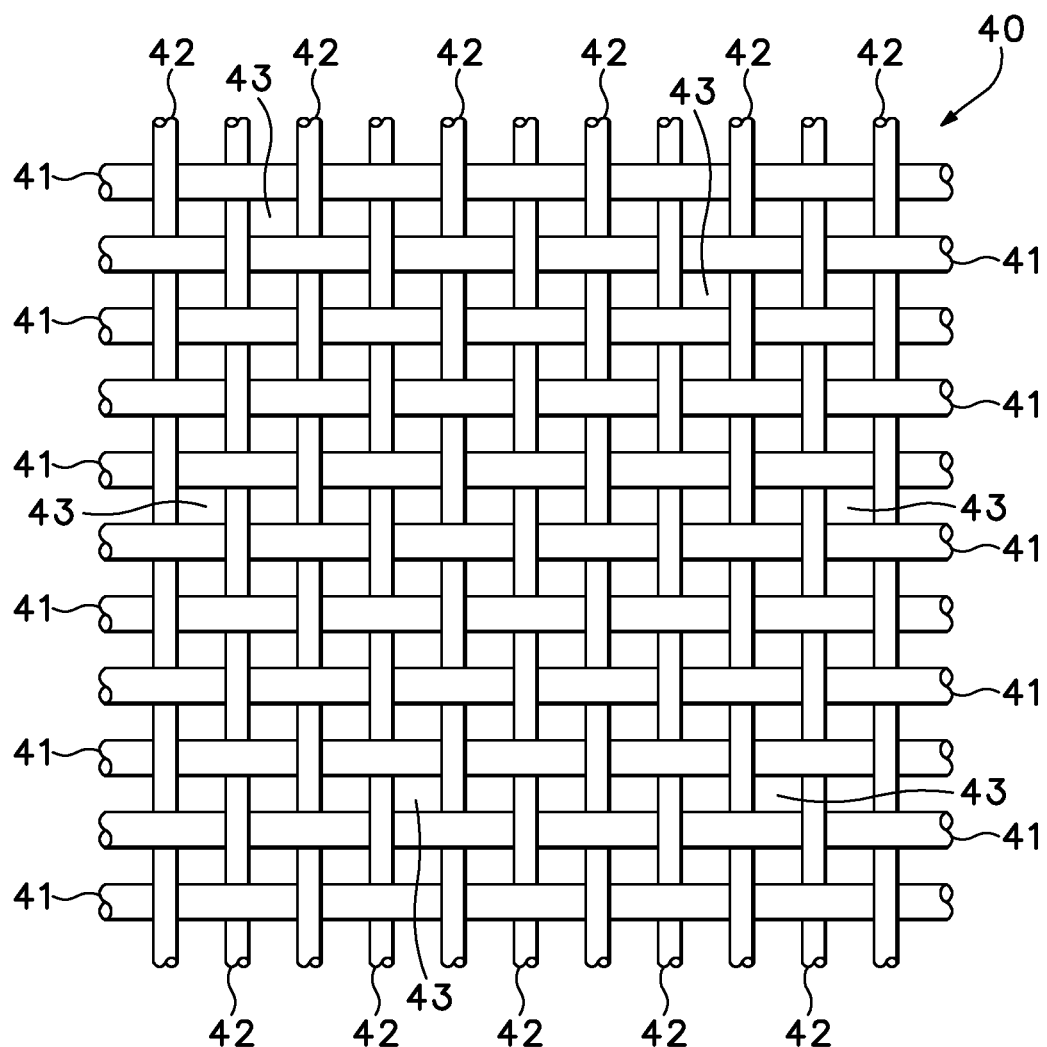
FIG. 17 is a plan view of the portion of the third textile structure in an exposed state.

Another potential configuration for the textile that forms at least a portion of apparel 10 is disclosed in FIGS. 16 and 17, in which a plurality of weft yarns 41 and a plurality of warp yarns 42 define various openings 43. Whereas weft yarns 41 are formed from a material that dimensionally-transforms in the presence of a physical stimulus, warp yarns 42 are formed from a dimensionally-stable yarn that is not significantly affected by the physical stimulus. Accordingly, weft yarns 41 do not substantially change dimensions when exposed to the physical stimulus.

Exposing textile 40 to a physical stimulus modifies the structure of textile 40, which has an effect upon the properties of textile 40. With reference to FIG. 16, textile 40 is depicted in an unexposed state, in which yarns 41 and 42 are not exposed to the physical stimulus. With reference to FIG. 17, however, textile 40 is depicted in an exposed state, in which yarns 41 and 42 are exposed to the physical stimulus. As with textiles 20 and 30, exposing yarns 41 and 42 to the physical stimulus causes yarns 41 to increase in thickness, which decreases the area of each opening 43 and modifies the structure of textile 40. The modification in the structure of textile 40 (i.e., decreasing the area of openings 43) changes the properties of textile 40. In the unexposed state, each opening 33 is relatively large. In the exposed state, however, the area of each opening 33 is decreased, which decreases the overall permeability of textile 30 to water, light, and moving air, for example. Given that textile 40 may replace textile 20 in apparel 10, exposing textile 40 to a physical stimulus may be utilized to effectively change the permeability properties of apparel 10. As with textile 30, forming warp yarns 42 from a dimensionally-stable yarn that is not significantly affected by the physical stimulus ensures that the shape and dimensions of textile 40 are retained, despite the dimensional transformation of weft yarns 41.

Fourth Textile Structure

The configurations of textiles 20, 30, and 40 may be utilized to protect or otherwise insulate the individual from specific environmental conditions. As discussed above, the dimensional transformation of various yarns induces the openings between the yarns to decrease in area. The decrease in area decreases the permeability of textiles 20, 30, and 40, thereby permitting less rain, sunlight, or wind to enter apparel 10. It may be desirable in some situations, however, to increase the permeability of the textile forming apparel 10. For example, increasing the permeability may be utilized to increase air flow through the textile forming apparel 10, thereby enhancing the removal of perspiration from the individual.

Figure 18:
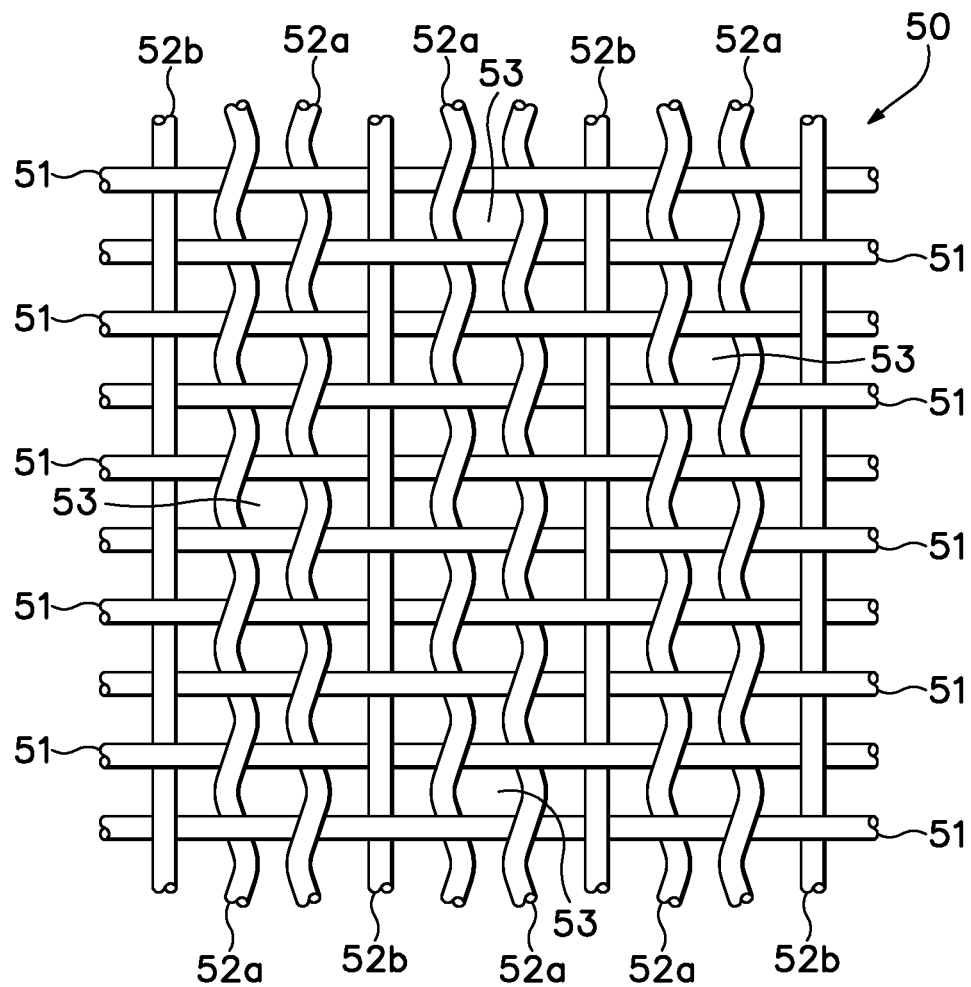
FIG. 18 is a plan view of a portion of a fourth textile structure in an unexposed state.
Figure 19:
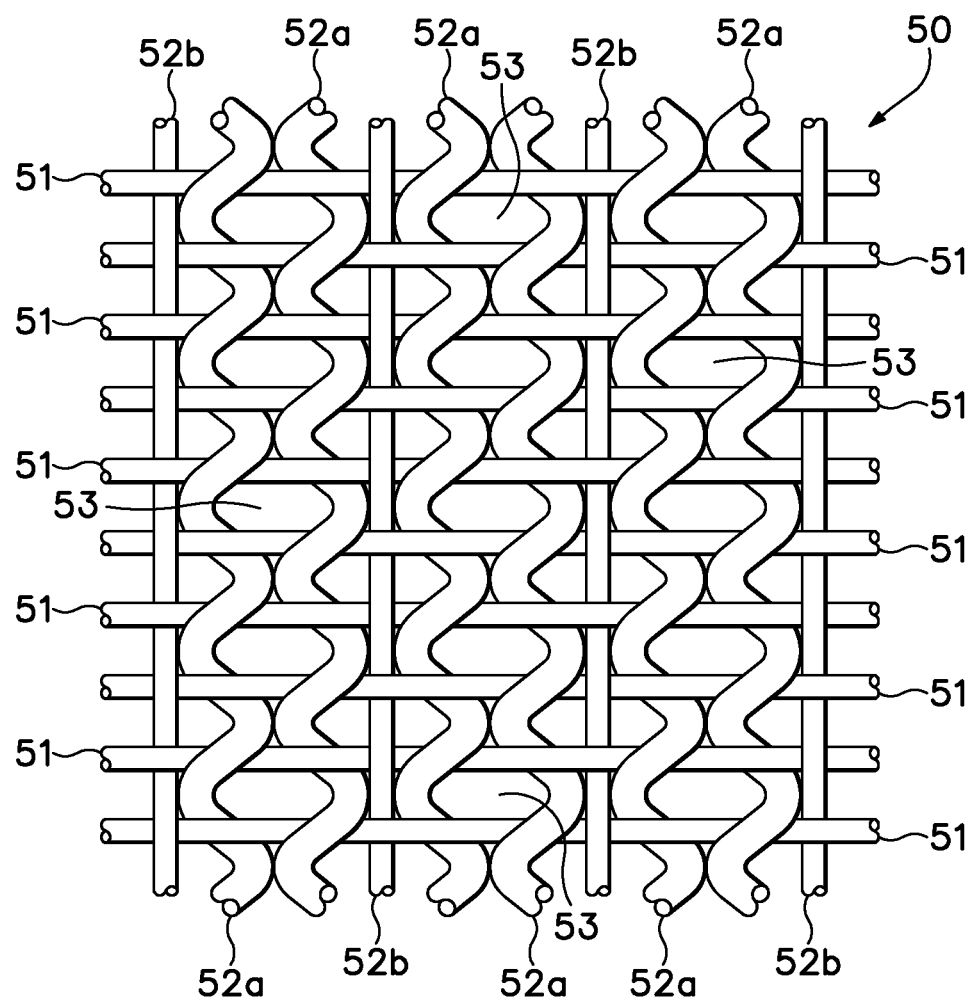
FIG. 19 is a plan view of the portion of the fourth textile structure in an exposed state.

A textile 50 with the structure of an interwoven material that includes a plurality of weft yarns 51, a plurality of warp yarns 52a, and a plurality of warp yarns 52b is depicted in FIGS. 18 and 19. Textile 50 may be formed, therefore, by mechanically-manipulating yarns 51, 52a, and 52b thorough an interweaving process, which involves crossing and interweaving weft yarns 51 at substantially right angles to yarns 52a and 52b. The process of crossing and interweaving weft yarns 51 at substantially right angles to yarns 52a and 52b forms a plurality of discrete openings 53.

Whereas yarns 52a are formed from a material that dimensionally-transforms in the presence of a physical stimulus, yarns 51 and 52b are formed from a dimensionally-stable yarn that is not significantly affected by the physical stimulus. In addition, warp yarns 52a exhibit an undulating or otherwise wavy configuration, whereas yarns 51 and 52b are relatively straight.

The manner in which exposing textile 50 to a physical stimulus has an effect upon the properties of textile 50 will now be discussed. With reference to FIG. 18, textile 50 is depicted in an unexposed state, in which yarns 51, 52a, and 52b are not exposed to the physical stimulus. With reference to FIG. 19, however, textile 50 is depicted in an exposed state, in which yarns 51, 52a, and 52b are exposed to the physical stimulus. In the unexposed state, yarns 51, 52a, and 52b exhibit dimensions with a relatively narrow thickness such that the area of each opening 53 is relatively small. In the exposed state, however, warp yarns 52a exhibit a greater thickness and a greater degree of undulation, which increases the area of each opening 53. That is, exposing yarns 51, 52a, and 52b to the physical stimulus causes warp yarns 52a to increase in thickness and degree of undulation, which increases the area of each opening 53 and modifies the structure of textile 50.

The modification in the structure of textile 50 (i.e., increasing the area of openings 53) changes the properties of textile 50. In the unexposed state, each opening 53 is relatively small. In the exposed state, however, the area of each opening 53 is increased, which increases the overall permeability of textile 50 to water, light, and moving air, for example. That is, the greater area of each opening 53 in the exposed state increases the ease with which water, light, and moving air may penetrate through textile 50. Accordingly, exposing textile 50 to a physical stimulus increases the permeability properties of textile 50, thereby increasing the permeability properties of apparel 10.

When incorporated into article of apparel 10, textile 50 may be utilized to cool the individual and remove perspiration from the individual, for example. Based upon the above discussion, therefore, textile 50 may be formed from various warp yarns 52a that transform dimensionally and in degree of undulation in the presence of a physical stimulus. The dimensional transformation of warp yarns 52a modifies the structure of textile 50, thereby inducing a change in the properties of textile 50. When incorporated into apparel 10, the change in the properties of textile 50 when exposed to the physical stimulus may be utilized to cool the individual and remove perspiration from the individual. Accordingly, textile 50 effectively adapts to changing perspiration levels of the individual in order to enhance the comfort of the individual wearing apparel 10.

Fifth Textile Structure

Figure 20:
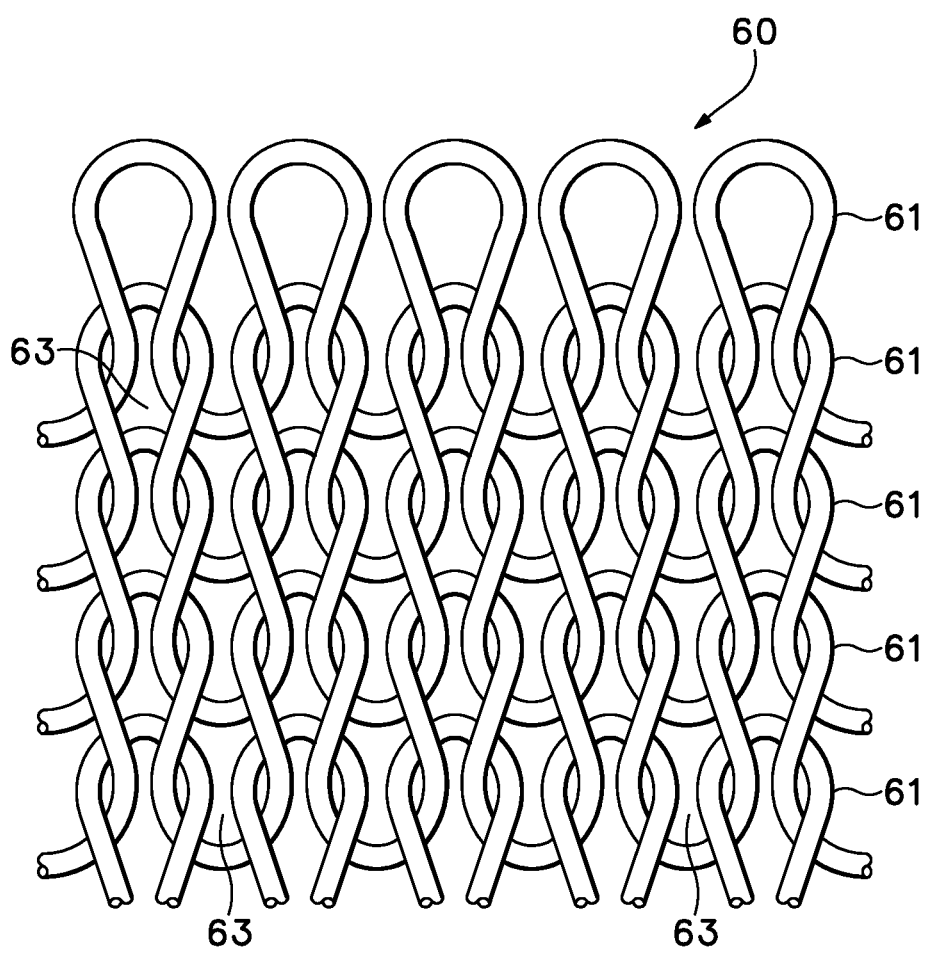
FIG. 20 is a plan view of a portion of a fifth textile structure in an unexposed state.
Figure 21:
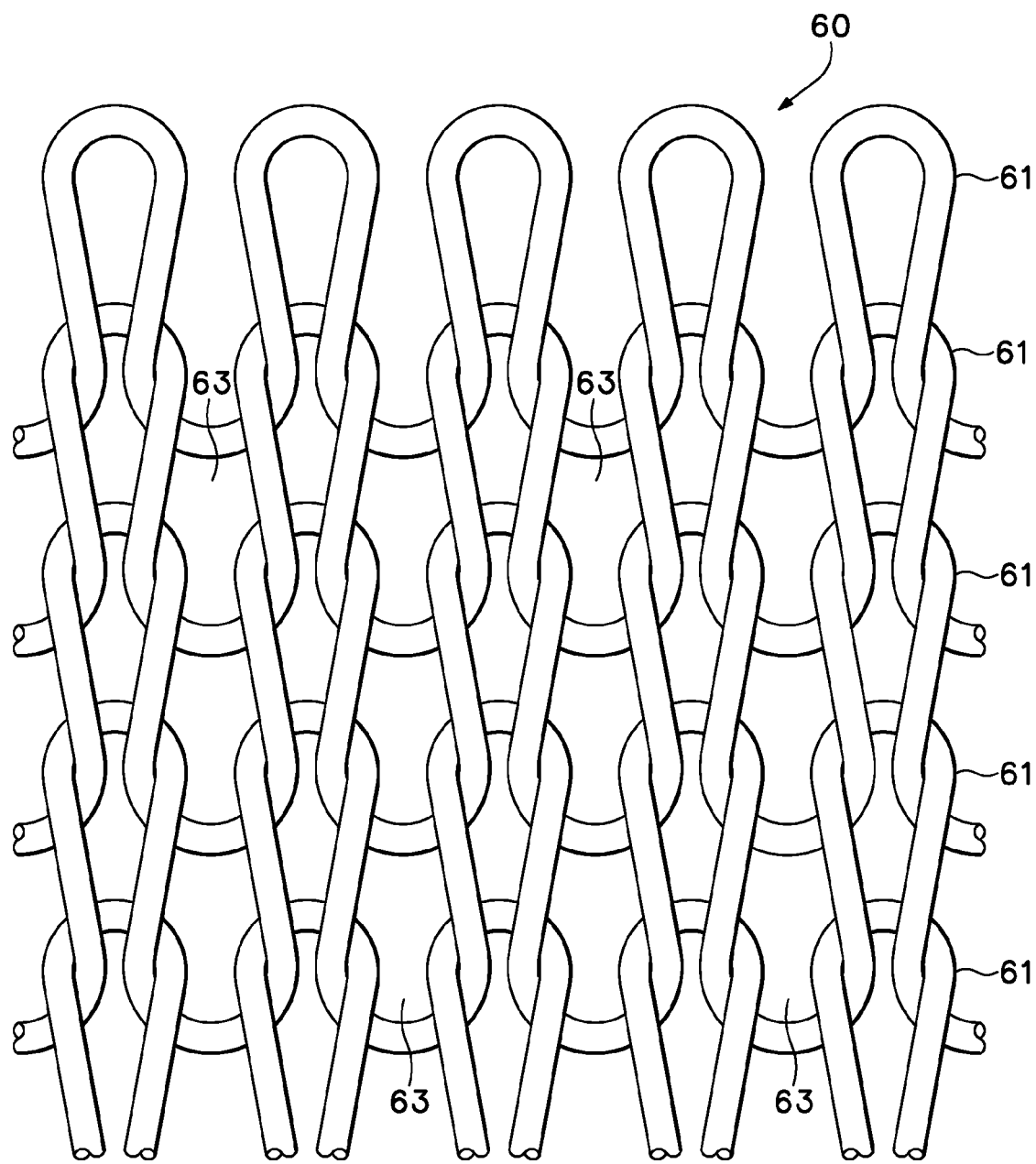
FIG. 21 is a plan view of the portion of the fifth textile structure in an exposed state.

Each of textiles 20, 30, 40, and 50 are formed thorough an interweaving process, which involves crossing and interweaving weft yarns and warp yarns at substantially right angles to each other. A textile that adapts to changing perspiration levels of the individual, for example, in order to enhance the comfort of the individual may also be formed through other methods of mechanically-manipulating yarns. Referring to FIGS. 20 and 21, a textile 60 that is formed through an interlooping process is disclosed. Interlooping involves the formation of a plurality of columns of intermeshed loops, with knitting being the most common method of interlooping. Textile 60 includes a plurality of courses (i.e., a row of needle loops produced by adjacent needles during the knitting cycle) and a plurality of wales (i.e., a column of intermeshed needle loops generally produced by the same needle the knits at successive knitting cycles) that are formed from a yarn 61.

Yarn 61 is formed from a material that dimensionally-transforms in the presence of a physical stimulus. More particularly, the dimensions of yarn 61 (i.e., length and thickness, for example) may increase in the presence of the physical stimulus. When exposed to a physical stimulus, yarn 61 dimensionally-transforms in both length and thickness. Although an increase thickness would appear to decrease the area of each opening 62, the associated increase in length separates the various portions of yarn 61 to a greater degree and actually increases the area of each opening 63. That is, the increase in thickness has a greater effect upon the area of openings 63 than the increase in thickness, thereby increasing the overall area of each opening 63. When exposed to the physical stimulus, therefore, the permeability of textile 60 may increase.

The manner in which exposing textile 60 to a physical stimulus has an effect upon the properties of textile 60 will now be discussed in greater detail. With reference to FIG. 20, textile 60 is depicted in an unexposed state, in which yarn 61 is not exposed to the physical stimulus. With reference to FIG. 21, however, textile 60 is depicted in an exposed state, in which yarn 61 is exposed to the physical stimulus. In the unexposed state, the area of each opening 63 is relatively small. In the exposed state, however, yarn 61 exhibits a greater thickness and a greater length. As discussed above, the increase in length dominates the increase in thickness in order to increase the overall area of each opening 63. That is, exposing yarn 60 to the physical stimulus causes yarn 60 to increase in length, which increases the area of each opening 63 and modifies the structure of textile 60.

The modification in the structure of textile 60 (i.e., increasing the area of openings 63) changes the properties of textile 60. In the unexposed state, each opening 63 is relatively small. In the exposed state, however, the area of each opening 63 is increased, which increases the overall permeability of textile 60 to water, light, and moving air, for example. That is, the greater area of each opening 63 in the exposed state increases the ease with which water, light, and moving air may penetrate through textile 60. Accordingly, exposing textile 60 to a physical stimulus increases the permeability properties of textile 60, thereby increasing the permeability properties of apparel 10.

When incorporated into article of apparel 10, textile 60 may be utilized to cool the individual and remove perspiration from the individual, for example. Based upon the above discussion, therefore, textile 60 may be formed from yarn 61, which transforms dimensionally and in degree of undulation in the presence of a physical stimulus. The dimensional transformation of yarn 61 modifies the structure of textile 60, thereby inducing a change in the properties of textile 60. When incorporated into apparel 10, the change in the properties of textile 60 when exposed to the physical stimulus may be utilized to cool the individual and remove perspiration from the individual. Accordingly, textile 60 effectively adapts to changing perspiration levels of the individual in order to enhance the comfort of the individual wearing apparel 10.

Sixth Textile Structure

Increasing or decreasing the area of openings between the various yarns that form a textile is one manner in which the structure of the textile may be modified in order to change the properties (i.e., permeability) of the textile. In some embodiments, the texture of the textile may also be modified in order to change the properties of the textile. Referring to FIGS. 22-25, a textile 70 is disclosed. Textile 70 is formed from a yarn 71 and a yarn 72 through an interlooping process. As will be described in greater detail below, the texture of textile 70 changes from being relatively smooth to having a plurality of nodes 73 that form a separation between the individual and textile 70. Nodes 73 effectively hold textile 70 away from the individual and permit air to flow between textile 70 and the individual, thereby increasing removal of perspiration. In order to form textile 70, yarns 71 and 72 are mechanically-manipulated through a circular knitting process to form textile 70 with a jersey knit or double knit pique structure, for example. In some embodiments, three or more yarns may be utilized to form textile 70, and a variety of other knit structures in addition to the jersey knit and double knit pique structure may be utilized.

Whereas yarn 71 is formed from a material that dimensionally-transforms in the presence of a physical stimulus, yarn 72 is formed from a dimensionally-stable yarn that is not significantly affected by the physical stimulus. Accordingly, yarn 71 substantially changes dimensions when exposed to the physical stimulus. Yarn 71 extends through the structure formed by yarn 72 and is primarily positioned on one side of textile 70. That is, the position of yarn 71 is concentrated on one side of textile 70. When exposed to the physical stimulus, yarn 71 transforms dimensionally, whereas yarn 72 remains dimensionally-stable. The dimensions of yarn 71 increase when exposed to the physical stimulus and form a plurality of nodes 73 on one side of textile 70. That is, the concentrated areas of yarn 71 expand when exposed to the physical stimulus and form nodes 73.

Figure 22:
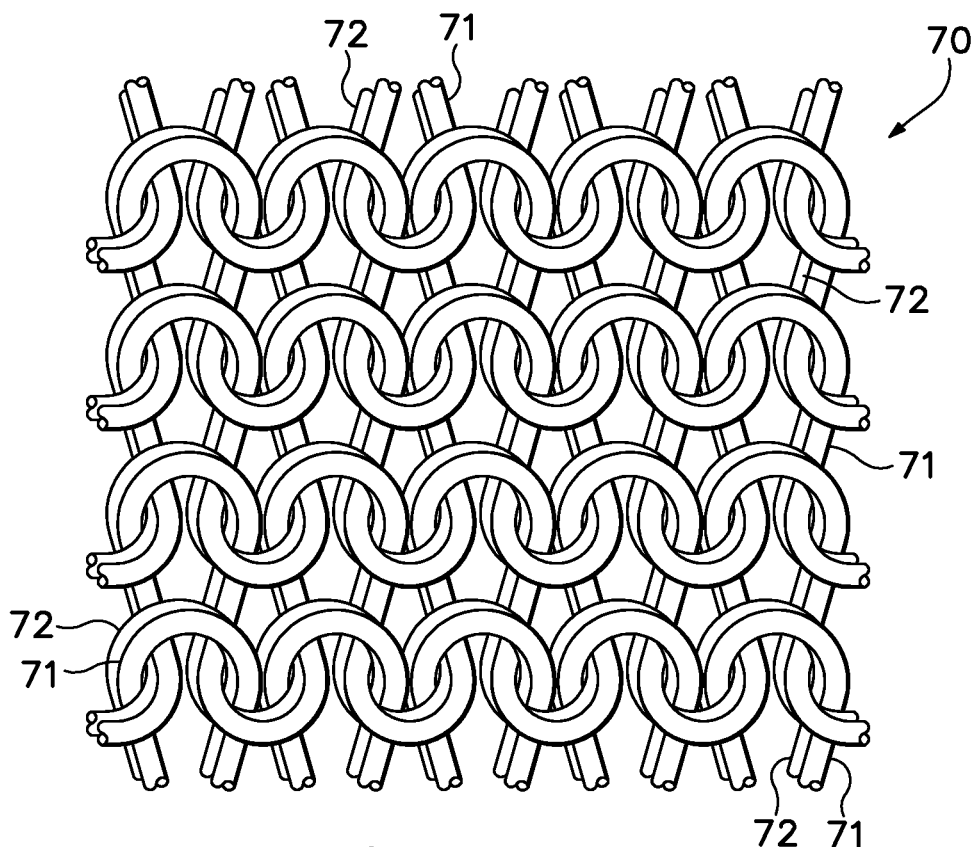
FIG. 22 is a plan view of a portion of a sixth textile structure in an unexposed state.
Figure 23:
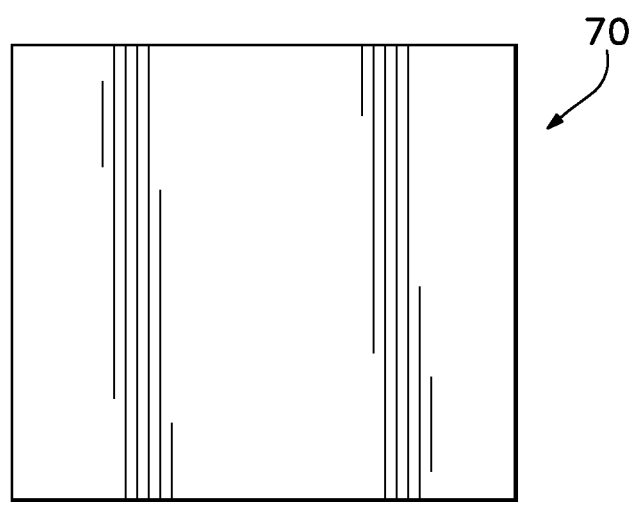
FIG. 23 is a schematic plan view of a larger portion of the sixth textile structure in the unexposed state.
Figure 24:
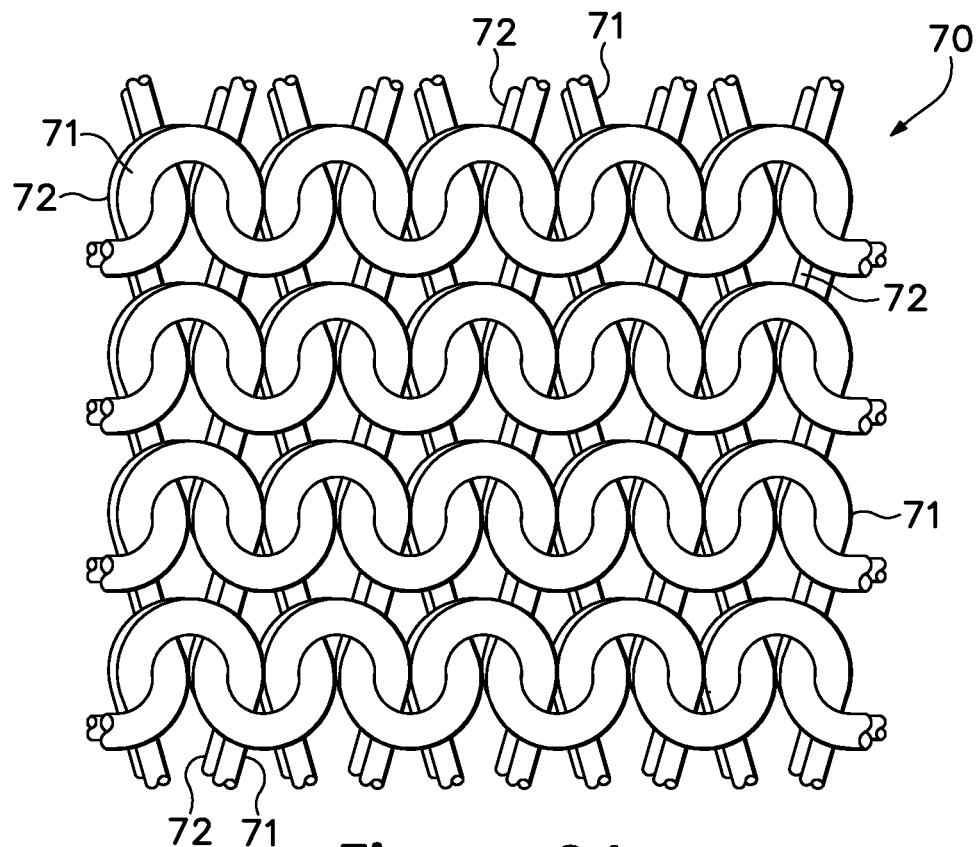
FIG. 24 is a plan view of the portion of the sixth textile structure in an exposed state.
Figure 25:
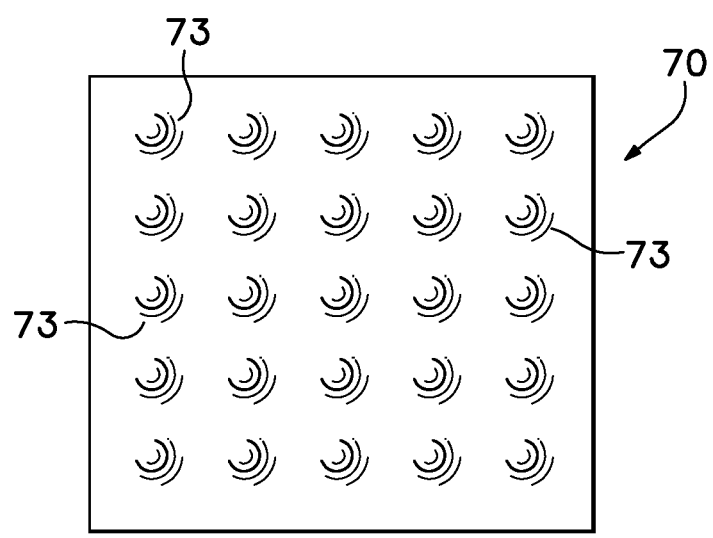
FIG. 25 is a schematic plan view of the larger portion of the sixth textile structure in the exposed state.

With reference to FIGS. 22 and 23, textile 70 is depicted in an unexposed state, in which yarns 71 and 72 are not exposed to the physical stimulus. With reference to FIGS. 24 and 25, however, textile 70 is depicted in an exposed state, in which yarns 71 and 72 are exposed to the physical stimulus. In the unexposed state, textile 70 exhibits a relatively smooth texture. In the exposed state, however, textile 70 exhibits greater texture due to the presence of the plurality of nodes 73. That is, exposing yarn 71 to the physical stimulus forms nodes 73 on one side of textile 70 and causes textile 70 to increase in texture, which modifies the structure of textile 70.

The modification in the structure of textile 70 changes the properties of textile 70. In the unexposed state, textile 70 is relatively smooth and significantly contacts the individual. In the exposed state, however, the texture of textile 70 is increased through the formation of nodes 73, which forms a separation between the individual and textile 70. That is, nodes 73 effectively hold textile 70 away from the individual and permit air to flow between textile 70 and the individual, thereby increasing the rate at which perspiration is removed. Exposing textile 70 to a physical stimulus increases the texture of textile 70, thereby increasing the texture properties of apparel 10. Accordingly, textile 70 effectively adapts to changing perspiration levels of the individual in order to enhance the comfort of the individual wearing apparel 10.

Seventh Textile Structure

Textiles generally fall into two categories, as discussed above in the Background of the Invention section. The first category includes textiles produced directly from webs of fibers or filaments by bonding, fusing, or interlocking to construct non-woven fabrics and felts. The second category includes textiles formed through a mechanical manipulation of yarn. Textiles, 20, 30, 40, 50, 60, and 70 are each formed through the mechanical manipulation of yarn and fall, therefore, within the second category. Concepts related to the present invention also apply, however, to non-woven textiles.

Figure 26:
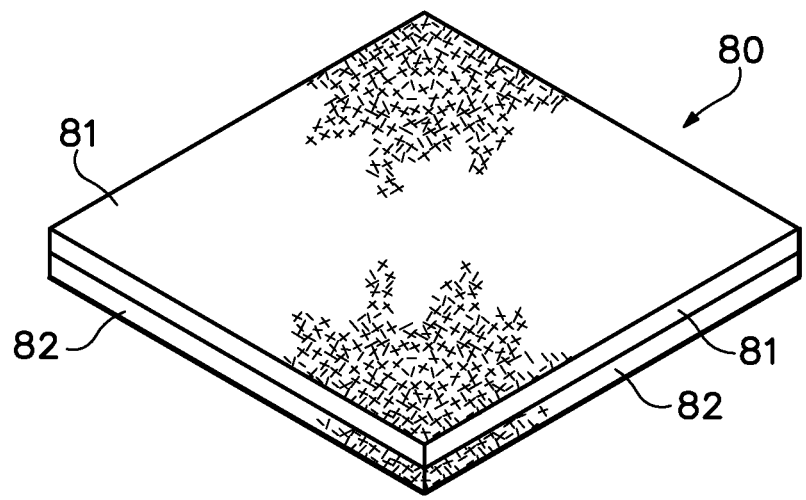
FIG. 26 is a perspective view of a portion of a seventh textile structure.

With reference to FIG. 26, a textile 80 having the configuration of a non-woven textile is disclosed an includes a plurality of filaments 81 and a plurality of filaments 82. Non-woven textiles are generally manufactured by depositing one or more layers of polymer filaments upon a moving conveyor, thereby forming the non-woven textile to have a generally uniform thickness. Textile 80 includes two layers, one being formed from a plurality of filaments 81, and the other being formed from a plurality of filaments 82.

Whereas filaments 81 are formed from a material that dimensionally-transforms in the presence of a physical stimulus, filaments 82 are formed from a dimensionally-stable material that is not significantly affected by the physical stimulus. Accordingly, filaments 81 substantially change dimensions when exposed to the physical stimulus. Filaments 81 form one of the layers of textile 80 and are primarily positioned on one side of textile 80. That is, the position of filaments 81 is concentrated on one side of textile 80. When exposed to the physical stimulus, filaments 81 transform dimensionally, whereas filaments 82 remain dimensionally-stable. As with textile 70, which also has concentrations of different yarns on different sides, the dimensions of filaments 81 increase when exposed to the physical stimulus and may form a plurality of nodes on one side of textile 80. That is, the concentrated areas of filaments 81 expand when exposed to the physical stimulus and may form nodes that are similar to nodes 73.

Textile 80 is depicted as having two non-woven layers formed from filaments 81 and filaments 82. In some embodiments of the invention, the layer formed from filaments 82 may be replaced with a textile formed through mechanical manipulation of a yarn. That is, the layer formed from filaments 82 may be formed from a textile in the second category discussed above. When formed to exhibit this structure, the layer of filaments 81 may be bonded or stitched to the other textile layer, for example. In other embodiments, the layer formed from filaments 81 may be replaced with textile 60 or any of the other textiles disclosed above, for example. Furthermore, a textile may be formed that solely includes a layer of filaments 81. In yet further embodiments, a textile may exhibit a configuration wherein filaments 81 and 82 are distributed homogenously throughout the thickness of the textile. Accordingly, a variety of non-woven textile structures may be formed from filaments that transform dimensionally in the presence of a physical stimulus.

Eighth Textile Structure

Figure 27:
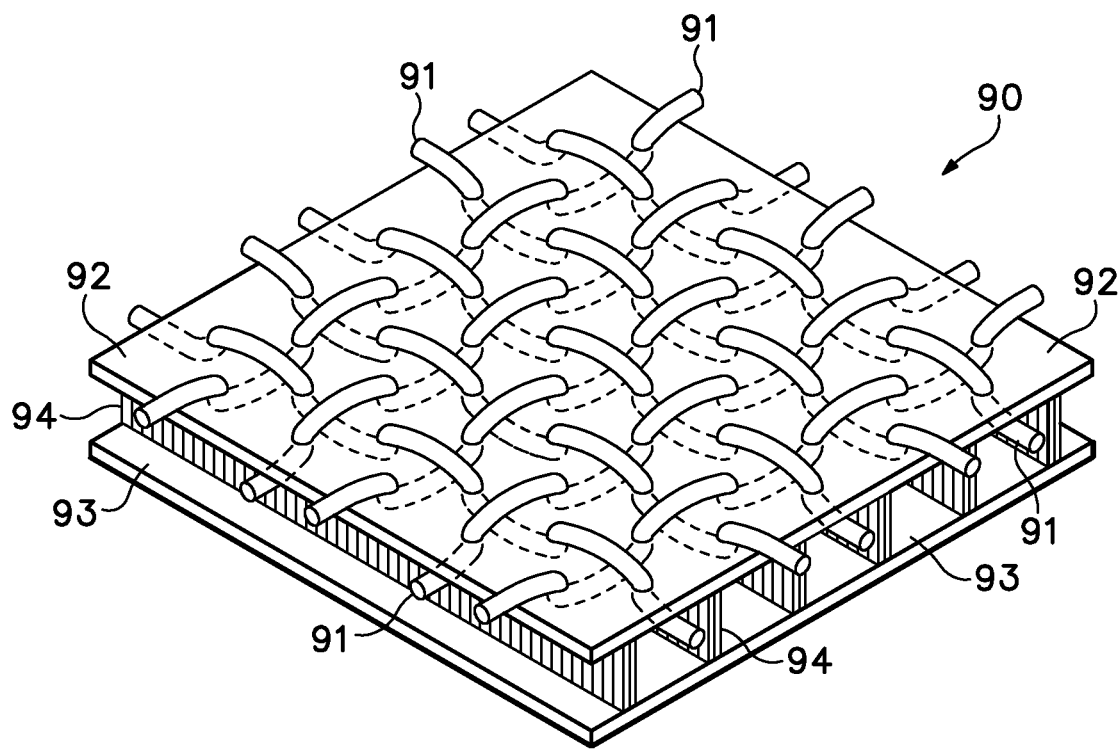
FIG. 27 is a perspective view of a portion of an eighth textile structure.

Each of textiles 70 and 80 exhibit a configuration wherein the dimensionally-stable materials (i.e., yarn 72 and filaments 82) are concentrated adjacent to one surface, and the materials that transform dimensionally in the presence of a physical stimulus (i.e., yarn 71 and filaments 81) are concentrated adjacent an opposite surface. Another manner in which this general configuration may be achieved is disclosed in FIG. 27, wherein a textile 90 includes a yarn 91 that is plaited in one surface of a spacer mesh material. More particularly, the spacer mesh material includes a first layer 92 and a second layer 93 that are spaced apart and connected by a plurality of connecting yarns 94. Yarn 91, which transforms dimensionally in the presence of a physical stimulus, is woven or otherwise plaited into first layer 92. Whereas yarn 91 is formed of a material that transforms dimensionally in the presence of a physical stimulus, each of first layer 92, second layer 93, and connecting yarns 94 may be formed from a dimensionally-stable material.

In manufacturing textile 90, a double needle bar Raschel knitting process may be utilized to form first layer 92, second layer 93, and connecting yarns 94 from the dimensionally-stable material. Yarn 91 is then plaited or otherwise incorporated into first layer 92. In further embodiments of the invention, all of first layer 92 may be formed from a material that transforms dimensionally in the presence of a physical stimulus. Alternately, first layer 92, second layer 93, and connecting yarns 94 may be formed from a material that transforms dimensionally in the presence of a physical stimulus, and yarn 91 may be formed from a dimensionally-stable material. Accordingly, a variety of configurations may be utilized in connection with a spacer mesh material to provide a configuration wherein the dimensionally-stable materials are concentrated adjacent to one surface, and the materials that transform dimensionally in the presence of a physical stimulus are concentrated adjacent to an opposite surface. In some embodiments, however, all or a substantially portion of a spacer mesh material may be formed from a dimensionally-stable material.

Ninth Textile Structure

Figure 28:
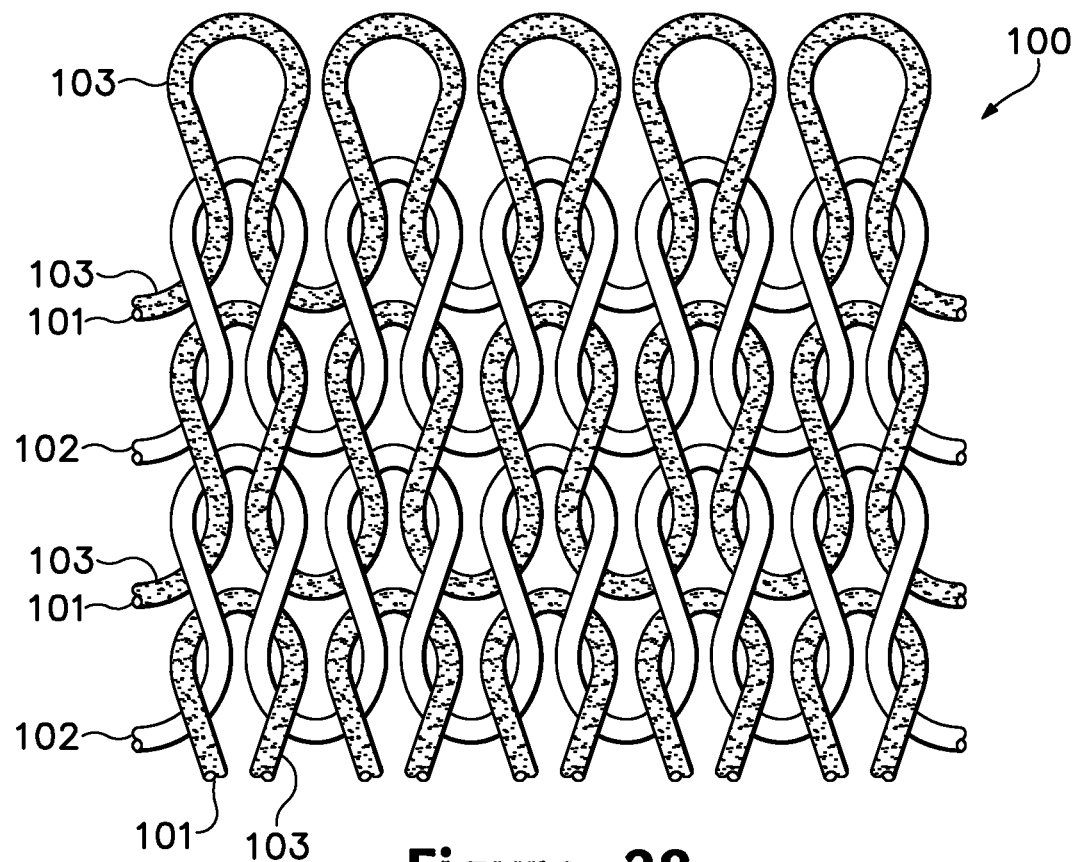
FIG. 28 is a plan view of a portion of a ninth textile structure.
Figure 29:
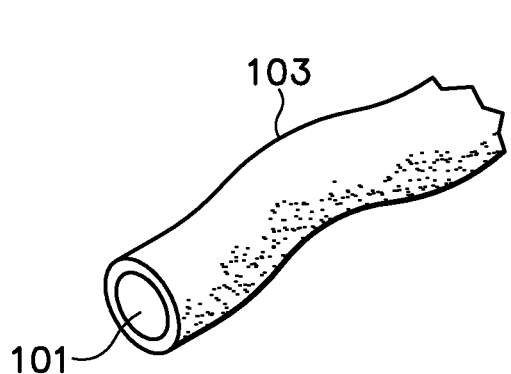
FIG. 29 is a schematic perspective view of a coated yarn from the ninth textile structure in an unexposed state.
Figure 30:
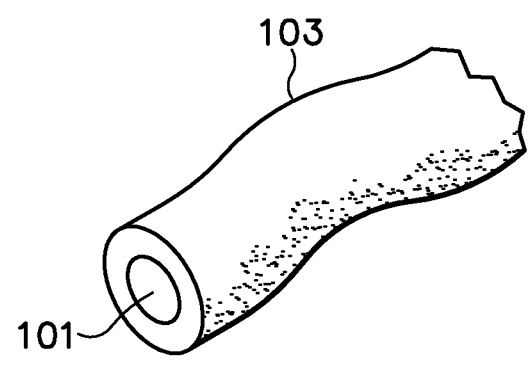
FIG. 30 is a schematic perspective view of the coated yarn from the ninth textile structure in an exposed state.

In the various textile structures discussed above, a fiber, filament, or yarn incorporated into a textile has a configuration that transforms dimensionally in the presence of a physical stimulus. Coatings on the fibers, filaments, or yarns may also be utilized as the material that transforms dimensionally in the presence of a physical stimulus. With reference to FIG. 28, a textile 100 that includes a yarn 101 and a yarn 102 is disclosed. Yarn 101 and yarn 102 are formed from a material that is dimensionally-stable. In contrast with yarn 102, however, yarn 101 includes a coating 103 that transforms dimensionally in the presence of a physical stimulus. FIGS. 28 and 29 depict yarn 101 and coating 103 in an unexposed state (i.e., yarn 101 and coating 103 are not exposed to the physical stimulus). In the unexposed state yarn 102 and the combination of yarn 101 and coating 103 have similar diameters. FIG. 30 depicts yarn 101 and coating 103 in an exposed state, and the overall diameter of coating 103 is increased substantially. Accordingly, exposing textile 100 to the physical stimulus induces the combination of yarn 101 and coating 103 to transform dimensionally.

In some embodiments, the diameter of yarn 101 remains substantially constant whether exposed or unexposed to the physical stimulus, and coating 103 swells or otherwise transforms dimensionally in the presence of a physical stimulus. In other embodiments, coating 103 may compress yarn 101 when exposed to the physical stimulus. In any event, however, the overall diameter of the combination of yarn 101 and coating 103 increases when exposed to the physical stimulus. Although yarn 101 may be formed from a material that is dimensionally-stable in the presence of the physical stimulus, yarn 101 may also be formed from a material that transforms dimensionally in the presence of a physical stimulus.

Coating 103 may be added to yarn 101 prior to forming textile 100. An advantage of this procedure is that specific yarns within textile 100 include coating 103. In other embodiments, coating 103 may be added to textile 100 following the formation of textile 100. That is, a printing process (e.g., a screen-printing process) may be utilized to place coating 103 over a defined area of textile 100. In contrast with the configuration depicted in FIG. 28, the use of a printing process applies coating 103 to areas of textile 100, rather than individual yarns within textile 100.

Summary of Textile Structures

Based upon the above discussion, various textiles may be formed from fibers, filaments, or yarns that transform dimensionally in the presence of a physical stimulus. The dimensional transformation of the yarns modifies the structures of the textiles, thereby inducing a change in the properties of textiles. Depending upon the material selected for the yarns, water or a change in the temperature of the textiles, for example, may be utilized as the physical stimulus. When incorporated into an article of apparel, the change in the properties of the textiles when exposed to the physical stimulus may be utilized to insulate the individual from specific environmental conditions or adapt to changing perspiration levels of the individual, for example. Accordingly, the present invention relates to textiles that effectively adapt to enhance the comfort of the individual wearing the apparel.

VII. Exemplar Altered Textile Structures

The above material disclosed a variety of textiles with a structure that is modified by a physical stimulus in order to change the properties of the textile. Various ways in which these or other textile structures may be altered will now be discussed. For example, materials may be bonded to a textile structure in order to impart stretch resistance, incisions or partial incisions may be formed in the textile structure, or coatings may be applied to block effects of the physical stimulus.

First Altered Textile Structure

Each of the textile structures discussed above are primarily formed from various filaments, fibers, or yarns. Depending upon the specific materials that form the filaments, fibers, or yarns, the various textiles disclosed above may exhibit substantial stretch characteristics. That is, the textiles may deform significantly when exposed to a tensile force. In order to limit stretch in the textiles, various materials with a greater degree of stretch resistance may be bonded or otherwise secured to the textiles.

Figure 31:
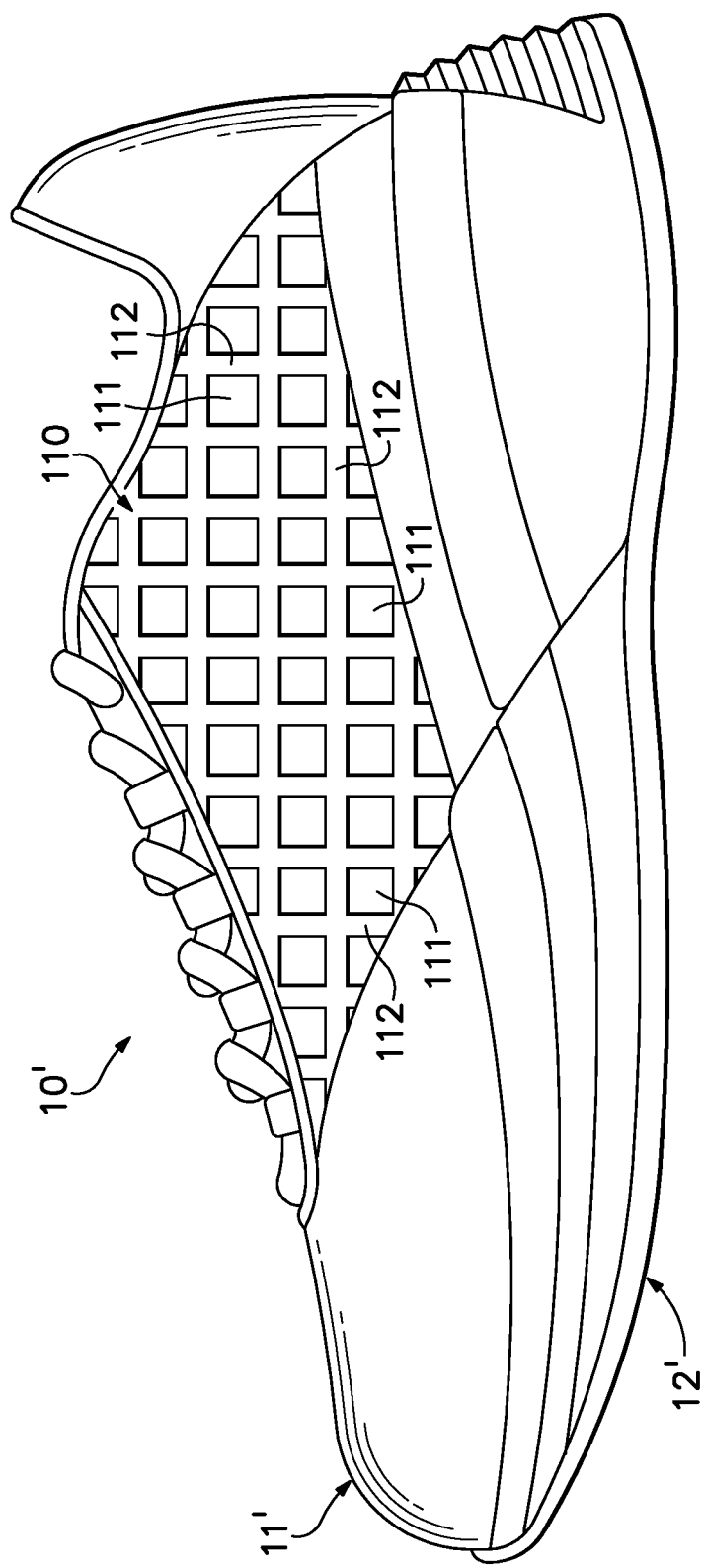
FIG. 31 is a side elevational view of an article of footwear incorporating a first altered textile structure in accordance with the present invention.
Figure 32:
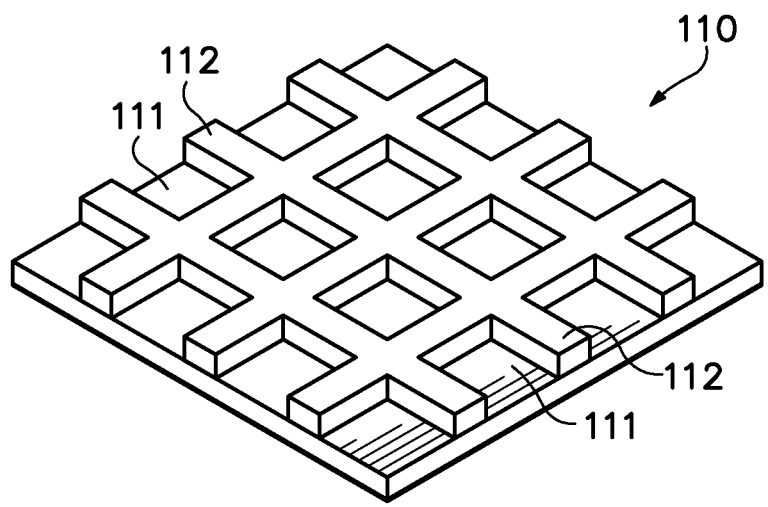
FIG. 32 is a perspective view of a portion of the first altered textile structure.
Figure 33:
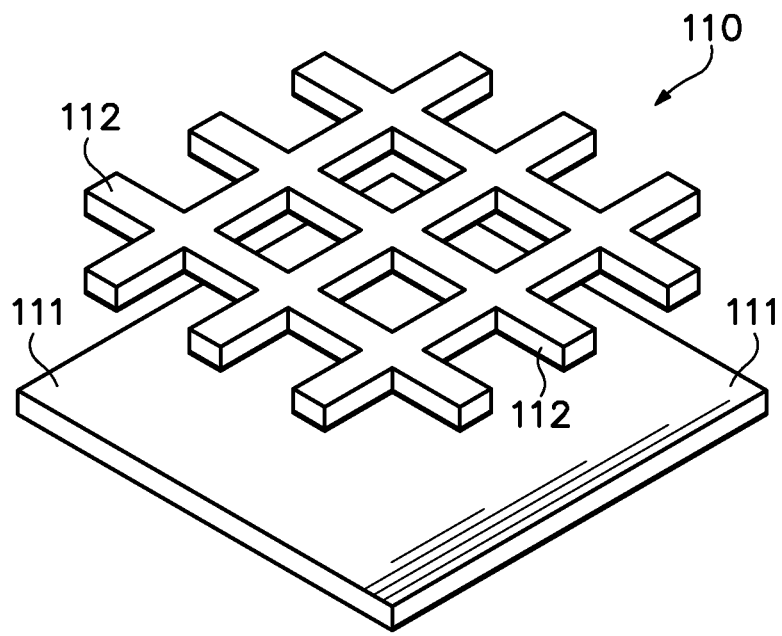
FIG. 33 is an exploded perspective view of the first altered textile structure.

With reference to FIG. 31, another article of apparel is disclosed, specifically an article of footwear 10' having an upper 11' and a sole structure 12'. In contrast with conventional articles of footwear, upper 11' incorporates a textile 110 having a base layer 111 and a reinforcing structure 112, as depicted in FIGS. 32 and 33. Base layer 111 may be any of the various textile structures disclosed above. That is, base layer 111 may be any of textiles 20, 30, 40, 50, 60, 70, 80, 90, or 100. Accordingly, base layer 111 has a structure that is modified by a physical stimulus in order to change the overall properties of textile 110.

Reinforcing structure 112 is a polymer sheet, for example, having a plurality of generally square apertures that define the configuration of a grid with horizontal segments that cross vertical segments. Whereas base layer 111 may stretch significantly when subjected to a tensile force, reinforcing structure 112 stretches to a lesser degree when subjected to the same tensile force. In this configuration, the stretch resistance of reinforcing structure 112 imparts stretch resistance to the entirety of textile 110. Accordingly, reinforcing structure 112 limits the overall degree to which textile 110 may stretch.

Articles of footwear, such as footwear 10', may be subjected to significant forces when used for walking, running, or other ambulatory activities. More particularly, the foot may exert significant forces upon upper 11' during the athletic activities. These forces may tend to stretch upper 11' or otherwise place the materials of upper 11' in tension. Although a relatively small degree of stretch in upper 11' may enhance the overall comfort of footwear 10', significant stretch may not be beneficial. Accordingly, reinforcing structure 112 limits the overall degree to which textile 110 may stretch, thereby countering the inherent stretch in base layer 111.

As discussed in detail above, each of the various textile structures are modified by a physical stimulus in order to change the overall properties of the textile structures. For example, portions of the textiles may transform dimensionally in the presence of heat or water in order to form apertures that allow heated air or perspiration to escape. Similarly, portions of the textiles may transform dimensionally in the presence of heat or water in order to close apertures that restrict heated air or precipitation from entering footwear 10'. The addition of reinforcing structure 112 to any of the textile structures discussed above enhances the overall properties of the textile structures and the suitability of the textile structures for footwear or other athletic equipment applications. In other words, the combination of base layer 111 and reinforcing structure 112 provides a textile that is modified by a physical stimulus in order to change the overall properties of footwear 10', and also provides a textile with a desired degree of stretch resistance.

Stretch resistance is not the only advantage that may be gained through the addition of reinforcing structure 112. For example, reinforcing structure 112 or similar structures may impart abrasion resistance, thereby enhancing the durability of textile 110. In addition, reinforcing structure 112 may enhance the aesthetic appeal of articles that incorporate textile 110. Furthermore, reinforcing structure 112 may also provide a durable location for securing or otherwise incorporating textile 110 to an article.

Figure 34A:
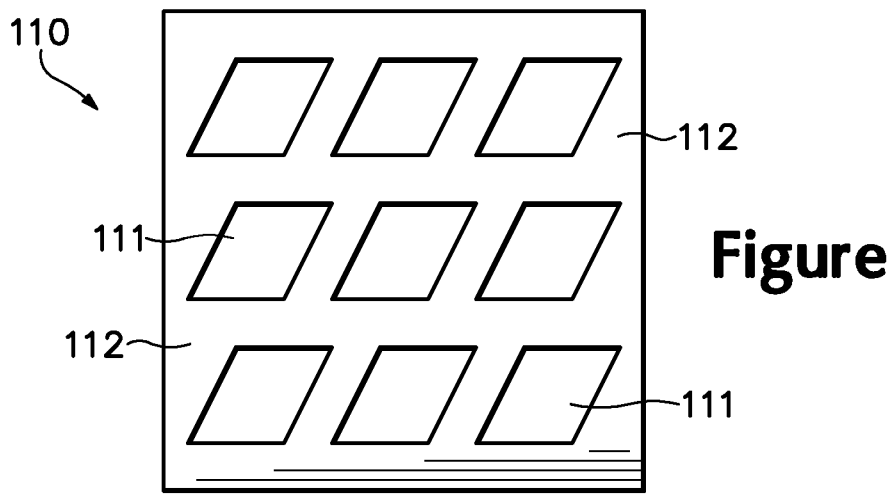
FIGS. 34A-34E are plan views of alternate configurations of the first altered textile structure.
Figure 34B:
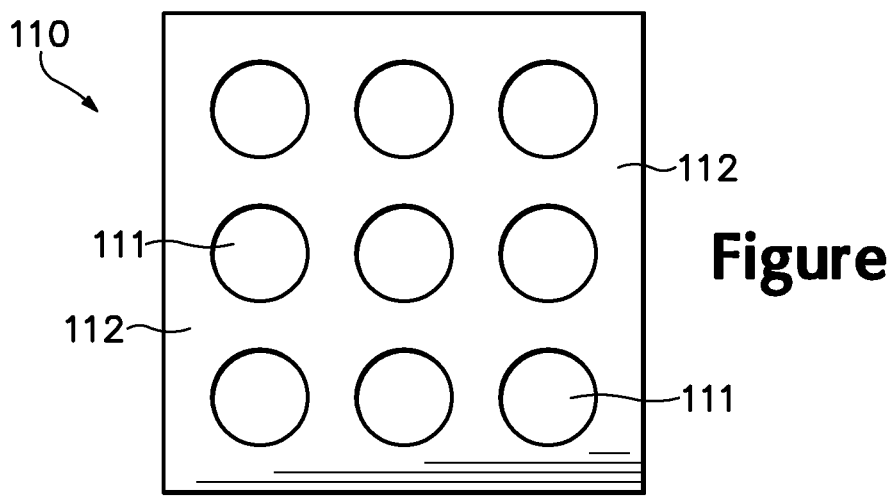
Figure 34C:
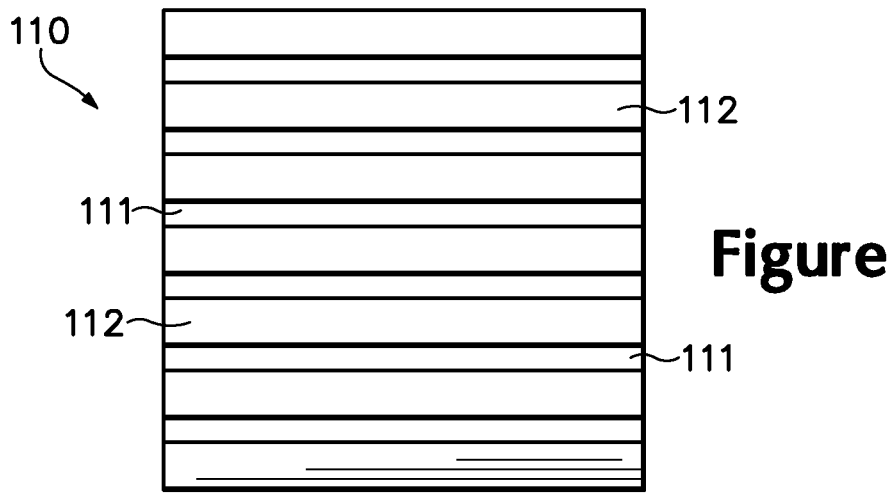
Figure 34D:
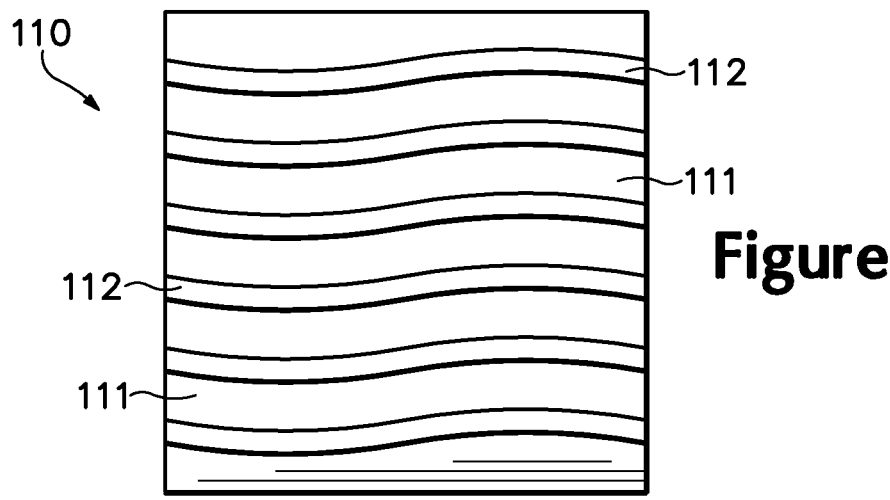
Figure 34E:
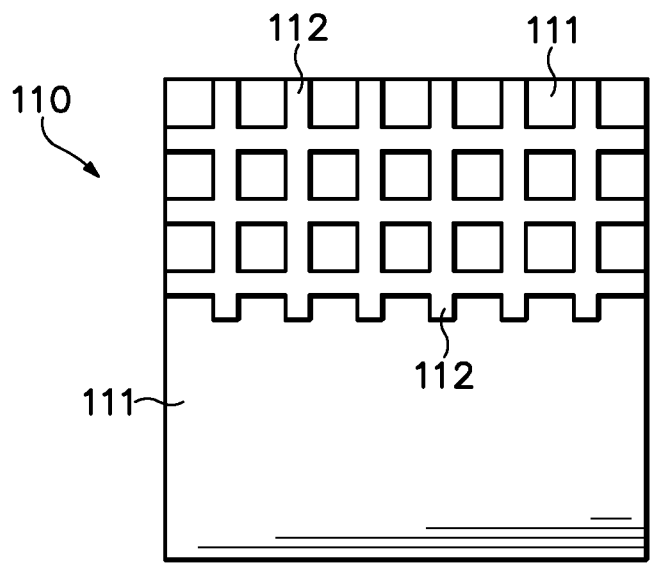

Reinforcing structure 112 is discussed above as having a grid configuration defining generally square apertures. Reinforcing structure 112 may also define trapezoidal or round apertures, as respectively depicted in FIGS. 34A and 34B, or any other practical shape. When stretch resistance is desired in a particular direction, linear or curved strips of reinforcing structure 112 may be combined with base layer 111, as respectively depicted in FIGS. 34C and 34D. In addition, when stretch resistance is desired in only a particular area of a textile, reinforcing structure 112 may be located in only a portion of textile 110. Accordingly, the particular configuration of reinforcing structure 112 may vary significantly depending upon the particular application or requirements for textile 110.

Reinforcing structure 112 is discussed above as a polymer sheet, but may be a variety of other materials within the scope of the present invention. For example, reinforcing structure 112 may be a different textile, a spacer mesh material, leather, synthetic leather, or a film that is secured to base layer 111. Reinforcing structure 112 may also be a polymer that impregnates the structure of base layer 111. That is, a molten polymer material may be injected onto base layer 111 so as to form reinforcing structure 112. In some embodiments, reinforcing structure 112 may be a yarn or filament woven into base layer 111 that is less stretchable than base layer 111. Accordingly, the specific materials that are suitable for reinforcing structure 112 may vary significantly within the scope of the present invention.

Second Altered Textile Structure

Figure 35:
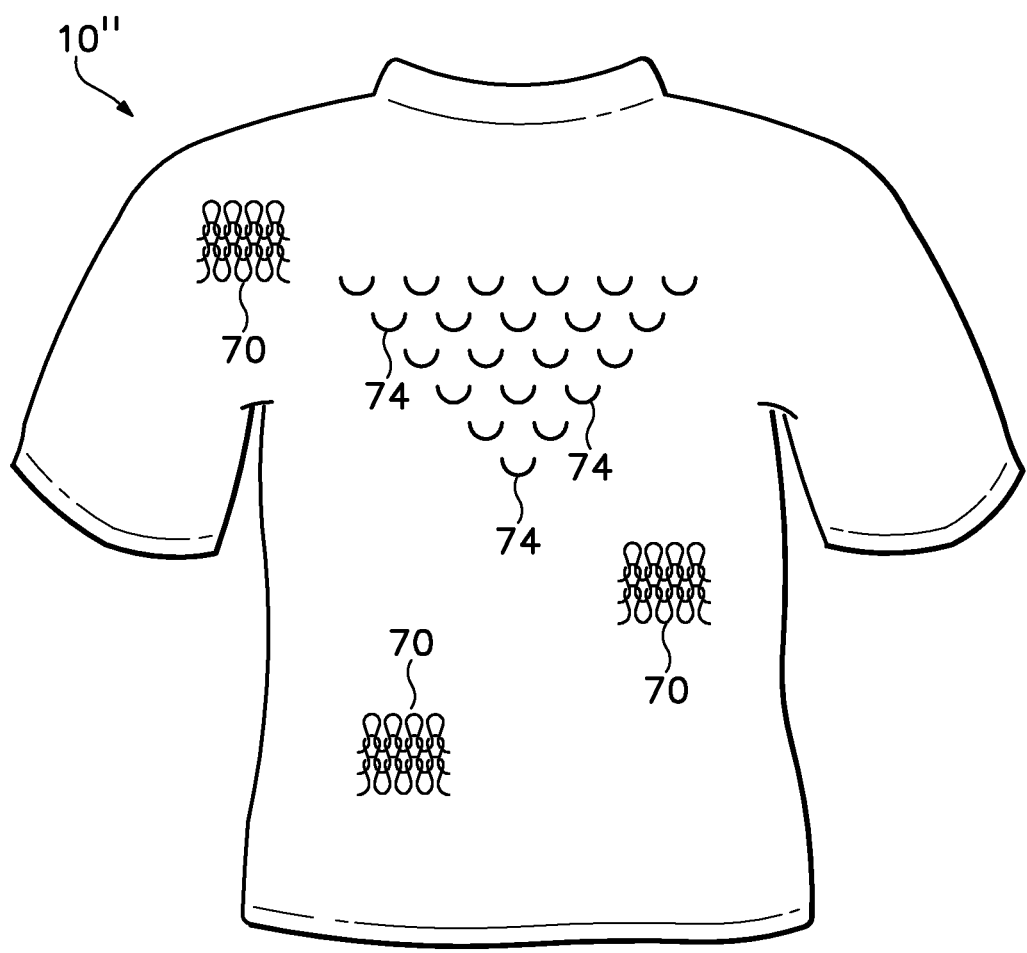
FIG. 35 is a plan view of an article of apparel incorporating a second altered textile structure in accordance with the present invention.
Figure 36:
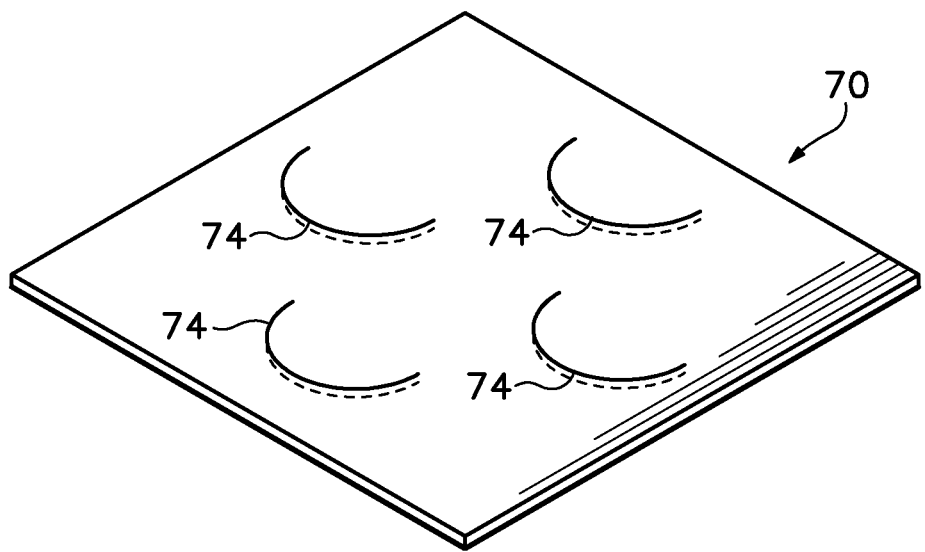
FIG. 36 is a perspective view of a portion of the second altered textile structure in an unexposed state.
Figure 37:
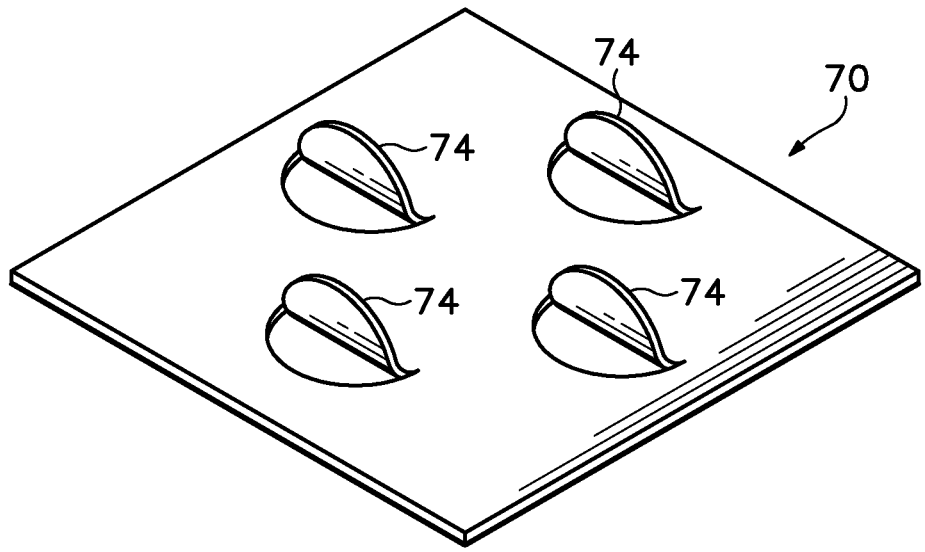
FIG. 37 is a perspective view of the portion of the second altered textile structure in an exposed state.

Another manner of altering any of the textile structures disclosed above relates to the formation of incisions. FIG. 35 depicts an article of apparel 10" that is substantially formed from textile 70, as disclosed above. A plurality of semi-circular incisions 74 extend through textile 74 and, therefore, extend through each of yarns 71 and 72. With reference to FIG. 36, a portion of textile 70 having incisions 74 is depicted in an unexposed state, in which yarns 71 and 72 are not exposed to the physical stimulus. With reference to FIG. 37, however, textile 70 is depicted in an exposed state, in which yarns 71 and 72 are exposed to the physical stimulus. In the unexposed state, textile 70 lies relatively flat and a flap that is formed by incisions 74 is in a closed configuration. In the exposed state, however, the flaps that are formed by incisions 74 curl upward and form apertures in textile 70, thereby modifying the structure and properties of textile 70.

The alteration in the structure of textile 70 (i.e., the formation of incisions 74) changes the properties of textile 70. In the unexposed state, textile 70 lies flat and incisions 74 do not form apertures. In the exposed state, however, the flaps formed by incisions 74 curl upward to form apertures in textile 70, which permit increased air flow between the exterior and interior of apparel 10". Exposing textile 70 to a physical stimulus not only increases the texture of textile 70, as discussed above, but also increases the air flow properties of textile 70.

Textile 70 is structured such that yarn 71 is concentrated on one surface and yarn 72 is concentrated on an opposite surface. When exposed to the physical stimulus, such as water or a change in temperature, for example, yarn 71 transforms dimensionally and increases in size. The increase in the size of textile 70 due to an increase in the size of yarn 71 is constrained by the relative dimensional-stability of yarn 72. Accordingly, the swelling of yarn 71 causes the flaps formed by incisions 74 to curl upward and toward the surface where yarn 72 is concentrated. Textile 70 is not the only textile structure that will react in this fashion when exposed to a physical stimulus. Each of textiles 80 and 90 may also exhibit similar properties due to the concentration of materials that transform dimensionally on one surface, and the concentration of dimensionally-stable materials on an opposite surface.

Figure 38A:
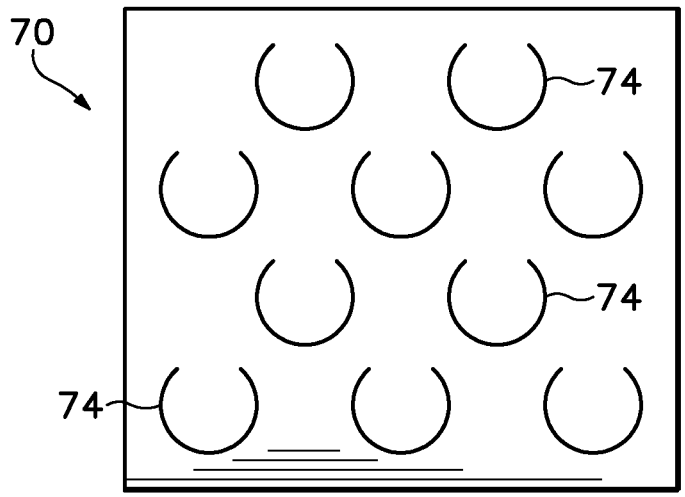
FIGS. 38A-38E are plan views of alternate configurations of the second altered textile structure.
Figure 38B:
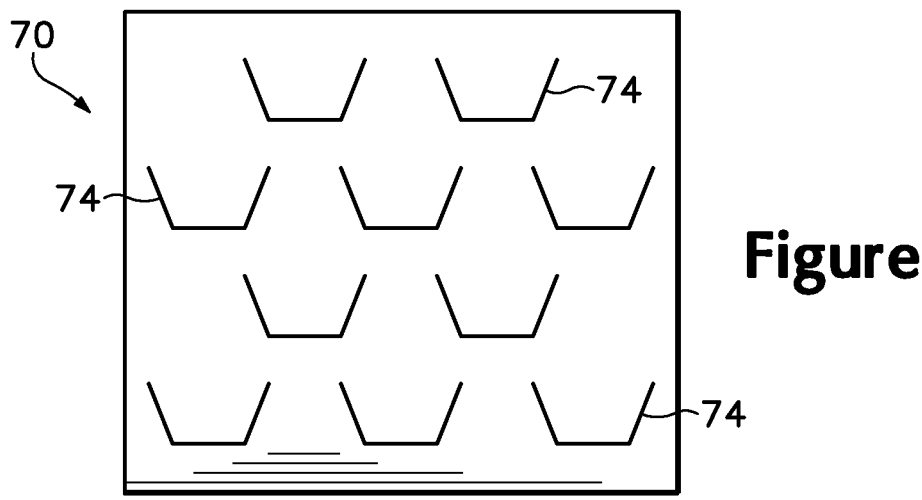
Figure 38C:
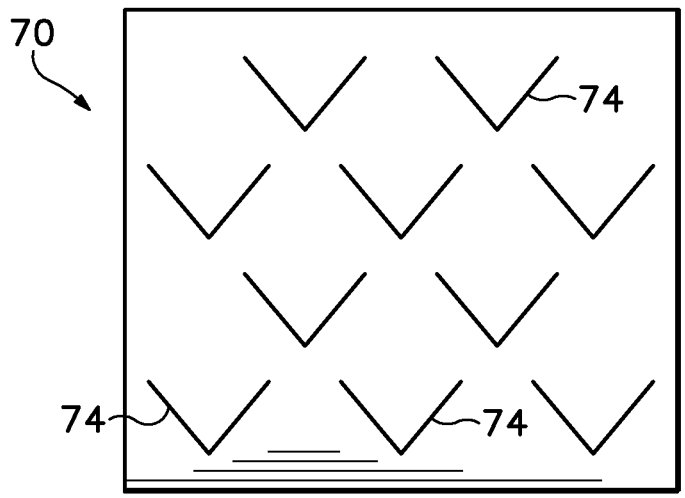
Figure 38D:
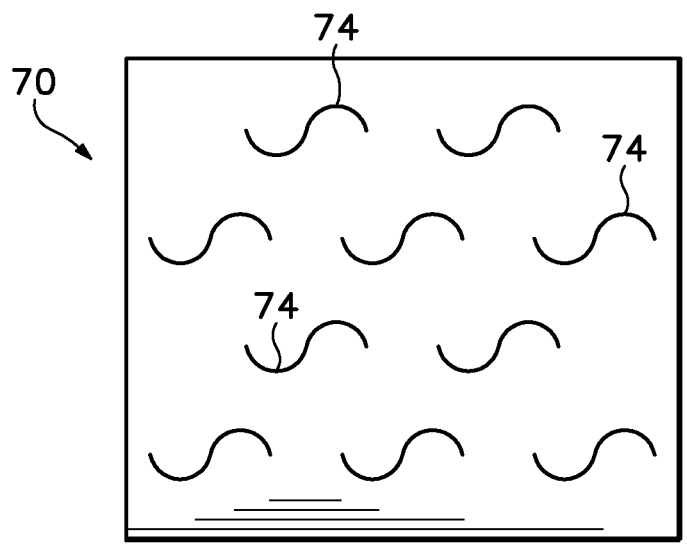
Figure 38E:
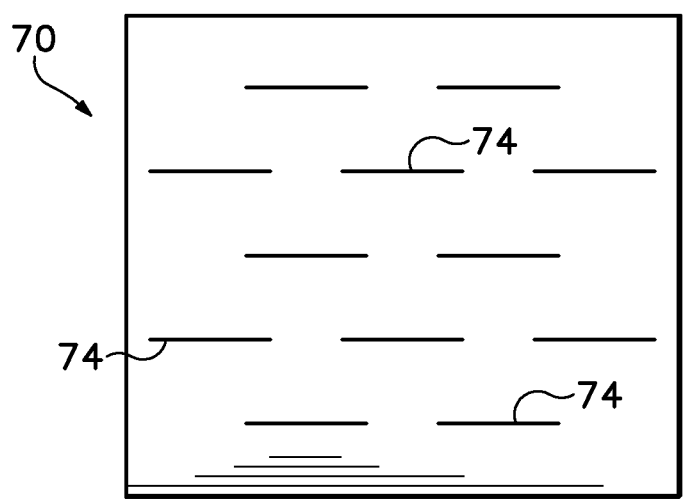

Although incisions 74 may exhibit the semi-circular shape discussed above, a variety of other shapes may also be suitable for incisions 74. For example, incisions 74 may have a more circular shape or an angular shape, as respectively depicted in FIGS. 38A and 38B. Incisions 74 may also exhibit a v-shaped or s-shaped configuration, as respectively depicted in FIGS. 34A and 34D. In some embodiments, incisions 74 may depart from the non-linear shapes discussed above and be linear, as depicted in FIG. 38E.

Various techniques, including a die cutting or laser cutting operation, may be utilized to form incisions 74. In some circumstances, incisions 74 may be formed through the knitting process of textile 70. That is, yarns 71 and 72 may be mechanically-manipulated in a manner that forms incisions 74.

Third Altered Textile Structure

Each of textiles 70, 80, and 90 exhibit a configuration wherein the material that transforms dimensionally when exposed to a physical stimulus is concentrated on one surface of the textile structures. Incisions that are similar to incisions 74 may be formed in any of the textile structures disclosed above. When cut to form incisions 74, textile 70 remains in a flat configuration until exposed to a physical stimulus. Some textile structures, however, may curl when cut and not exposed to a physical stimulus.

Figure 39:
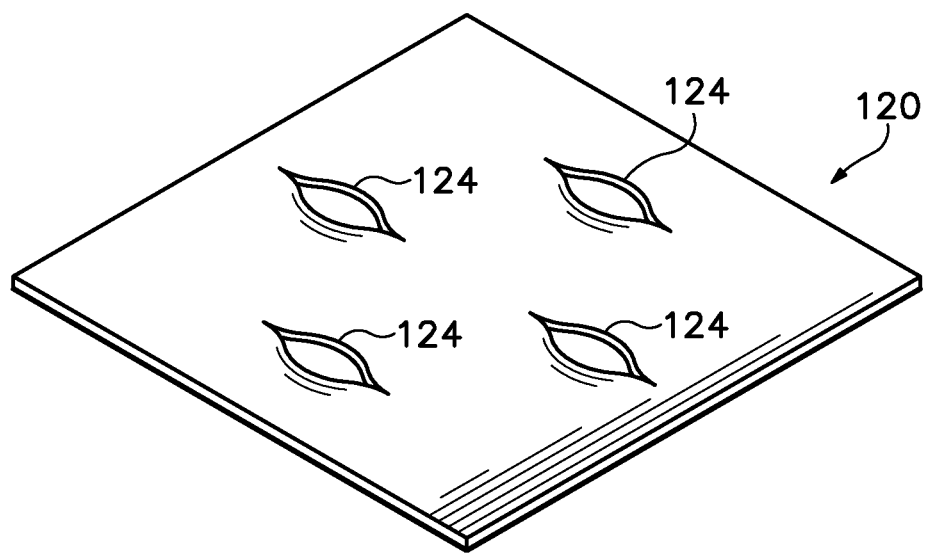
FIG. 39 is a perspective view of a portion of a third altered textile structure in an unexposed state.
Figure 40:
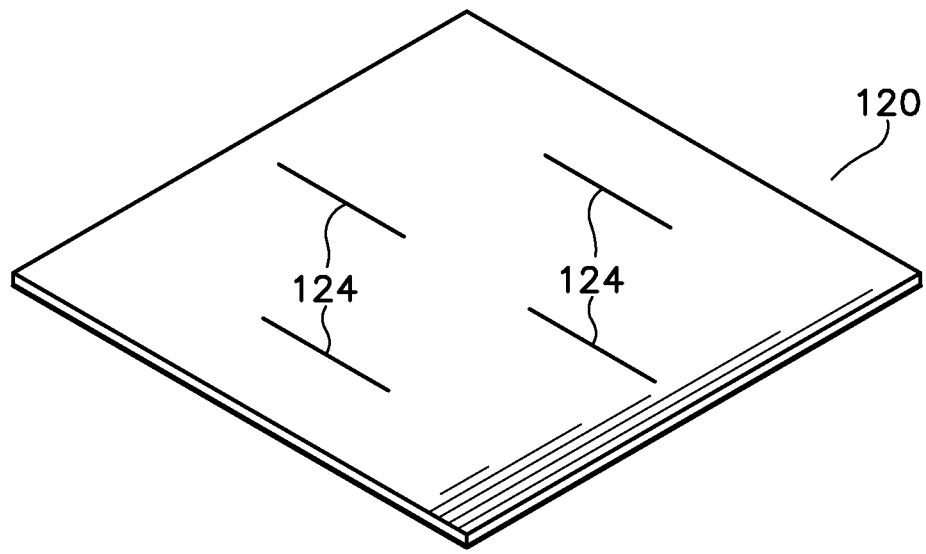
FIG. 40 is a perspective view of the portion of the third altered textile structure in an exposed state.

With reference to FIG. 39 a textile 120 in an unexposed state is depicted. Textile 120 includes a plurality of incisions 124. The manner in which textile 120 is mechanically-manipulated from various yarns, and the materials forming the yarns, are selected to cause the edges of incisions 124 to curl when cut and unexposed to a physical stimulus. When exposed to a physical stimulus, however, the edges uncurl due to the dimensional transformation of yarns, as depicted in FIG. 40. That is, apertures that are formed by incisions 124 close when exposed to a physical stimulus.

When incorporated into apparel, for example, textile 120 may be utilized to shield an individual from precipitation. When water is not present, incisions 124 form apertures in the apparel that facilitate air flow between the interior and exterior of the apparel. In the presence of precipitation, however, the apertures formed by incisions 124 close to limit the degree to which the precipitation may enter the apparel. Accordingly, the apparel may adapt to changing environmental conditions.

Fourth Altered Textile Structure

Figure 41:
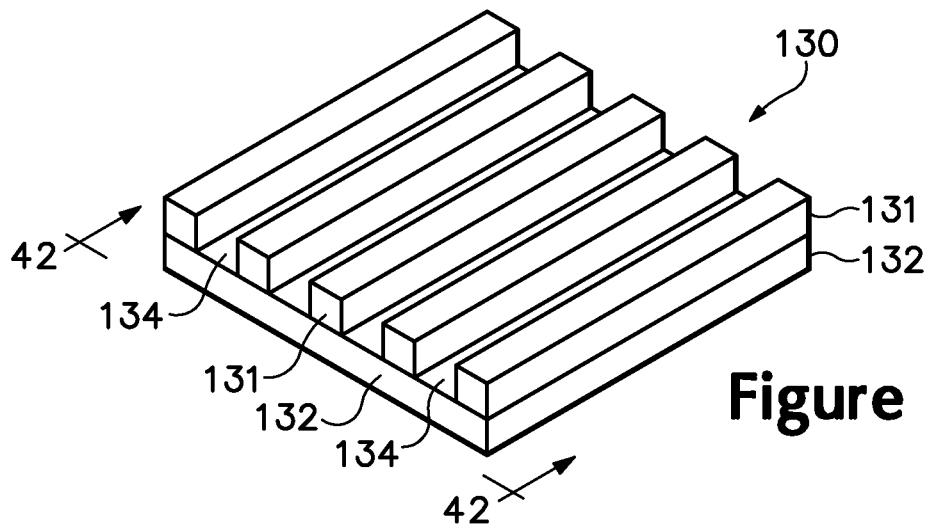
FIG. 41 is a perspective view of a portion of a fourth altered textile structure.
Figure 42A:
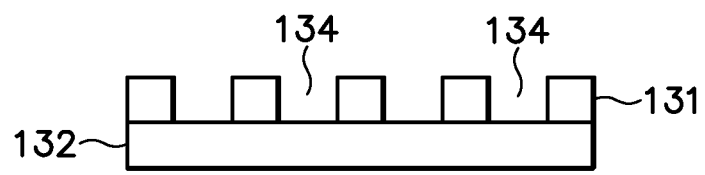
FIGS. 42A-42C are schematic cross-sectional views of the fourth altered textile structure, as defined along section line 42-42 in FIG. 41.

Incisions 74 and 124 respectively extend entirely through textiles 70 and 120. In some circumstances, however, incisions that extend only partially through a textile structure may be beneficial. FIG. 41 depicts a textile 130 that includes a plurality of partial incisions 134 that extend only partially through textile 130. With reference to FIG. 42A, textile 130 is depicted schematically as including a layer 131 and another layer 132, with partial incisions 134 extending through layer 131. Layer 131 and layer 132 schematically-represent the general configurations of textiles 70, 80, and 90, wherein materials that transform dimensionally in the presence of a physical stimulus are concentrated adjacent one surface, and materials that are dimensionally-stable are concentrated adjacent an opposite surface.

Partial incisions 134 extend entirely through layer 131 in FIG. 42A, and layer 131 is, therefore, absent from this area. Layer 131 may incorporate, for example, a majority of the materials that transform dimensionally in the presence of a physical stimulus. Forming partial incisions 134 effectively deactivates these materials. Accordingly, the formation of partial incisions 134 is a manner of preventing or limiting a change in the properties of specific areas of textile 130 due to the presence of a physical stimulus. Although partial incisions 134 are depicted as having a linear structure, partial incisions 134 may cover an area of textile 130.

Figure 42B:
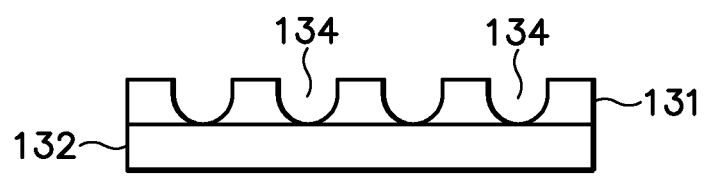
Figure 42C:
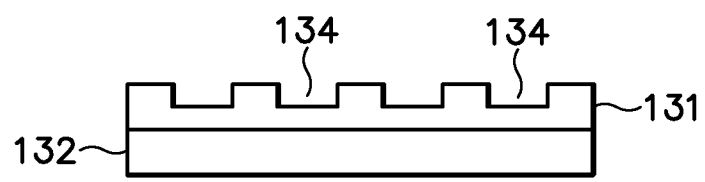

Although partial incisions 134 may represent areas where layer 131 is absent, partial incisions 134 may also form areas where layer 131 is melted or only partially absent. With reference to FIGS. 42B and 42C, partial incisions 134 form depressions in layer 131. One manner of forming the depressions is to melt the material of layer 131, thereby concentrating this material in a lower area of layer 131. In effect, therefore, partial incisions 134 may represent melted areas of layer 131. Although the material that is melted and within partial incisions 134 may be the same material that transforms dimensionally in the presence of a physical stimulus, the greater concentration of the material in partial incisions 134 may limit the change in the properties of textile 130 when exposed to the physical stimulus. That is, melting portions of layer 131 may effectively deactivate the material that transforms dimensionally in the presence of a physical stimulus. Suitable methods of forming partial incisions 134 include laser cutting or heated dies, for example.

Although partial incisions 134 may extend into the material that transforms dimensionally in the presence of a physical stimulus, partial incisions 134 may also extend into a dimensionally-stable material. That is, partial incisions 134 may extend through layer 132 rather than layer 131. In some embodiments, partial incisions may extend partially through a material that includes a single layer, as in textiles 20, 30, and 40, for example.

The melting of the material forming either of layers 131 or 132 in order to form partial incisions 134 may also be used to form a structure that is similar to reinforcing structure 112. As discussed above, reinforcing structure 112 may impart stretch resistance or abrasion resistance to a textile. By melting portions of layers 131 or 132, the materials forming layers 131 and 132 effectively concentrate and may also impart stretch resistance or abrasion resistance to textile 130. Accordingly, the formation of partial incisions 134 is another manner of forming reinforcing structure 112.

Fifth Altered Textile Structure

Figure 43:
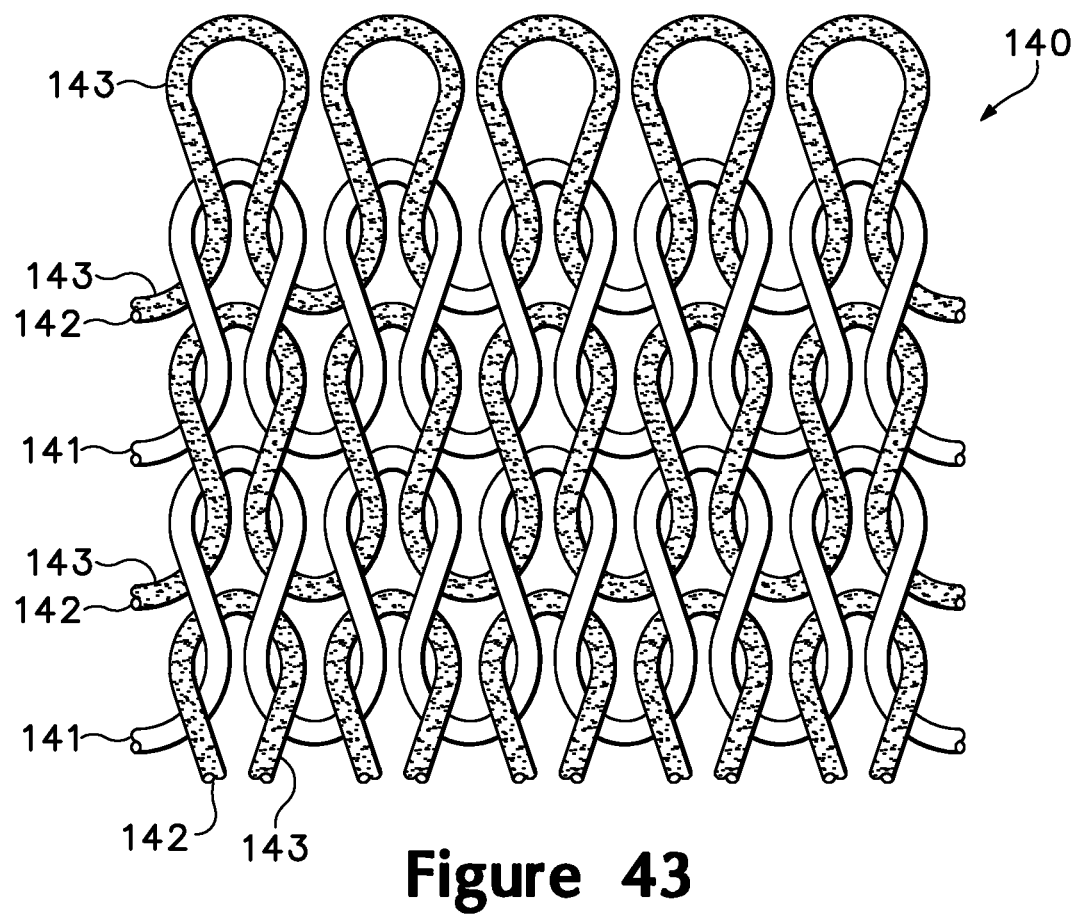
FIG. 43 is a plan view of a portion of a fifth altered textile structure.
Figure 44:
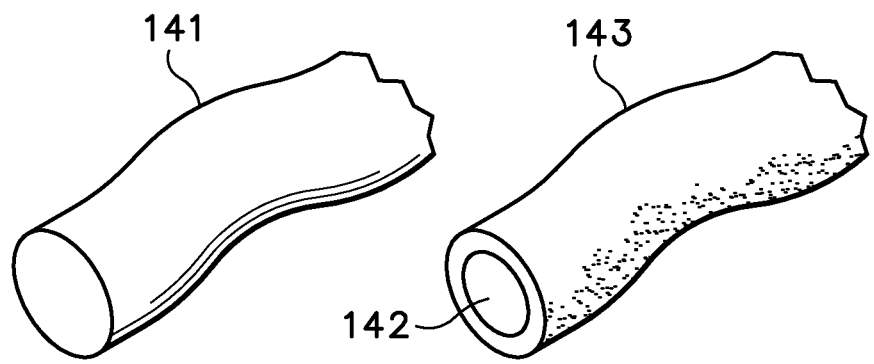
FIG. 44 is a schematic perspective view of a coated yarn and an uncoated yarn, each being in an unexposed state, from the fifth altered textile structure.
Figure 45:
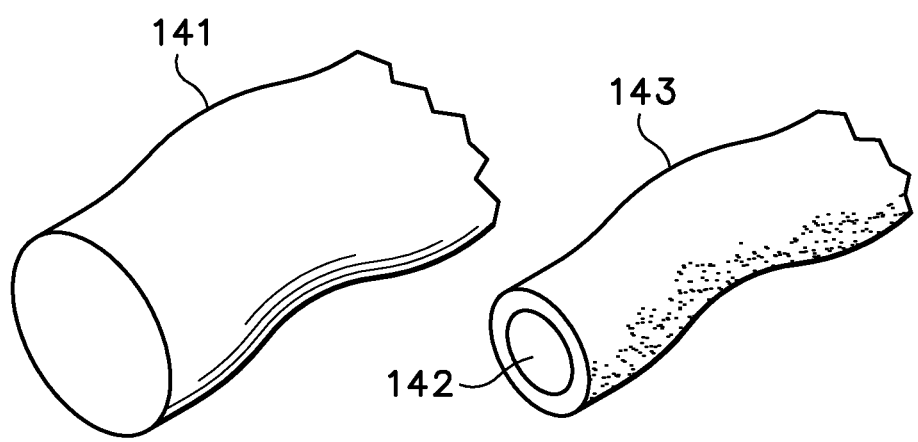
FIG. 45 is a schematic perspective view of the coated yarn and the uncoated yarn, each being in an exposed state, from the fifth altered textile structure.

The formation of partial incisions in a textile is one manner of blocking or deactivating the dimensional transformation of the textile in the presence of a physical stimulus. Coatings on the fibers, filaments, or yarns may also be utilized to block a physical stimulus from inducing dimensional transformation of the material. With reference to FIG. 43, a textile 140 that includes a yarn 141 and a yarn 142 is disclosed. Yarn 141 and yarn 142 are formed from a material that transforms dimensionally in the presence of a physical stimulus. In contrast with yarn 141, however, yarn 142 includes a coating 143 that blocks the physical stimulus from yarn 142. FIG. 44 depicts yarns 141 and 142 in an unexposed state, and yarns 141 and 142 have similar diameters. FIG. 45 depicts yarns 141 and 142 in the exposed state, and the overall diameter of yarn 141 is significantly greater than the diameter of yarn 142. Accordingly, exposing textile 140 to the physical stimulus induces yarn 141 to transform dimensionally, but coating 143 prevents or otherwise limits the dimensional transformation of yarn 142.

A variety of materials may be suitable for coating 143. If, for example, the material forming yarns 141 and 142 transform dimensionally in the presence of water, any waterproof coating may be utilized. If the physical stimulus is light or heat, opaque or insulative coatings may be utilized. Coating 143 may be added to yarn 142 prior to forming textile 140. An advantage of this procedure is that specific yarns within textile 140 include coating 143. In other embodiments, coating 143 may be added to textile 140 following the formation of textile 140. That is, a printing process (e.g., a screen-printing process) may be utilized to place coating 143 over a defined area of textile 140. In contrast with the configuration depicted in FIG. 43, the use of a printing process applies coating 143 to areas of textile 140, rather than individual yarns within textile 140.

Summary of Altered Textile Structures

Reinforcing structures, incisions, partial incisions, and coatings may be utilized to alter and enhance any of the textile structures disclosed above. Various combination of the reinforcing structures, incisions, partial incisions, and coatings may also be utilized to alter and enhance any of the textile structures disclosed above. For example, incisions or partial incisions may be formed in the apertures defined by a reinforcing structure. In addition, coatings may be utilized to affect the reaction of the areas having incisions.

VII. Apparel with a Zoned Modifiable Textile Structure

Figure 46A:
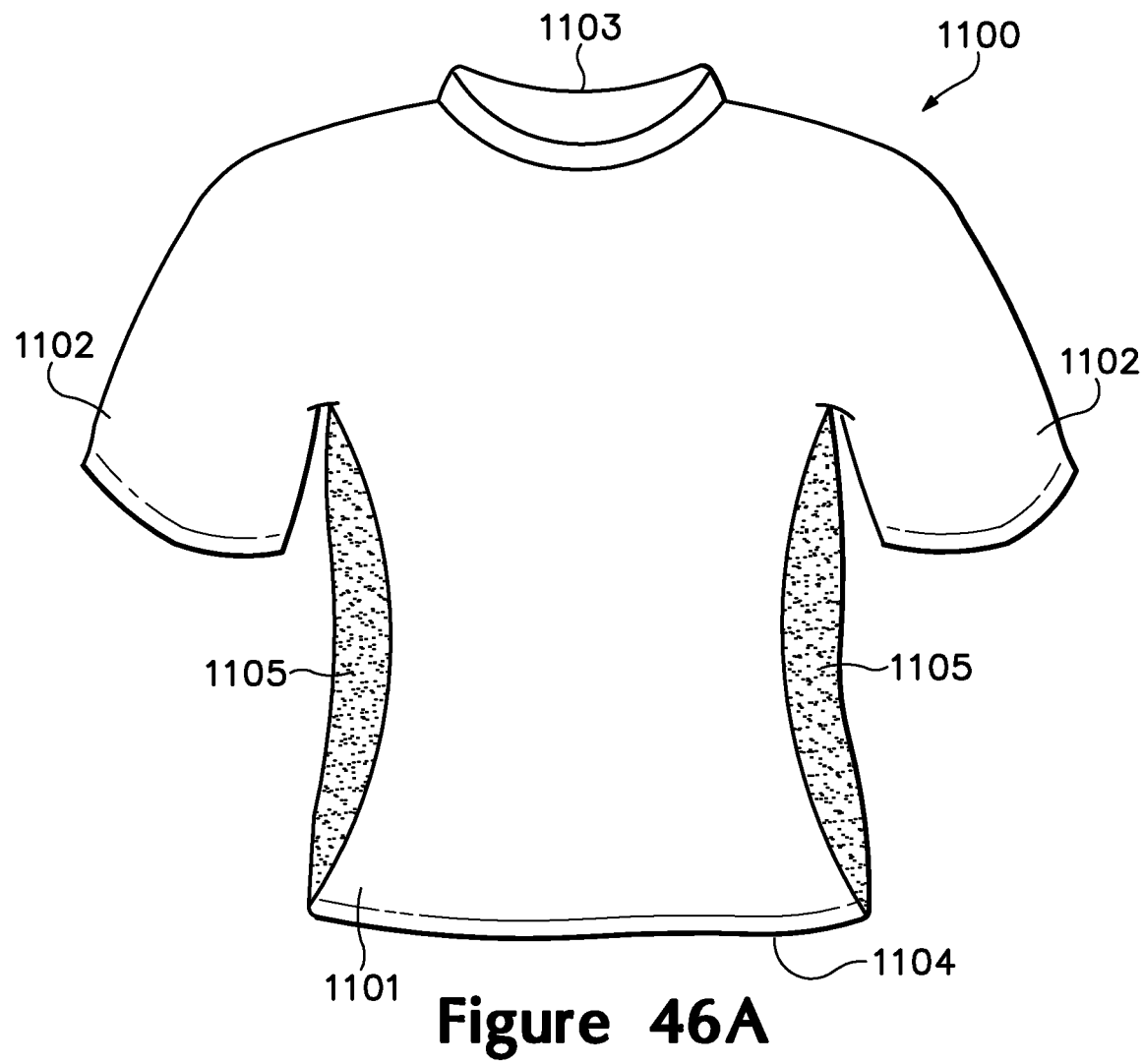
FIG. 46A is a front elevational view of an article of apparel incorporating a zoned textile.
Figure 46B:
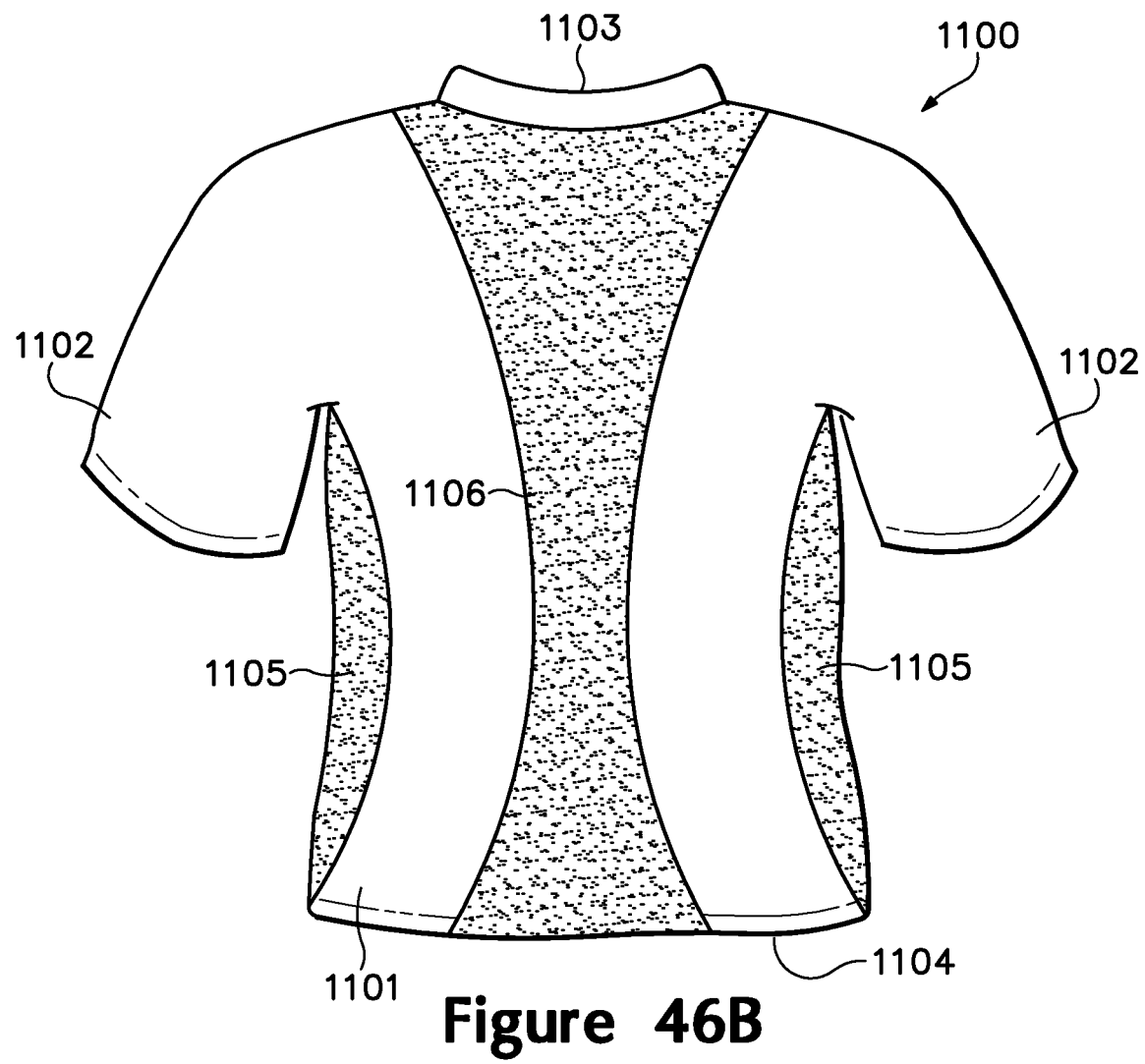
FIG. 46B is a back elevational view of the article of apparel depicted in FIG. 46A.

An article of apparel 1100 is disclosed in FIGS. 46A and 46B as including a torso region 1101 and a pair of arm regions 1102. In general, torso region 1101 extends from a neck opening 1103 to a waist opening 1104 to cover a substantial portion of a torso of the wearer. Arm regions 1102 extend from an upper area of torso region 1101 and receive arms of the wearer. Although apparel 1100 is depicted as being a short-sleeved shirt, any of the concepts disclosed below with respect to apparel 1100 may be incorporated into other types of apparel for covering the torso, such as a long-sleeved shirt, a shirt without sleeves (e.g., a tank top), or a jacket, for example.

Various materials are utilized in the apparel 1100. A majority of apparel 1100 may be formed from any conventional textile or other material that is suitable for apparel applications. In a pair of side areas 1105 and a center back area 1106, which correspond with back vented zone 202 and side vented zones 302 and 304 in FIG. 4, for example, any of the various materials disclosed above in the discussion of FIGS. 11-45 may be utilized. Accordingly, the air permeable material discussed in relation to FIGS. 1-10B may be replaced with a textile having a structure that changes or is otherwise modified by a physical stimulus, such as the presence of water or a temperature change.

As discussed above, an enhanced cooling effect may be gained by placing zones of an air permeable material in apparel locations that correspond with the sides and center back of the wearer. During times when the wearer does not have an elevated temperature (e.g., during warm-up or resting periods), a relatively high air permeability of the material may not be necessary to cool the core body temperature of the wearer. A lesser degree of air permeability may be beneficial, therefore, when the wearer does not have an elevated temperature. During times when the wearer does have an elevated temperature (e.g., during physical activities), however, a higher air permeability in locations that correspond with the sides and center back of the wearer may be beneficial. Accordingly, forming side areas 1105 and center back area 1106 from a material with a variable air permeability may provide a suitable degree of air permeability, regardless of whether the wearer has an elevated core body temperature.

Each of the textiles disclosed in FIGS. 12-21 react to temperature changes or the presence of water, for example, to change the air permeability of the textile. With reference to FIG. 18, for example, textile 50 is disclosed as having weft yarns 51 and warp yarns 52a and 52b that form a plurality of discrete openings 53. Whereas yarns 52a are formed from a material that dimensionally-transforms in the presence of a physical stimulus, yarns 51 and 52b are formed from a dimensionally-stable yarn that is not significantly affected by the physical stimulus. With reference to FIG. 18, textile 50 is depicted in an unexposed state, in which yarns 51, 52a, and 52b are not exposed to the physical stimulus. With reference to FIG. 19, however, textile 50 is depicted in an exposed state, in which yarns 51, 52a, and 52b are exposed to the physical stimulus. In the unexposed state, yarns 51, 52a, and 52b exhibit dimensions with a relatively narrow thickness such that the area of each opening 53 is relatively small. In the exposed state, however, warp yarns 52a exhibit a greater thickness and a greater degree of undulation, which increases the area of each opening 53. That is, exposing yarns 51, 52a, and 52b to the physical stimulus causes warp yarns 52a to increase in thickness and degree of undulation, which increases the area of each opening 53 and modifies the structure of textile 50.

The modification in the structure of textile 50 (i.e., increasing the area of openings 53) changes the properties of textile 50. In the unexposed state, each opening 53 is relatively small. In the exposed state, however, the area of each opening 53 is increased, which increases the overall permeability of textile 50 to water, light, and moving air, for example. That is, the greater area of each opening 53 in the exposed state increases the ease with which water, light, and moving air may penetrate through textile 50. Accordingly, exposing textile 50 to a physical stimulus increases the permeability properties of textile 50.

When incorporated into areas 1105 and 1106 of apparel 1100, a textile like textile 50 may be utilized to cool the individual and remove perspiration from the individual, for example. Based upon the above discussion, therefore, a textile having the configuration of textile 50, for example, effectively adapts to changing perspiration levels (i.e., the physical stimulus) of the wearer in order to enhance the comfort of the wearer.

Figure 47A:
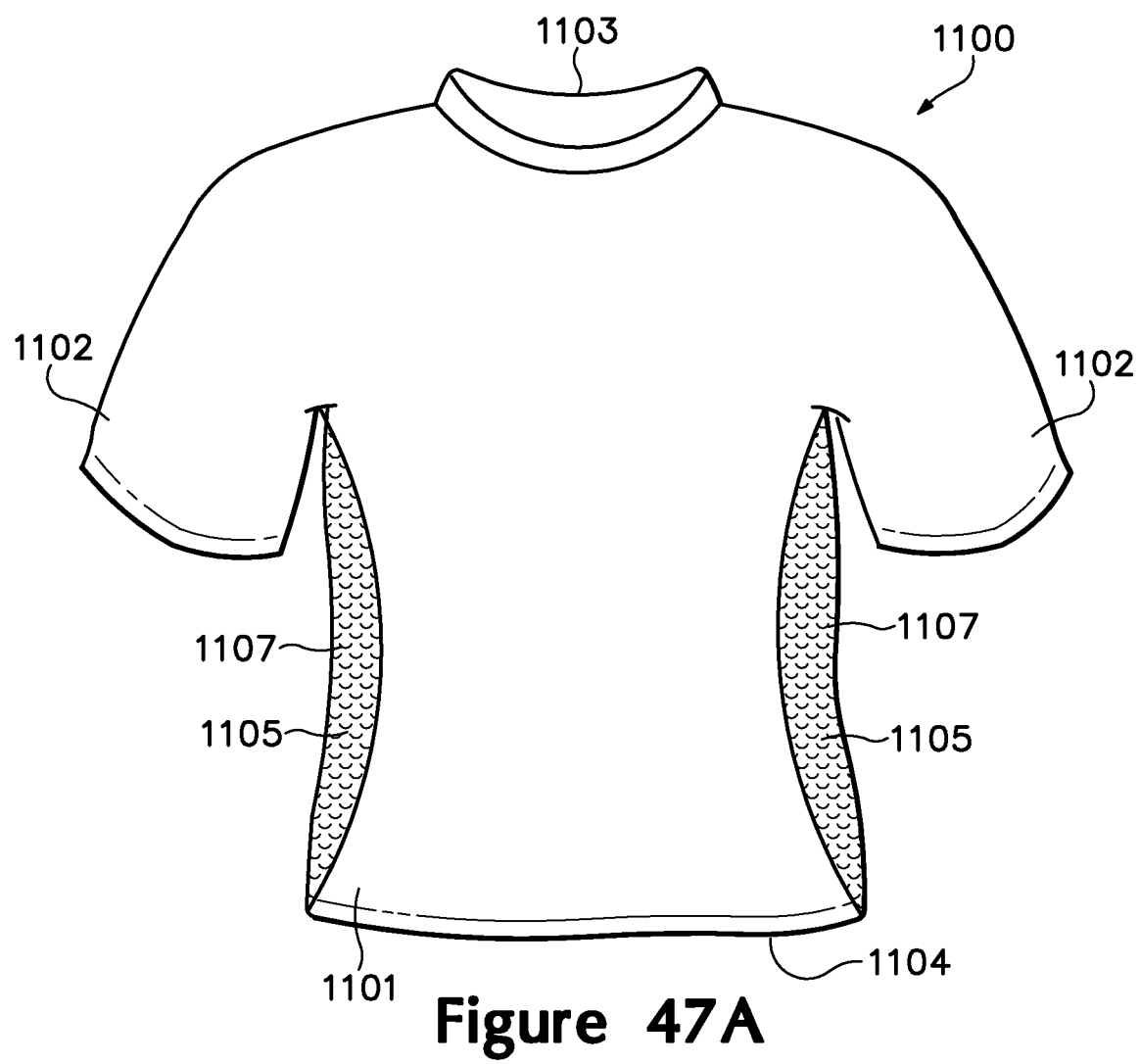
FIG. 47A is a front elevational view of another article of apparel incorporating a zoned textile.
Figure 47B:
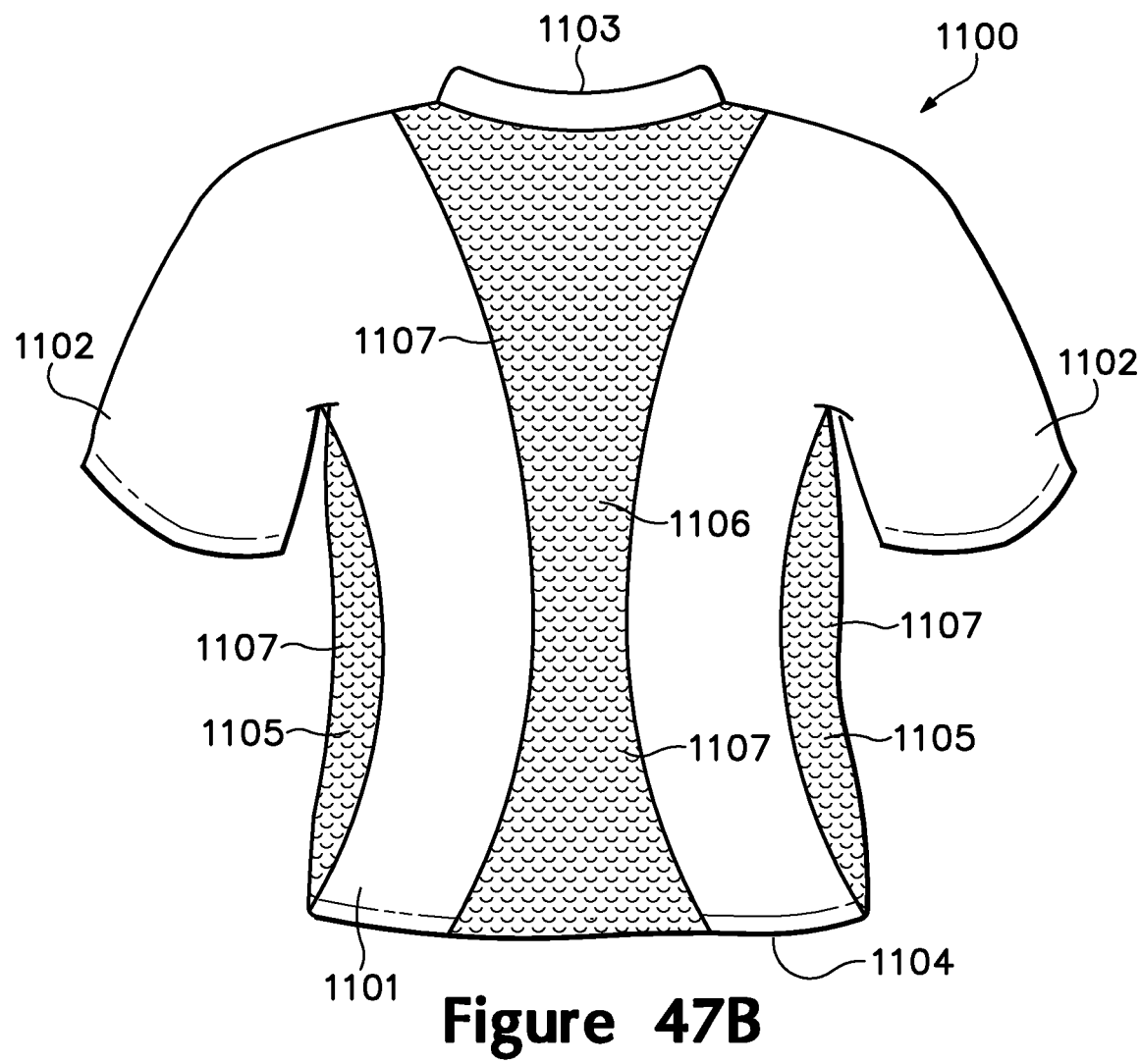
FIG. 47B is a back elevational view of the article of apparel depicted in FIG. 47A.

When exposed to the physical stimulus, the textile forming areas 1105 and 1106 will have a greater air permeability than other types of textile incorporated into apparel 1100. In some circumstances, the textile forming areas 1105 and 1106 will exhibit an air permeability of at least 550 ft$^3$/min per ft$^2$, but may also exhibit lower air permeabilities. In circumstances where a relatively high air permeability is desired, a plurality of incisions 1107 may be formed in areas 1105 and 1106 of apparel 1100, as depicted in FIGS. 47A and 47B. Incisions 1107 have the general configuration of the various incisions 74 and 124 that are depicted in FIGS. 35-40. More particularly, incisions 1107 may be formed to open in the presence of the physical stimulus in order to substantially increase the air permeability of areas 1105 and 1106. Although incisions 1107 are depicted as being semi-circular, a variety of other incision shapes may be utilized within the scope of the present invention.

The air permeability of textile 50 increases in the presence of the physical stimulus. Although this feature is beneficial for the reasons discussed above, any of the various textiles with a structure that changes or is otherwise modified by a physical stimulus may be incorporated into areas 1105 and 1106 of apparel 1100. Accordingly, a textile with an air permeability that decreases in the presence of a physical stimulus may be beneficial for apparel that is utilized in colder climates or wet environments. Similarly, a textile with a texture that increases in response to the physical stimulus may also be incorporated into apparel 1100. Accordingly, any of the materials disclosed in FIGS. 11-45 are suitable for apparel 1100.

Figure 48A:
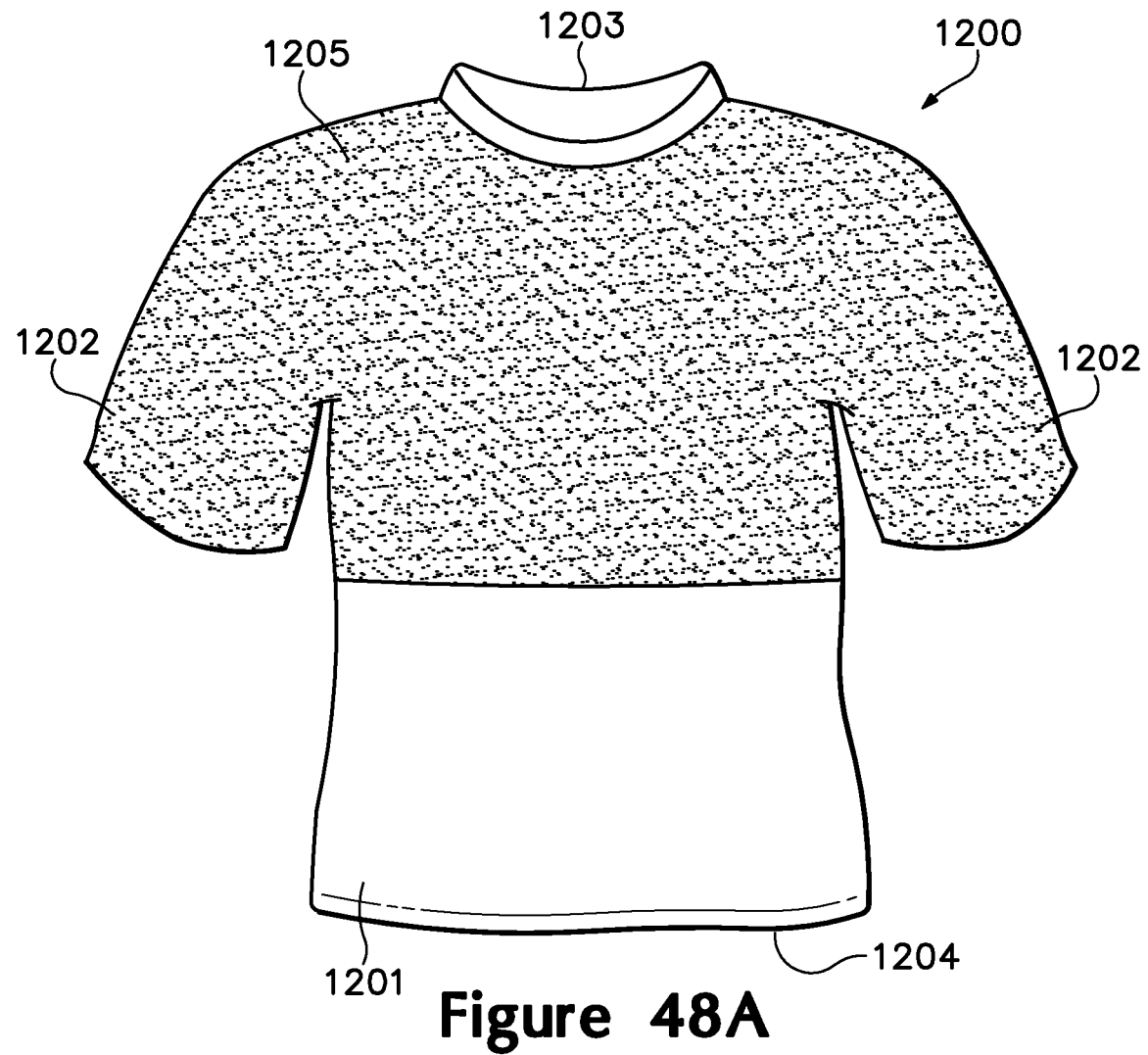
FIG. 48A is a front elevational view of yet another article of apparel incorporating a zoned textile.
Figure 48B:
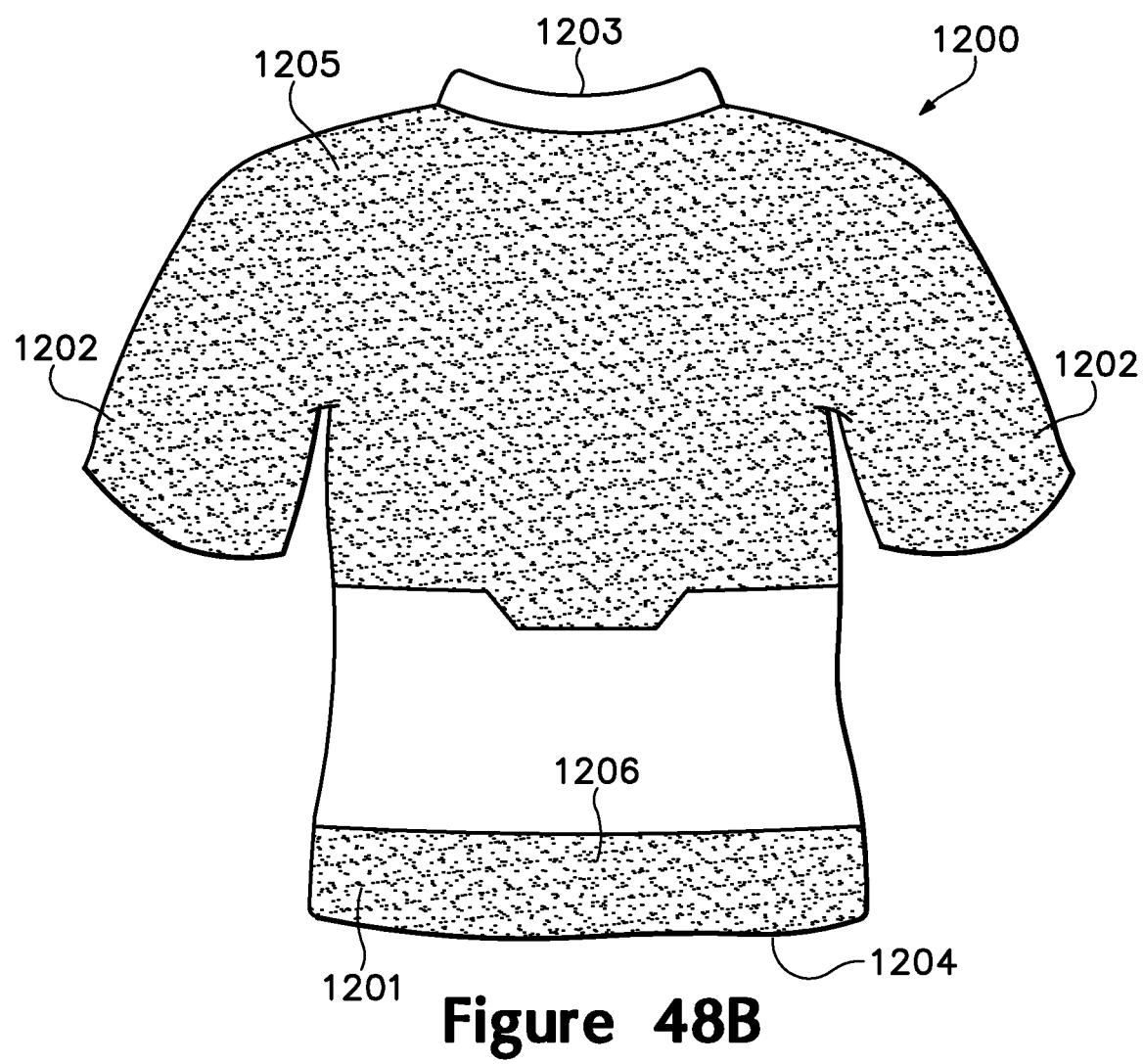
FIG. 48B is a back elevational view of the article of apparel depicted in FIG. 48A.

Apparel 1100 incorporates a material that changes or is otherwise modified by a physical stimulus. As discussed above, the air permeability of the material may increase in order to impart the enhanced cooling effect. Another manner of enhancing cooling and also decreasing the degree of cling in apparel is disclosed with reference to FIGS. 48A and 48B, in which an article of apparel 1200 includes a torso region 1201 and a pair of arm regions 1202. In general, torso region 1201 extends from a neck opening 1203 to a waist opening 1204 to cover a substantial portion of a torso of the wearer. Arm regions 1202 extend from an upper area of torso region 1201 and receive arms of the wearer. Although apparel 1200 is depicted as being a short-sleeved shirt, any of the concepts disclosed below with respect to apparel 1200 may be incorporated into other types of apparel for covering the torso.

Various materials are utilized in the apparel 1200. For example, an upper area 1205 and a lower back area 1206 may be formed from a material that changes or is otherwise modified by a physical stimulus (i.e., any of the materials disclosed in FIGS. 11-45), whereas a remainder of torso region 1201 is formed from any suitable conventional material. Upper area 1205 corresponds with an upper torso area of the wearer and upper arm areas of the wearer. Accordingly, upper area 1205 forms substantially all of an upper portion of apparel 1200. Lower back area 1206 corresponds with a lower back area of the wearer.

During physical activities, relatively high concentrations of perspiration may be produced in areas corresponding with upper area 1205 and lower back area 1206. In order to limit the degree to which apparel 1200 clings or otherwise uncomfortably contacts the wearer, areas 1205 and 1206 may be formed from a material that is similar to textile 70, as disclosed above with respect to FIGS. 22-25. As discussed in greater detail above, the texture of textile 70 changes from being relatively smooth to having a plurality of nodes 73 that form a separation between the wearer and textile 70. Nodes 73 effectively hold textile 70 away from the wearer and permit air to flow between textile 70 and the wearer, thereby increasing removal of perspiration and decreasing the cling of apparel 1200. Although textile 70 is suitable for areas of 1205 and 1206 of apparel 1200, any of the various textiles disclosed in FIGS. 11-45 may be utilized.

IX. Conclusion

Articles of apparel 1100 and 1200 provide examples of articles of apparel incorporating zones of materials that change or are otherwise modified by a physical stimulus. Although apparel 1100 is disclosed as having side areas 1105 and center back area 1106 formed from such materials, other articles of apparel may include only one of side areas 1105 and center back area 1106. Similarly, other articles of apparel may include only one of upper area 1205 and 1206. In some embodiments, the physical stimulus that induces the material properties (i.e., air permeability and texture) to change may be water that is absorbed by the material. Other physical stimuli, such as increased temperature, light, and wind, may also be utilized within the scope of the present invention.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. An article of apparel comprising:
   a torso region having a front area, a back area, and a pair of side areas for covering a torso of a wearer, and the torso region having a neck opening and an opposite waist opening; and
   a pair of arm regions extending from the torso region for receiving arms of the wearer,
   the article of apparel being formed from at least a first material and a second material, the first material having:
   a back portion that is centrally-located in the back area of the torso region and extends in a vertical direction from the neck opening to the waist opening; and
   a pair of side portions that are located in the side areas of the torso region and extend in the vertical direction from the arm regions to the waist opening,
   the first material including a yarn that exhibits a dimensional transformation upon exposure to water, and the second material being different than the first material.

2. The article of apparel recited in claim 1, wherein the apparel is a shirt.

3. The article of apparel recited in claim 1, wherein a plurality of slits are formed in the first material.

4. The article of apparel recited in claim 3, wherein the slits are formed in at least the back portion of the first material.

5. The article of apparel recited in claim 3, wherein the slits are curved.

6. The article of apparel recited in claim 1, wherein the first material is a double-knit material having a first surface and an opposite second surface, the yarn that exhibits the dimensional transformation upon exposure to the water being concentrated at the first surface, and another yarn that is substantially dimensionally-stable upon exposure to the water being concentrated at the second surface.

7. An article of apparel comprising:
   a torso region having a front area, a back area, and a pair of side areas for covering a torso of a wearer, and the torso region having a neck opening and an opposite waist opening; and
   a pair of arm regions extending from the torso region for receiving arms of the wearer,
   the article of apparel being formed from at least a first material and a second material, the first material having:
   a back portion that is centrally-located in the back area of the torso region and extends in a vertical direction; and
   a pair of side portions that are located in the side areas of the torso region and extend in the vertical direction from areas that are proximal to the arm regions to areas that are proximal to the waist opening,
   the first material including a yarn that exhibits a dimensional transformation upon exposure to water, and the second material being different than the first material.

8. The article of apparel recited in claim 7, wherein the apparel is a shirt.

9. The article of apparel recited in claim 7, wherein a plurality of slits are formed in the first material.

10. The article of apparel recited in claim 9, wherein the slits are formed in at least the back portion of the first material.

11. The article of apparel recited in claim 9, wherein the slits are curved.

12. The article of apparel recited in claim 7, wherein the first material is a double-knit material having a first surface and an opposite second surface, the yarn that exhibits the dimensional transformation upon exposure to the water being concentrated at the first surface, and another yarn that is substantially dimensionally-stable upon exposure to the water being concentrated at the second surface.

13. An article of apparel comprising:
   a torso region having a front area, a back area, a pair of side areas, and a waist area for covering a torso of a wearer, and the torso region having a neck opening and an opposite waist opening; and
   a pair of arm regions extending from the torso region for receiving arms of the wearer,
   wherein the article of apparel is a shirt formed from at least a first material and a second material, the first material extending in each of the side areas from a first end in the waist area to a second end proximate to an arm region, the first material including a yarn that exhibits a dimensional transformation upon exposure to water, and the second material being different than the first material, and a plurality of curved slits are formed in the first material in the side areas, and wherein the first material is a double-knit material having a first surface on an interior side of the apparel and an opposite second surface, the yarn that exhibits the dimensional transformation upon exposure to the water being concentrated at the first surface, and another yarn that is substantially dimensionally-stable upon exposure to the water being concentrated at the second surface.

14. The article of apparel recited in claim 13, wherein the first material extends in each of the side areas from a first end within about 3 inches from the waist opening to a second end proximate to an arm region.

15. The article of apparel recited in claim 13, wherein the first material extends in each of the side areas from a first end within about 1 inch from the waist opening to a second end proximate to an arm region.

16. The article of apparel recited in claim 13, wherein the first material extends in each of the side areas from a first end at the waist opening to a second end proximate to an arm region.

17. The article of apparel recited in claim 13, wherein the first material additionally extends in a vertical direction along a central portion of the back area.

18. The article of apparel recited in claim 17, wherein the plurality of curved slits are additionally formed in the first material in the central portion of the back area.

* * * * *